US 6,568,960 B2

(12) United States Patent
Bricaud et al.

(10) Patent No.: US 6,568,960 B2
(45) Date of Patent: May 27, 2003

(54) DUAL CIRCUIT CARD CONNECTOR

(75) Inventors: Herve' Guy Bricaud, Dole (FR); Yves Pizard, Dole (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/809,690

(22) Filed: Mar. 15, 2001

(65) Prior Publication Data
US 2001/0010984 A1 Aug. 2, 2001

Related U.S. Application Data

(63) Continuation-in-part of application No. PCT/EP99/06888, filed on Sep. 17, 1999.

(30) Foreign Application Priority Data

Sep. 22, 1998 (FR) .............................................. 98/11790

(51) Int. Cl.⁷ .............................................. H01R 23/70
(52) U.S. Cl. .................................... 439/630; 439/541.5
(58) Field of Search ................................ 439/630, 636, 439/637, 60, 541.5, 79, 631, 924.1

(56) References Cited

U.S. PATENT DOCUMENTS 5,643,001 A  *  7/1997  Kaufman et al. ........... 439/159
5,919,049 A  *  7/1999  Petersen et al. .............. 430/60

FOREIGN PATENT DOCUMENTS

DE   196 45 460 A1   5/1998
GB   2 298 743 A     9/1996

* cited by examiner

Primary Examiner—Renee Luebke
Assistant Examiner—Phuongchi Nguyen
(74) Attorney, Agent, or Firm—Roger C. Turner

(57) ABSTRACT

A compact electrical connector can receive two different kinds of circuit cards, of the type that are thin and flat and have contact pads on an active face, such as a MICROSIM card and a MMC card. The connector includes a body (52) with an insulative frame (81) and two sets of contacts (84, 114) on the frame, with each set of the contacts having pad-engaging ends arranged in patterns corresponding to the patterns of contact pads on the two types of circuit cards. A card-holder unit (54) has first and second card-holding compartments lying in horizontal planes that are vertically spaced. The cards can be inserted into the compartments and the unit is then slid into the body until pads of the two cards engage the two sets of contacts on the body.

14 Claims, 68 Drawing Sheets

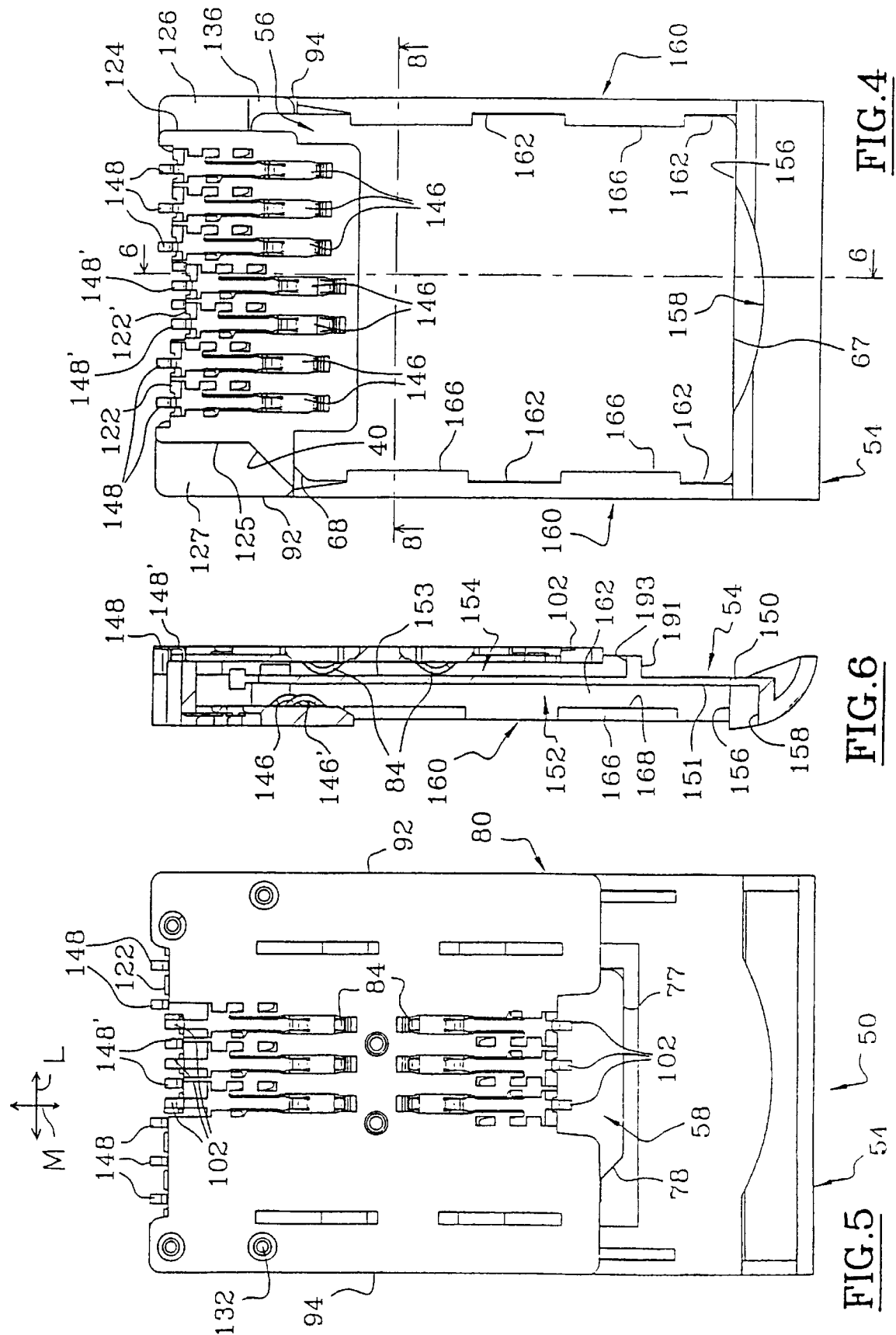

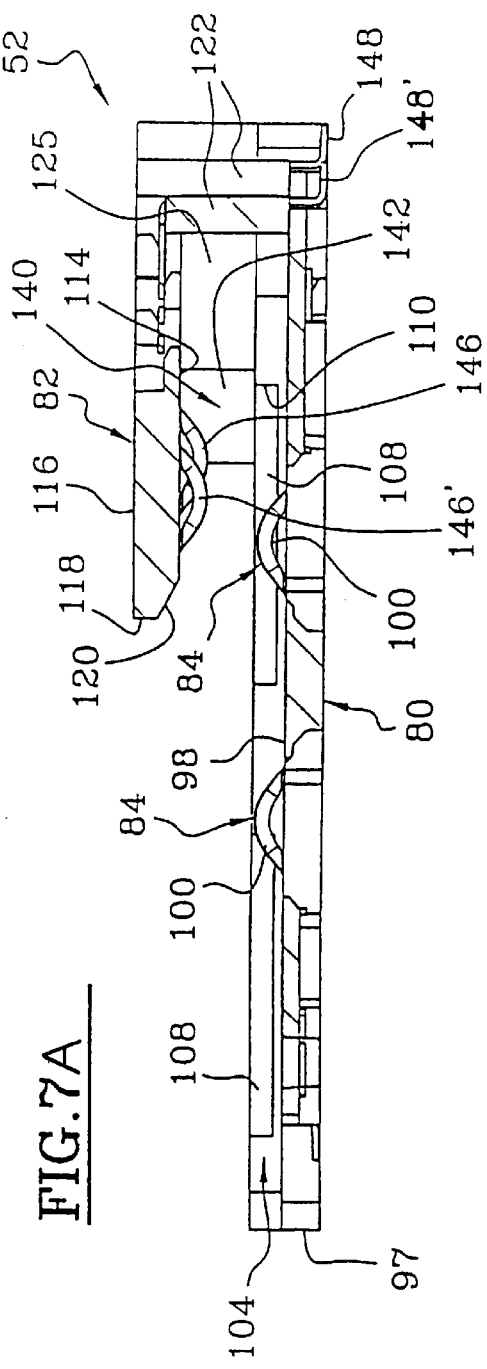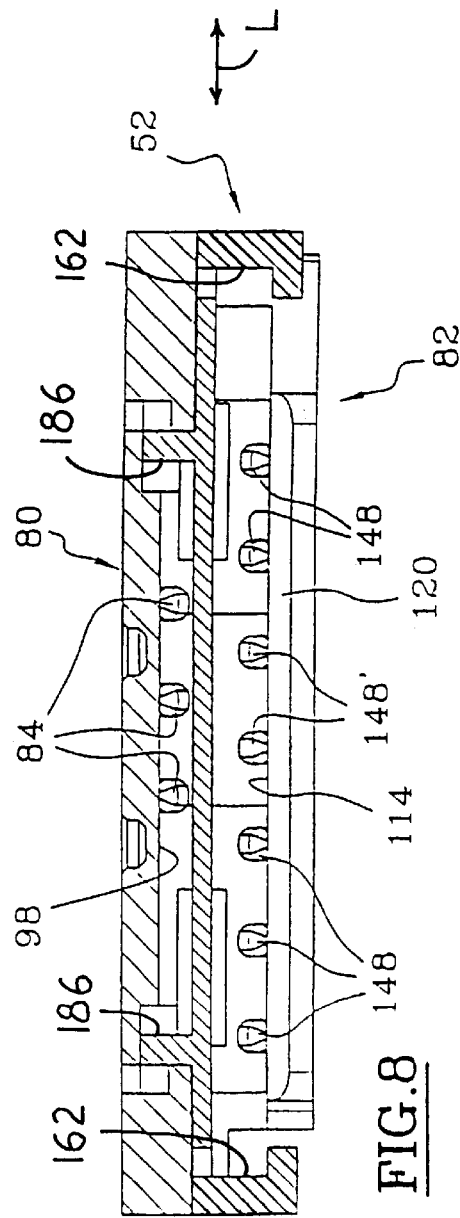

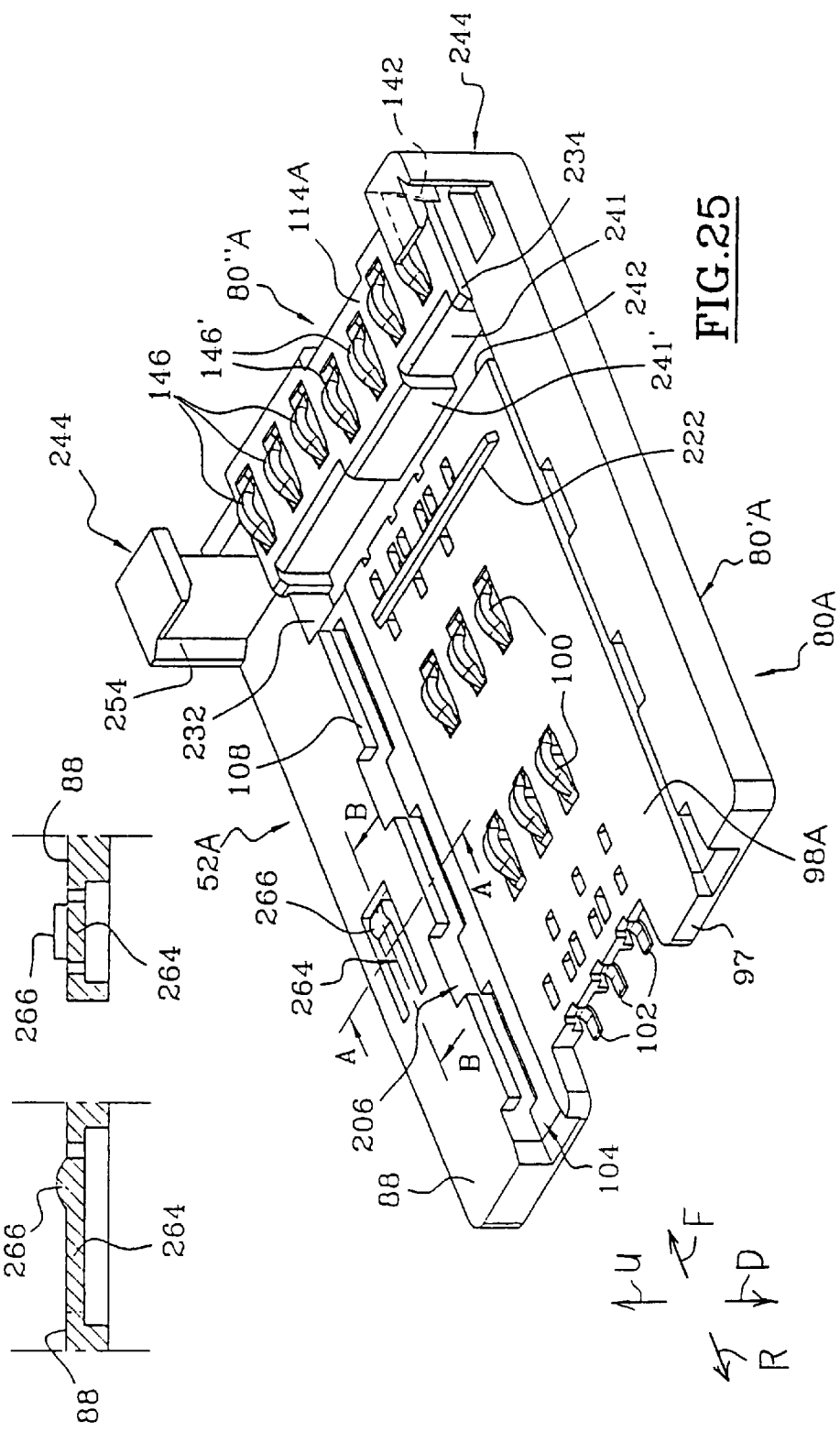

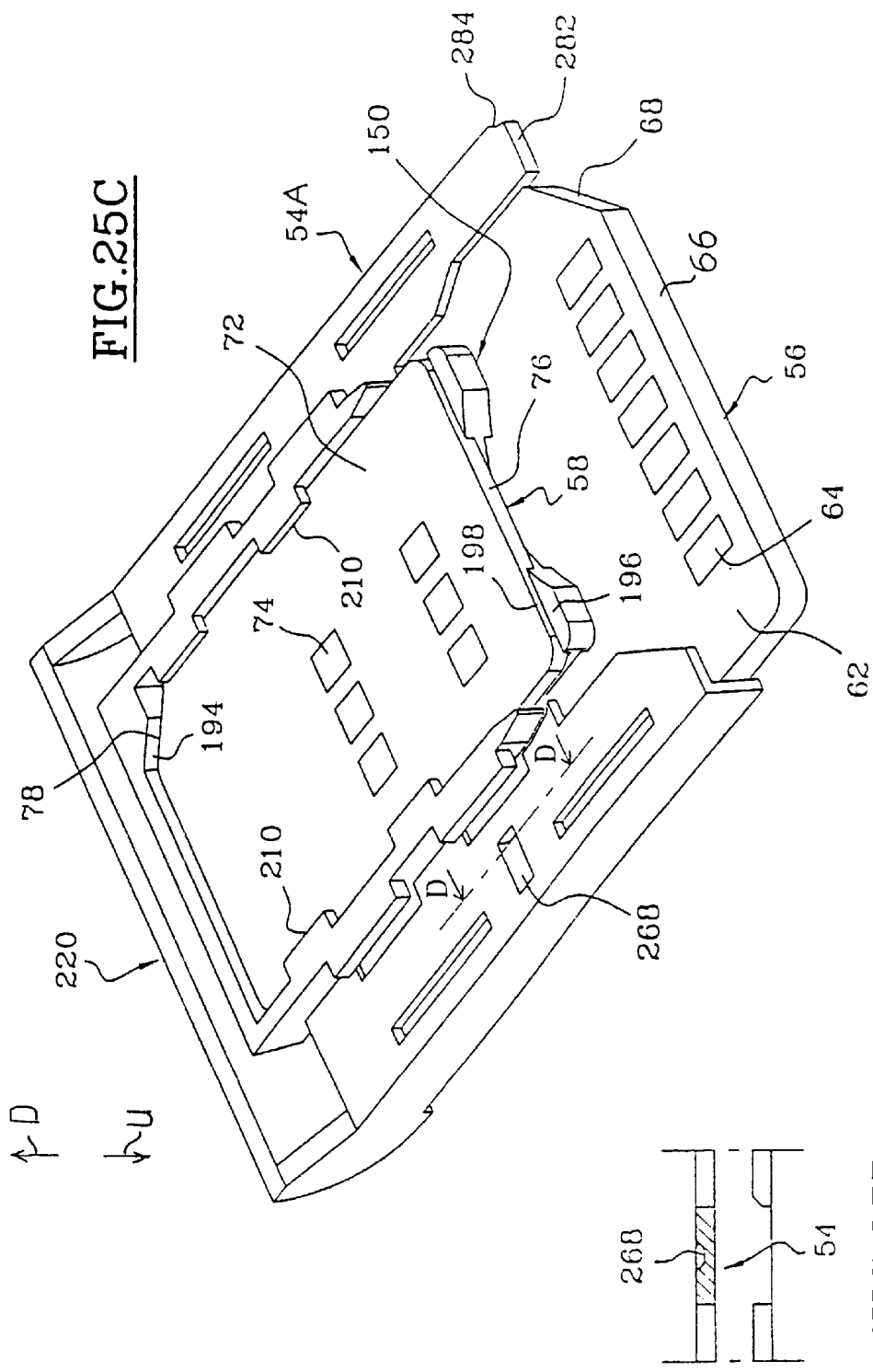

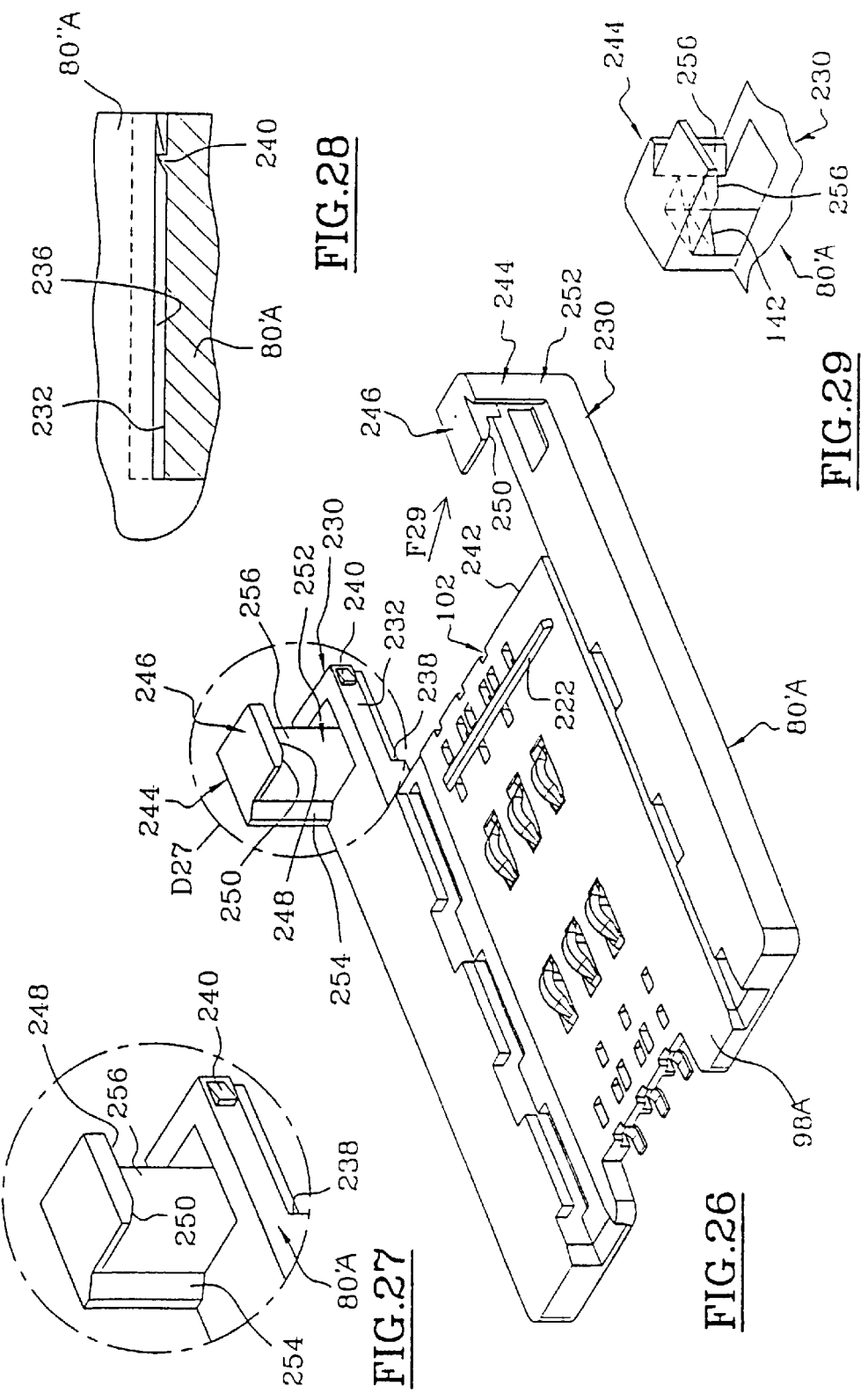

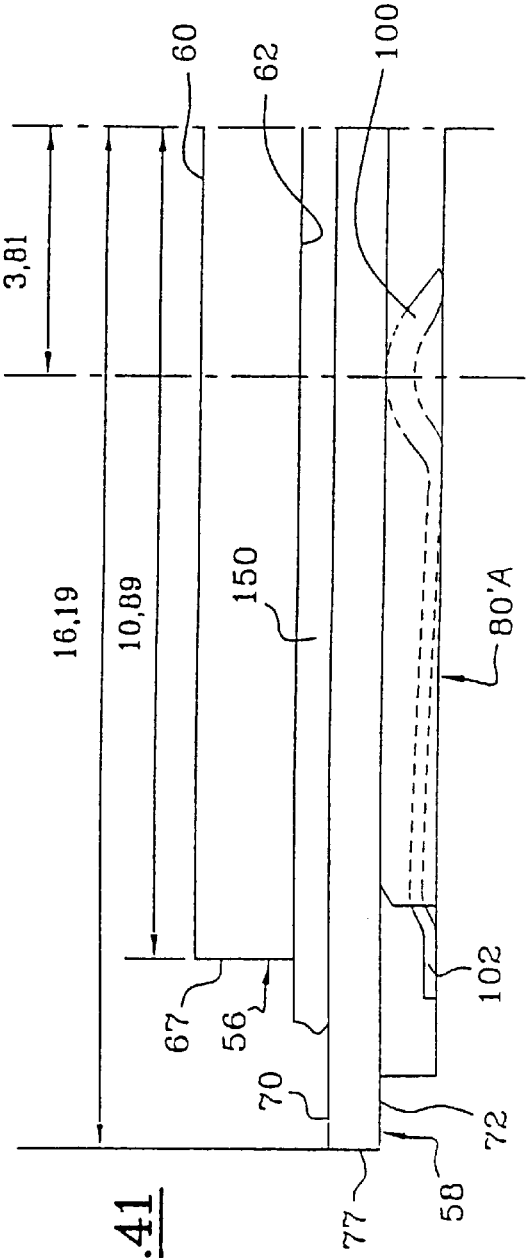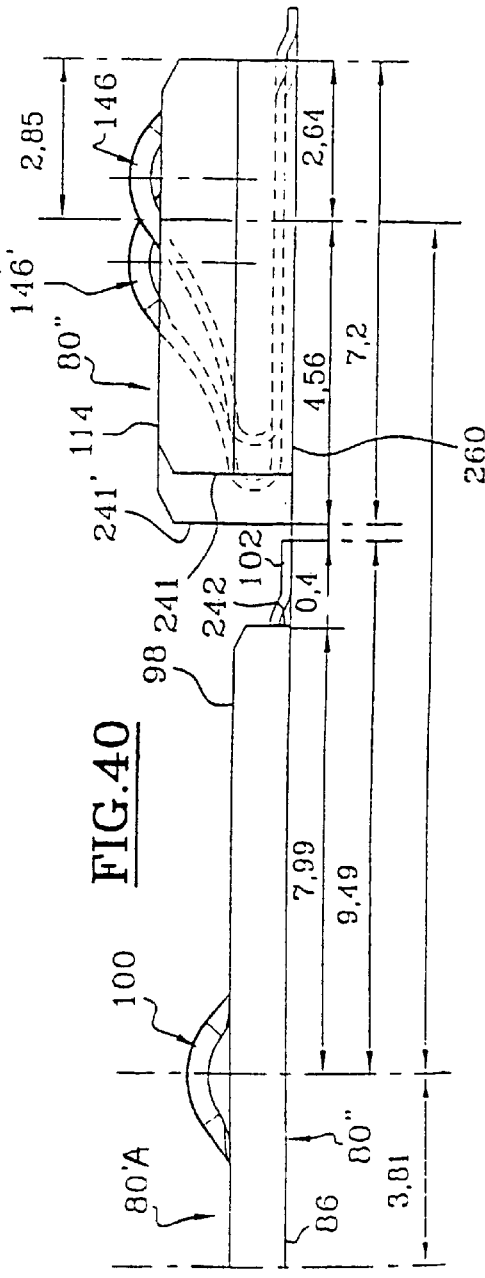

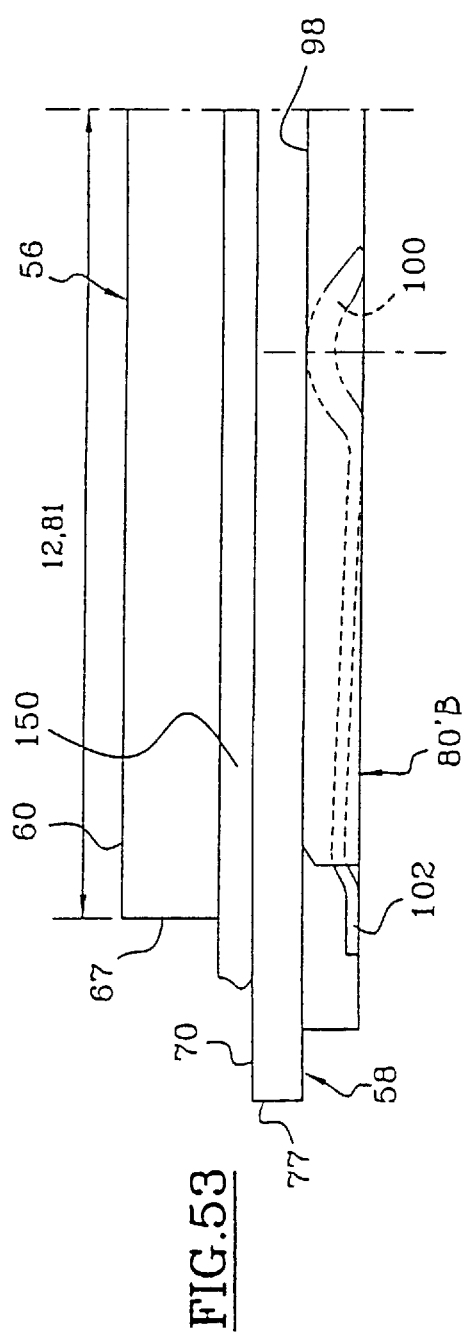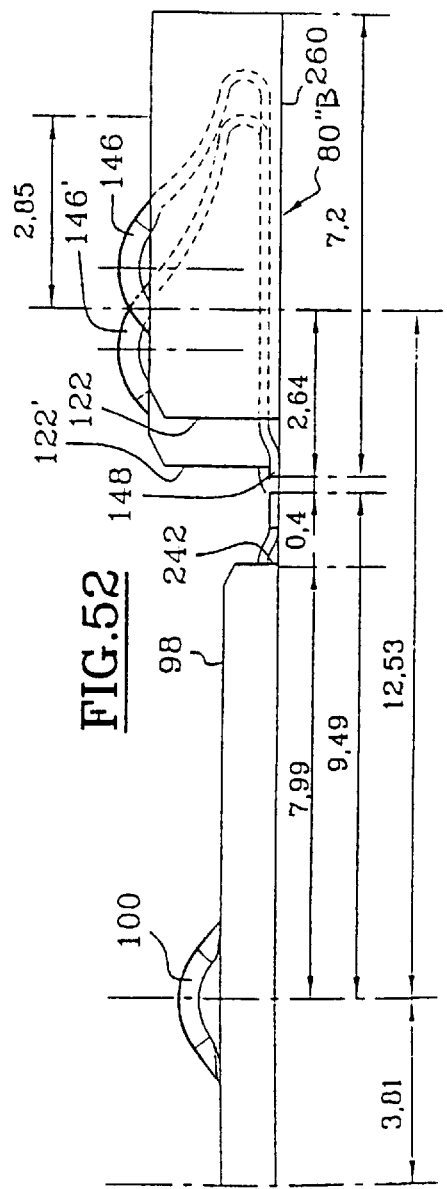

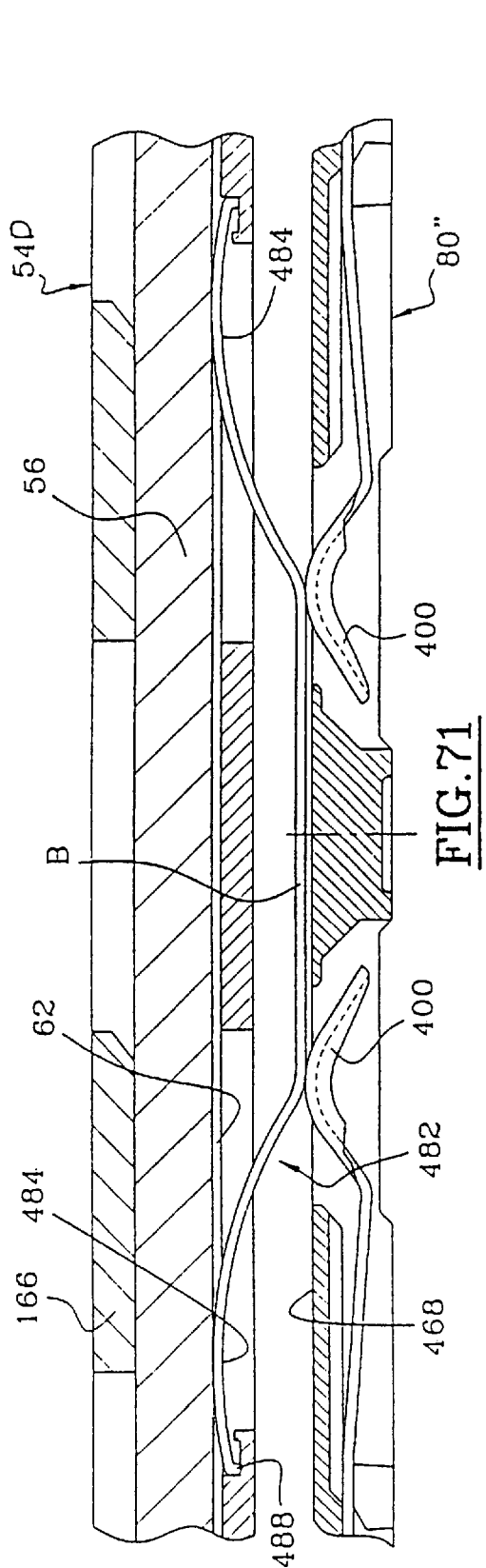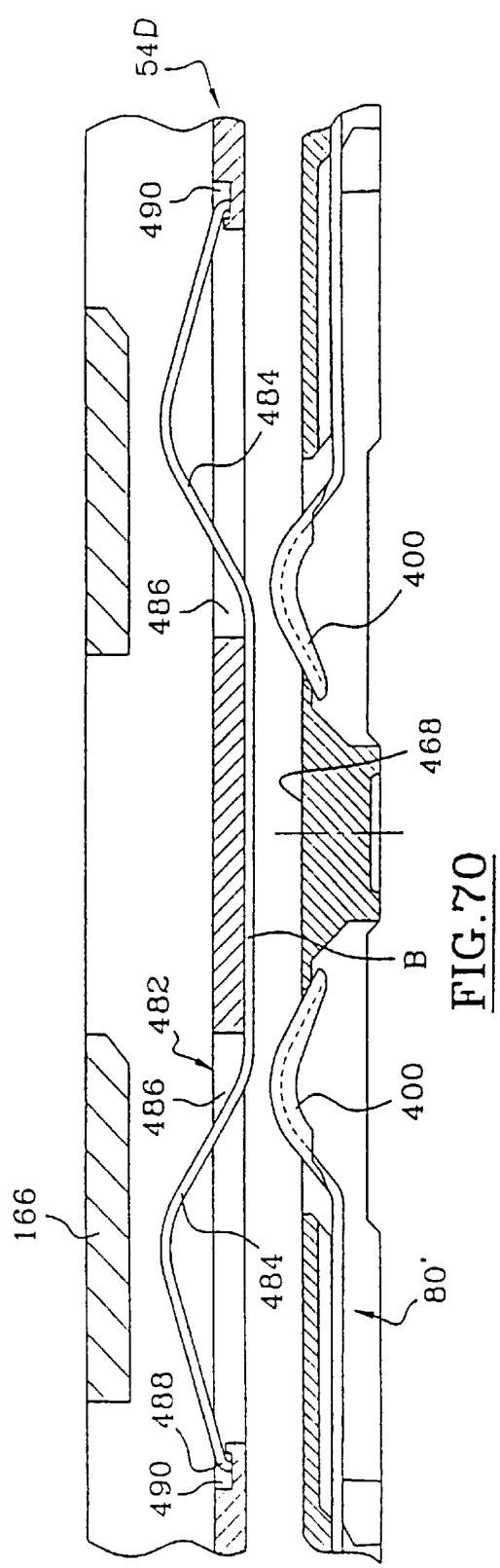

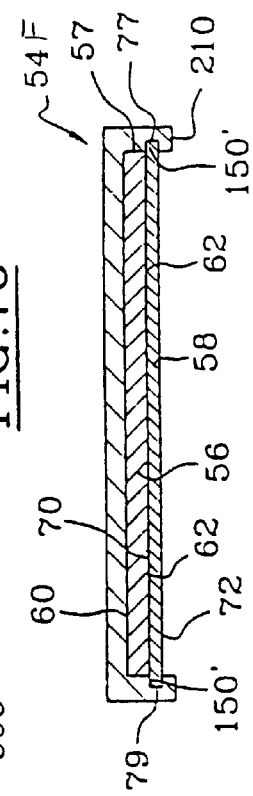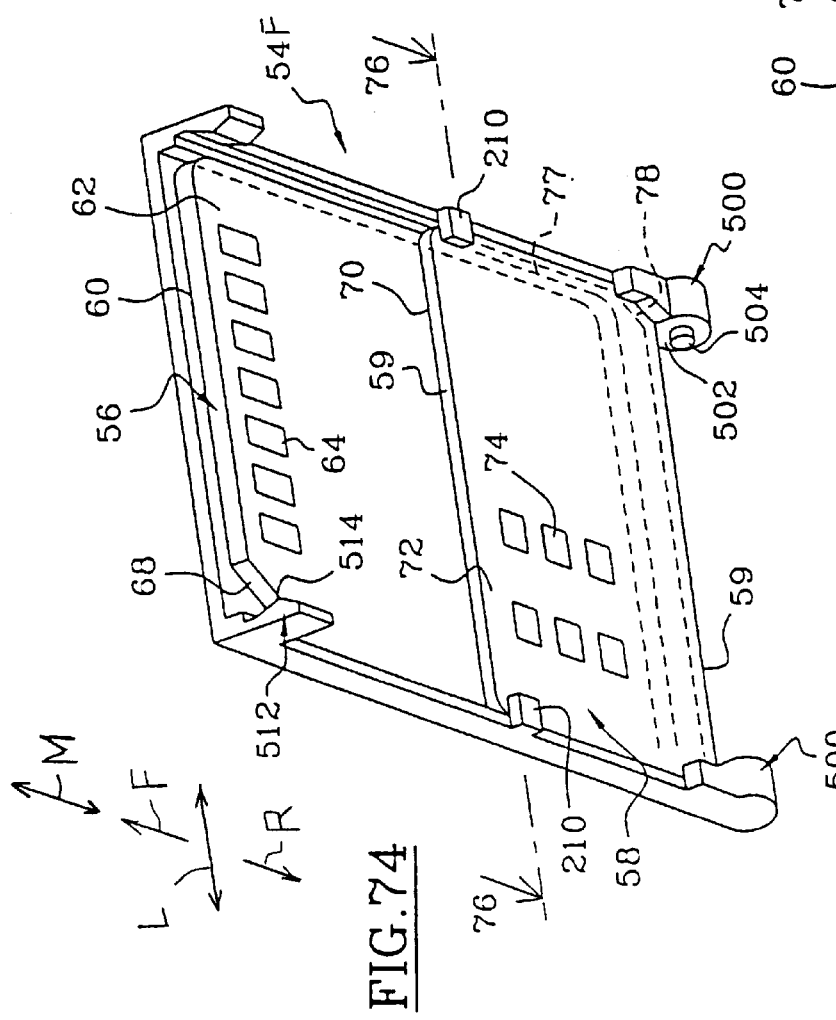

DUAL CIRCUIT CARD CONNECTOR

CROSS-REFERENCE

This is a continuation-in-part of PCT Application PCT/EP99/06888 filed Sep. 17, 1999, which claims priority from French application 9811790 filed Sep. 22, 1998.

BACKGROUND OF THE INVENTION

Two types of small and thin circuit cards are in wide use, that each have an embedded integrated circuit to store data and that each have an active face with contact pads that are connected to the integrated circuit. One type is called a smart card that is standardized in two formats, the smaller of which is called a MICROSIM card which has contact pads arranged in two rows. Another type of card is the MMC (MultiMediaCard) which is sold by San Disk Company. The MMC card is somewhat similar in shape and size to the MICROSIM Card, with both having a cut corner forming a polarizing part that assures proper orientation of the card. The MMC card is of somewhat greater thickness, length, and width than the MICROSIM card, and has its contact pads arranged in a single row along one end of the card. The MICROSIM card is commonly used to identify the user for access to a telephone or other electronic system. The MMC card is commonly used to store larger amounts of data, and is commonly called a "flash" type card.

It is desirable to enable a single compact connector to make connections with at least two different types of circuit cards, of the type that have active faces with contact pads. In one application, a MICROSIM card may be used to identity the user, while an MMC card stores large quantity of data. In other applications, connections may be made to only one card at a time, but the connector should be able to receive and connect to the pads of at least two different types of circuit cards. The connector is commonly mounted on a circuit board, and should have a minimum size.

SUMMARY OF THE INVENTION

In accordance with one embodiment of the present invention, an electrical connector is provided for making electrical connections with contact pads on the active faces of thin and flat circuit cards, wherein the connector can connect to a plurality of circuit cards, and connect to them simultaneously, in a compact connector. The connector includes an insulative body with first and second sets of contacts arranged in first and second contact pad patterns corresponding to the patterns of contact pads on the circuit cards. A card-holder unit has first and second card-holding compartments for each holding a circuit card. The compartments hold the cards in parallel planes. The card-holder unit can be moved into a fully installed position on the body, wherein each set of contacts on the body engages pads on the active face of each card in the unit.

In one connector, the body has an upwardly-facing first card-engaging wall that lies at a first level and with the first set of contacts lying at that first wall. The body has a downwardly-facing second card-engaging wall that lies at a higher level than the first card-engaging wall. The cards are mounted on the card-holder unit with the lower card having its active face facing downwardly and with the upper card having its active face facing upwardly. The card-holder unit is slid into position between the upwardly-facing wall and downwardly-facing wall, with the pads of both cards engaged by corresponding sets of contacts.

In another arrangement, the first card-engaging wall faces upwardly and a second card-engaging wall also faces upwardly and lies at a higher level than the first wall. The cards are positioned on the card-holder unit with the active faces of both cards facing downwardly. However, the upper card projects further forward than the lower card, so a row of contacts at the front end of the upper card are exposed.

In the system, the card-holder unit is designed so the lower compartment closely holds a MICROSIM card, while the upper compartment closely holds an MMC card. Each card has a diagonally-cut polarizing corner for assuring proper orientation of the card. Walls on the connector that engage the polarizing corner are not always on the card-holder unit, but one can lie on the connector body.

The connector body includes a molded plastic lower part that forms the first or lower card-engaging wall and that holds the first set of contacts. The connector body includes a separately molded second part that is mounted on the front end of the lower part and that holds the second set of contacts at a higher elevation than the elevation of the first set of contacts.

The novel features of the invention are set forth with particularity in the appended claims. The invention will be best understood from the following description when read in conjunction with the accompanying drawings.

BRIEF DESCRIPTION OF THE DRAWINGS

FIG. 4 is a top view of the connector of FIG. 3.

FIG. 5 is a bottom view of the connector of FIG. 3.

FIG. 6 is a sectional view taken on line 6—6 of FIG. 4, but without the cards.

FIG. 7A is view similar to that of FIG. 7, but without the card-holding unit or cards.

FIG. 8 is a sectional view taken on line 8—8 of FIG. 4.

FIG. 25 is a rear and top isometric view of a connector body of a second embodiment of the invention, wherein the card-engaging walls of the body both face upwardly.

FIG. 25A is a sectional view taken on line A—A of FIG. 25.

FIG. 25B is a sectional view taken on line B—B of FIG. 25.

FIG. 25C is a bottom view of a card-holding unit which is used with the connector body of FIG. 25.

FIG. 25D is a view taken on line D—D of FIG. 25C.

FIG. 26 is a view similar to that of FIG. 25, but showing only the lower part of the connector body but not the upper part.

FIG. 27 is an enlarged view of area D27 of FIG. 26.

FIG. 28 is an enlarged partial sectional view showing details of means for interlocking bottom and top parts of the connector body.

FIG. 29 is an isometric view taken along the line F29 of FIG. 26.

FIGS. 40 and 41 are respective front and rear diagrammatic sectional views of the connector of FIG. 39.

FIGS. 52 and 53 are two parts of a diagrammatic longitudinal and sectional view of the connector of FIG. 44.

FIG. 57A is a view taken on line A—A of FIG. 57, which illustrates the card-holding unit just prior to its full insertion in the connector body.

FIG. 57B is a view similar to FIG. 57A, which shows in the card-holding unit in its fully inserted position.

FIG. 70 is a partial sectional view taken on line 70—70 of FIG. 65.

FIG. 71 is a view similar to that of FIG. 70, but with the MMC card in place.

FIG. 74 is a front and bottom isometric view of a card-holding unit of another embodiment of the invention, for mounting a connector body.

FIG. 76 is a sectional view taken on line 76—76 of FIG. 74.

LIMITED DESCRIPTION OF PREFERRED EMBODIMENTS OF THE INVENTION

Figure 1:
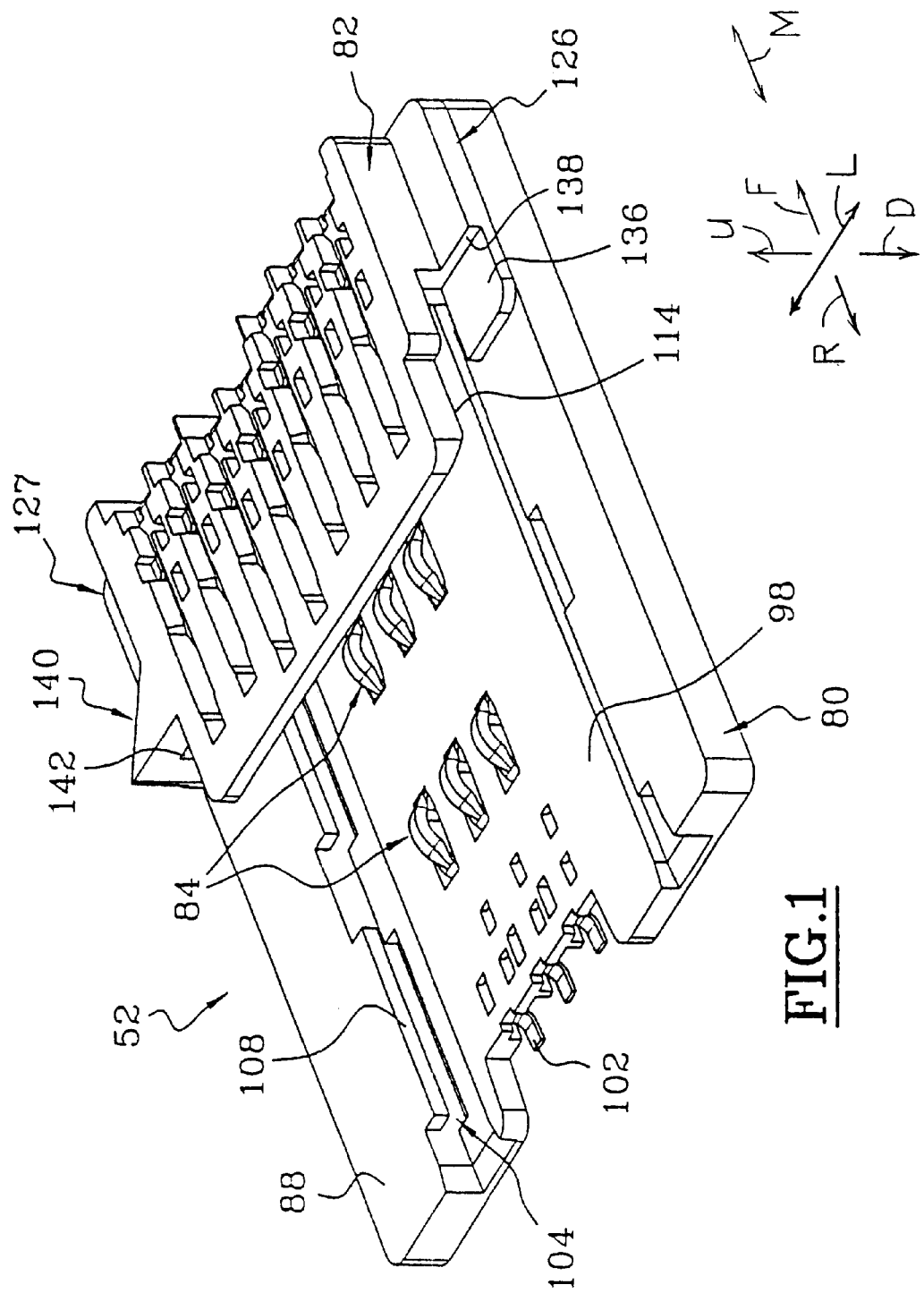
FIG. 1 is a rear and top isometric view of a body of an electrical connector constructed in accordance with one embodiment of the present invention.
Figure 2:
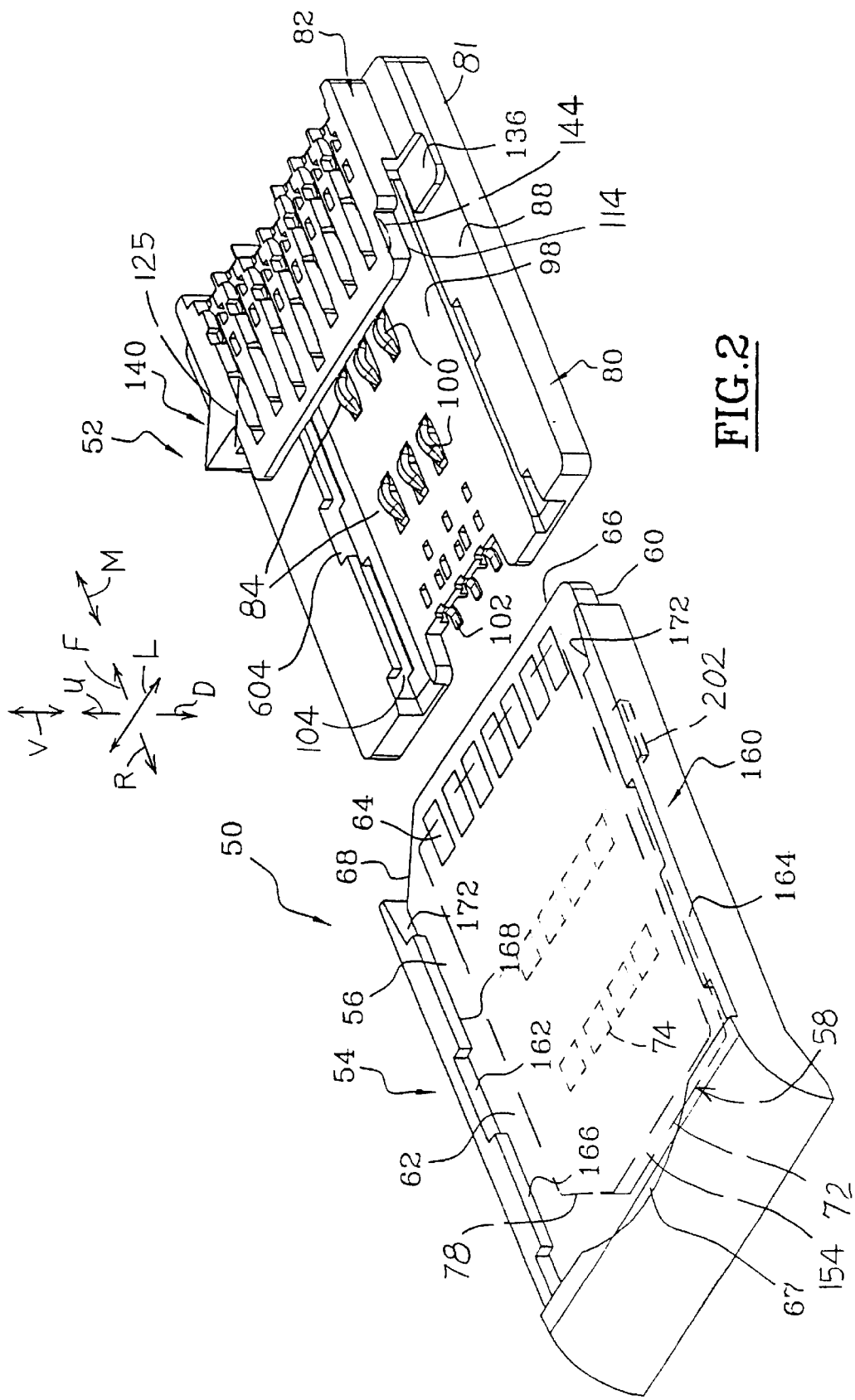
FIG. 2 is an exploded rear isometric view of the electrical connector of FIG. 1, including the card holder unit with cards installed therein.
Figure 3:
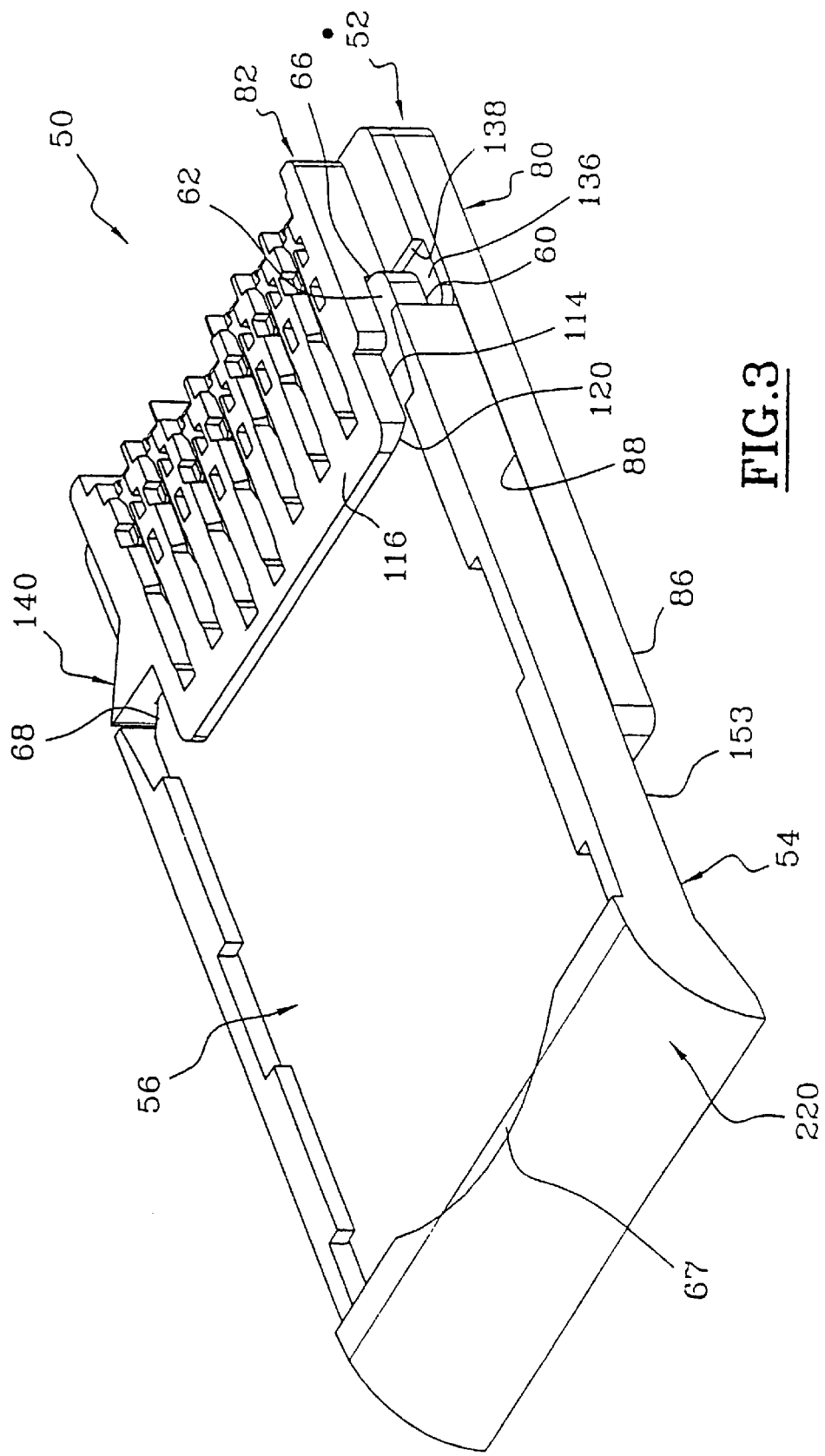
FIG. 3 is a rear and top isometric view of the electrical connector of FIG. 2, with the card-holding unit in its fully installed position.

FIG. 2 illustrates an electrical connector 50 which includes a connector body 52 and a card-holder unit 54. The card-holder unit 54 can hold two circuit cards, including an MMC card 56 and a MICROSIM card 58. The MMC card 56 has a set of contact pads 64 lying in a transverse, or laterally L extending row near the front edge 66 of the card. The MICROSIM card 58 lies below the MMC card, with the MICROSIM card having a set of contact pads 74 arranged in two laterally-extending rows. After the two cards have been installed on the unit 54, the unit is slid forwardly F onto the contact body 52.

The contact body includes an insulative frame 81. The body has lower and upper body parts 80, 82 that each includes an insulative frame part and contacts mounted on the frame part. A first set of contacts 84 is mounted on the frame part of the lower body 80 and has pad-engaging contact ends 100 that project slightly above an upwardly U facing wall 98. The wall 98 is intended to substantially engage the lower face of the MICROSIM card 58 so the contact ends 100 engage the contact pads 74 thereon (in FIG. 2, only six of the eight contact pads would be engaged).

The upper part 82 of the connector body includes a second set 144 of contacts that project slightly downward from a face or wall 114. The wall 114 faces downwardly D, with the pad-engaging ends of the contacts 144 projecting slightly below the wall 114. The contacts 144 are arranged to engage the set of contact pads 64 of the MMC card, when the unit 52 is fully installed on the connector body 52.

Figure 11:
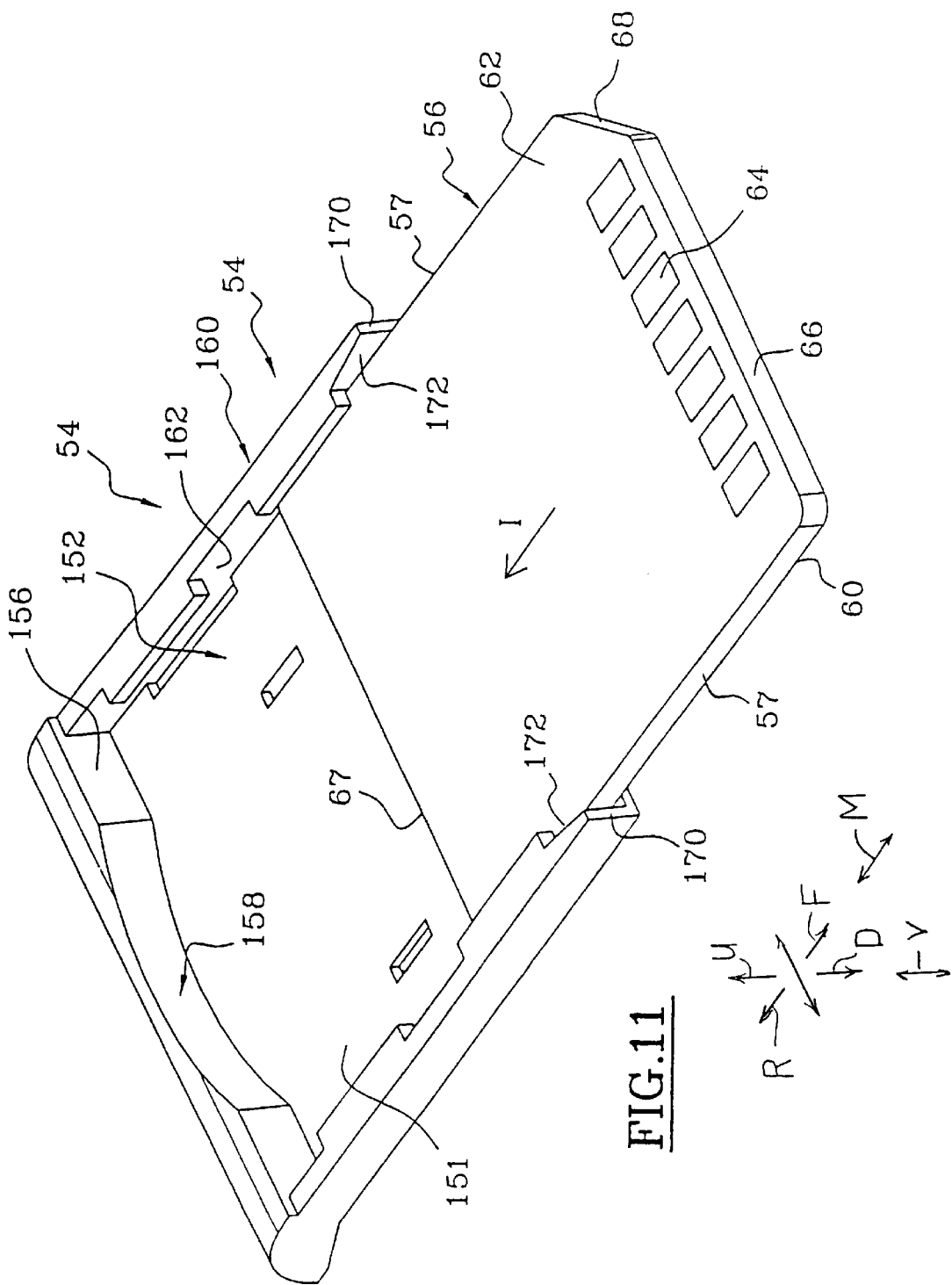
FIG. 11 is a view similar to that of FIG. 9, but showing an MMC card during its insertion into the upper compartment of the card-holding unit.
Figure 12:
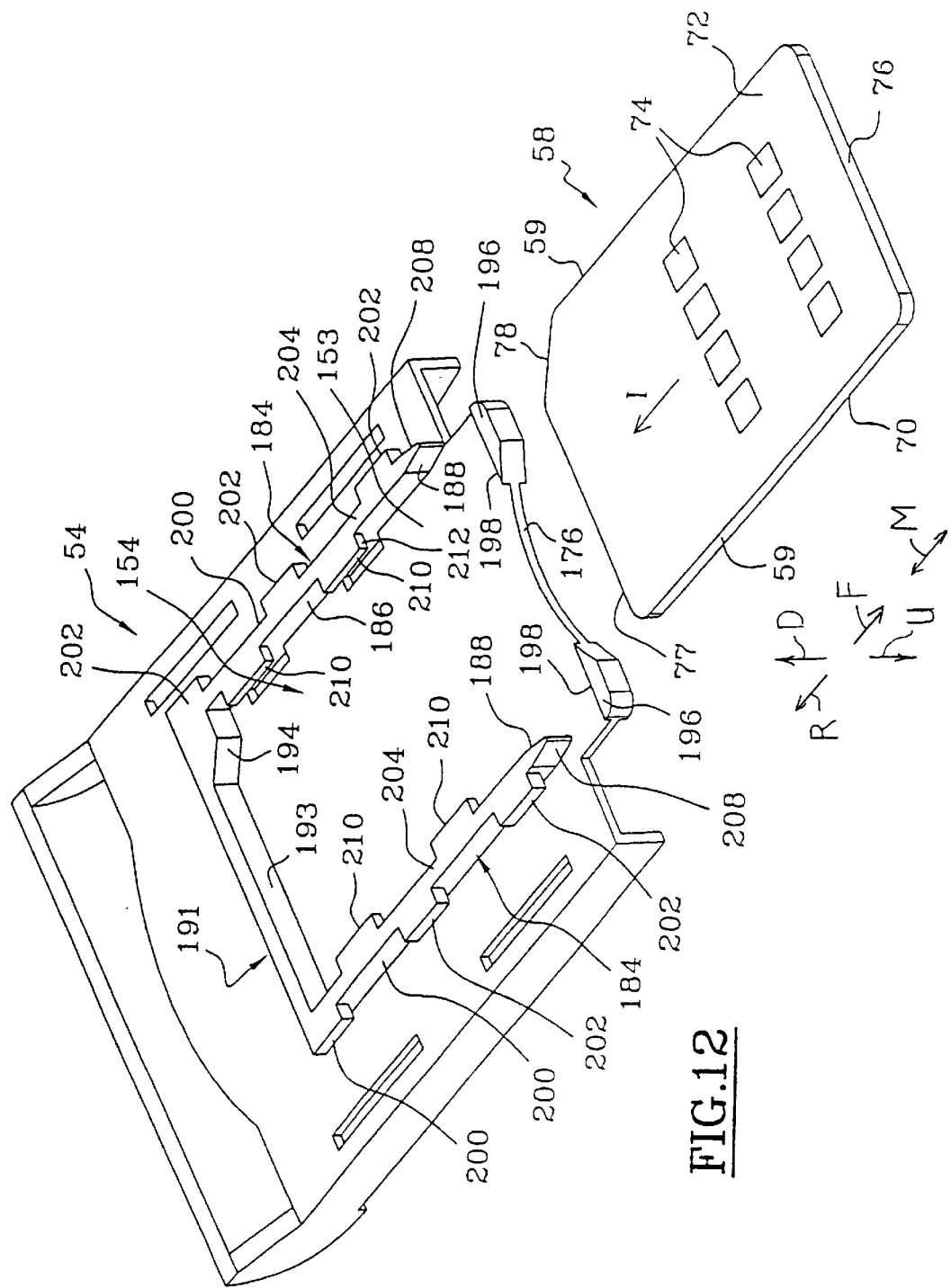
FIG. 12 is a view similar to the upside view of FIG. 10, but showing a MICROSIM card as it approaches the card-holding unit for insertion into the lower compartment therein.

FIG. 11 shows the shape of the MMC card 56, while FIG. 12 shows the shape of the MICROSIM card 58. Both cards are thin and flat, in that their width in a lateral or transverse direction L and length in a longitudinal direction M are both a plurality of times greater than their thickness in a vertical direction V. Each card has an integrated circuit embedded in it, with the integrated circuit and any other circuitry therein connected to the contact pads. The contact pads lie on an "active" face on the card, with the MMC card of FIG. 11 having its active face at 62, facing upwardly and the MICROSIM card of FIG. 12 having its active face at 72 facing downwardly D. Each card also has a cut corner polarizer, with the MMC card of FIG. 11 having a polarizer 68 and the MICROSIM card of FIG. 12 having a polarizer at 78. Each polarizer assures that the card is installed in the correct orientation on the card-holding unit.

Figure 7:
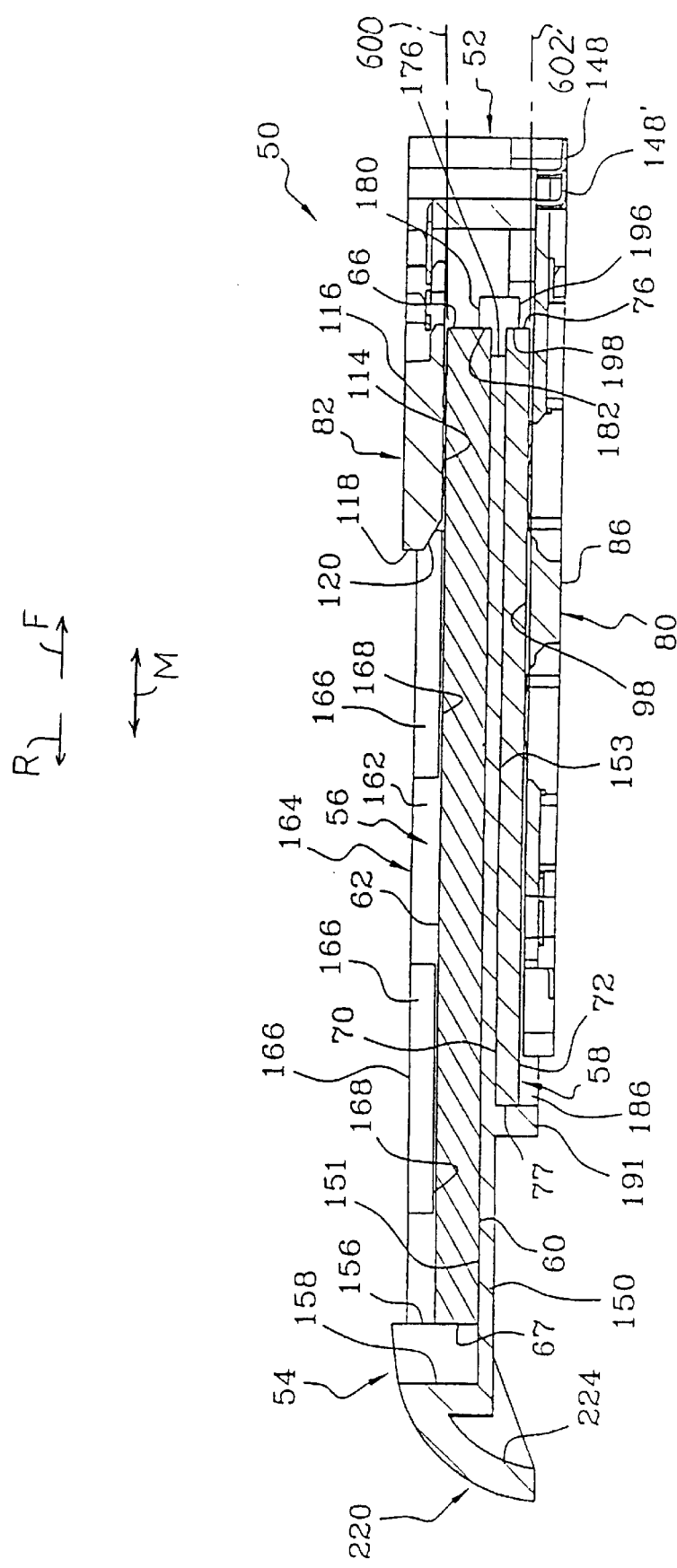
FIG. 7 is a sectional view similar to that of FIG. 6, but with the cards in place.
Figure 9:
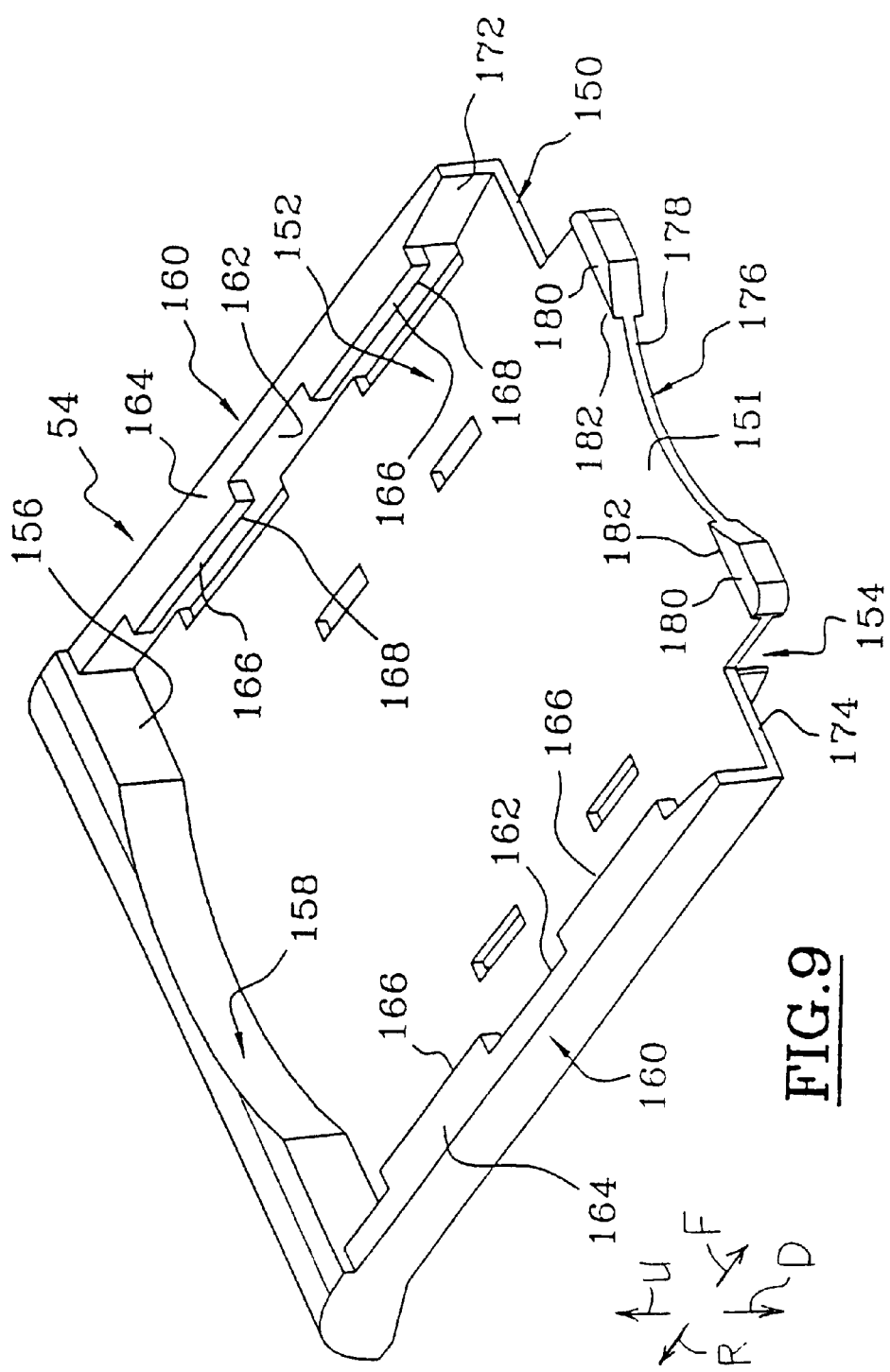
FIG. 9 is a top and front isometric view of the card-holding unit, shown without cards.

FIG. 7 shows the card-holding unit 54 fully installed on the connector body 52, with the MMC card 56 and the MICROSIM card 58 each installed on the card-holding unit. It can be seen that the active face 62 of the MMC card 56 lies in a second plane 600, while the active face 72 of the MICROSIM card lies in a first plane 602 that is spaced below the second plane 600. The two planes are parallel. A partition wall 150 lies between the cards. The rear ends 67, 77 of the two cards abut walls at the rear of the unit 54 to position the cards in longitudinal direction. FIG. 7A shows the positions of the pad-engaging ends 100 of the first or lower set of contacts, that engage the pads of the MICROSIM card, and the positions of the pad-engaging ends 146 and 146' that engage the pads on the MMC card.

FIG. 12 shows that the MICROSIM card 58 is inserted into the lower compartment 154 of the card-holding unit by inserting it into grooves lying under tabs 210, until the front edge 76 of the card snaps behind stop facets 198. The top wall of the compartment 154 and stop facets 198 are formed on the partition 150. FIG. 8 shows that opposite sides of the MICROSIM card are laterally positioned by side walls 186 and that opposite sides of the MMC card are laterally positioned by side walls 162. The lateral separation of sides 162 is greater than that of sides 186.

FIG. 12 also shows the tabs 202 that guide the card-holding unit 54 during its sliding movement into the connector body of FIG. 2. It is noted that the tabs 202 at laterally L opposite sides of the unit can fit into interruptions 604, shown in FIG. 2, of the connector body. This allows the card-holder unit 54 to be placed on surfaces 88 of the connector body until the tabs 202 move down through the interruptions 604, when the unit can then be pushed forward to its final position. The tabs 202 lie in the plane of the MICROSIM card, and do not add to the height of the connector.

The unit 54 is designed to be slid completely out of the connector body, so the cards can be installed on the unit prior to the unit approaching the connector body. This facilitates handling of the unit to insert the cards. It is noted, in FIG. 12, that the walls of the lower compartment 154 include a polarizing wall 194 that prevents full insertion of the MICROSIM card into the compartment unless it is properly oriented with its polarizing corner 78 lying adjacent to the wall 94. In FIG. 11, the MMC card has its polarizing corner 68 lying free when the card is fully inserted in the unit with its rear edge 67 abutting wall 156 of the upper compartment 152. However, as shown in FIG. 2, when the card-holding unit is fully inserted, the polarizing corner 68 of the upper card abuts a polarize wall 125 on the connector body, so the unit cannot be fully installed unless the upper or second card 56 has been properly oriented. As mentioned above, the rear R ends of the cards abut walls of the card-holding unit 54, to locate the front edges of the cards.

FIG. 7 shows that the front edges 66, 76 of the top and bottom cards are preferably located with one approximately directly under the other. However, the rear end 77 of the lower card lies forward of the rear end 67 of the upper card because the lower, MICROSIM card is of shorter longitudinal M length. By having the rear end 77 of the lower card lying forward of the rear end of the upper card, applicant minimizes the length of the connector body.

Figure 13:
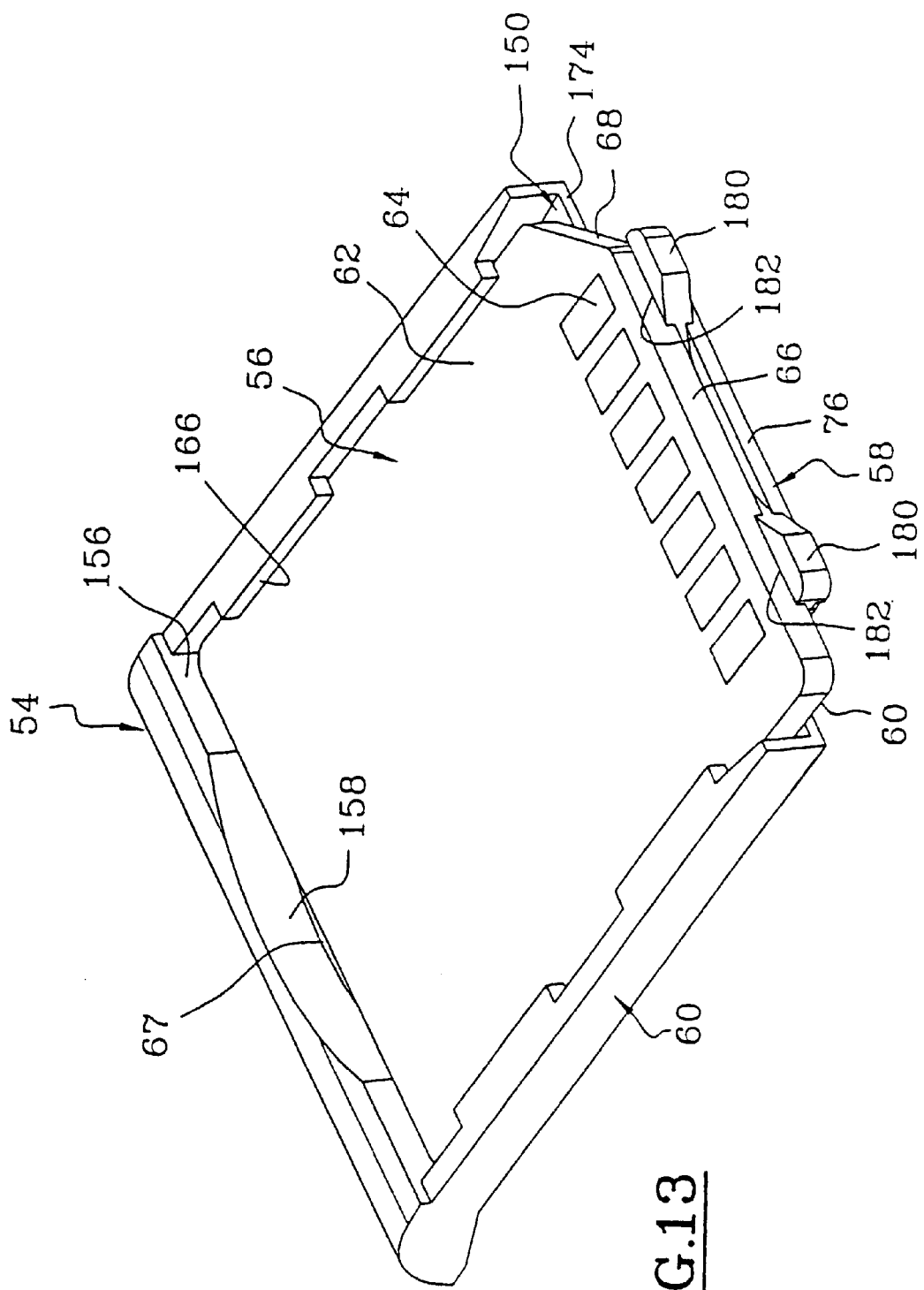
FIG. 13 is a view similar to that of FIG. 9, but with a card in both the upper and lower compartments of the card-holding unit.

FIG. 13 shows that the partition wall has a pair of lugs 180 with facets 182 that abut the front edge 66 of the MMC card to position it. However, the unit does not abut the polarized corner 68 of the MMC card, with assurance of proper orientation being accomplished by part of the connector body.

Figure 22:
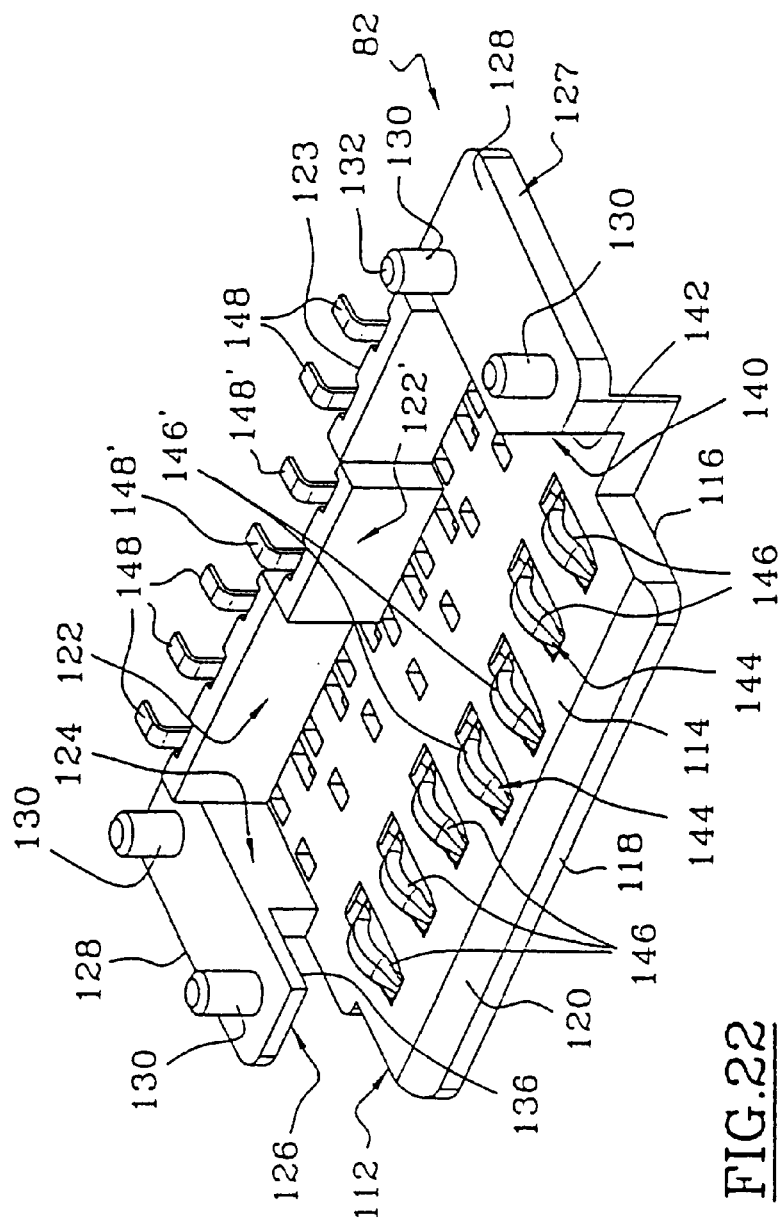
FIG. 22 is a front upside-down isometric view of the upper part of the connector body of FIG. 21.

FIG. 22 shows that, for the eight contacts that engage the pads on the MMC card, two of the contacts have their card-engaging ends 146' located slightly rearward of the other contact ends to assure that they engage corresponding pads of the card prior to engagement of the other pads with the other contact ends 146. Applicant forms the front wall 122 of the upper part 82 of the connector body so it has a slightly rearwardly-offset part 122' to receive the tails 148' of the two contacts. This allows the same contacts to be used for all eight positions.

FIG. 25 illustrates the connector body 52A of an electrical connector of another embodiment of the invention. In FIG. 25, the face 114A where the upper contact ends 146, 146' lie, face upwardly U, in the same direction as the face 98A for the contact ends 100 that engage contact pads of the lower card.

FIG. 25C shows the card-holding unit 54A which holds the two cards 56, 58. The unit 54A is similar to that of the first embodiment of the invention of FIGS. 1–24, except that the upper second, or MMC card 56, is held with its active face 62 facing downwardly, and with its front edge 66 lying forward of the edge 76 of the MICROSIM card 58.

Figure 37:
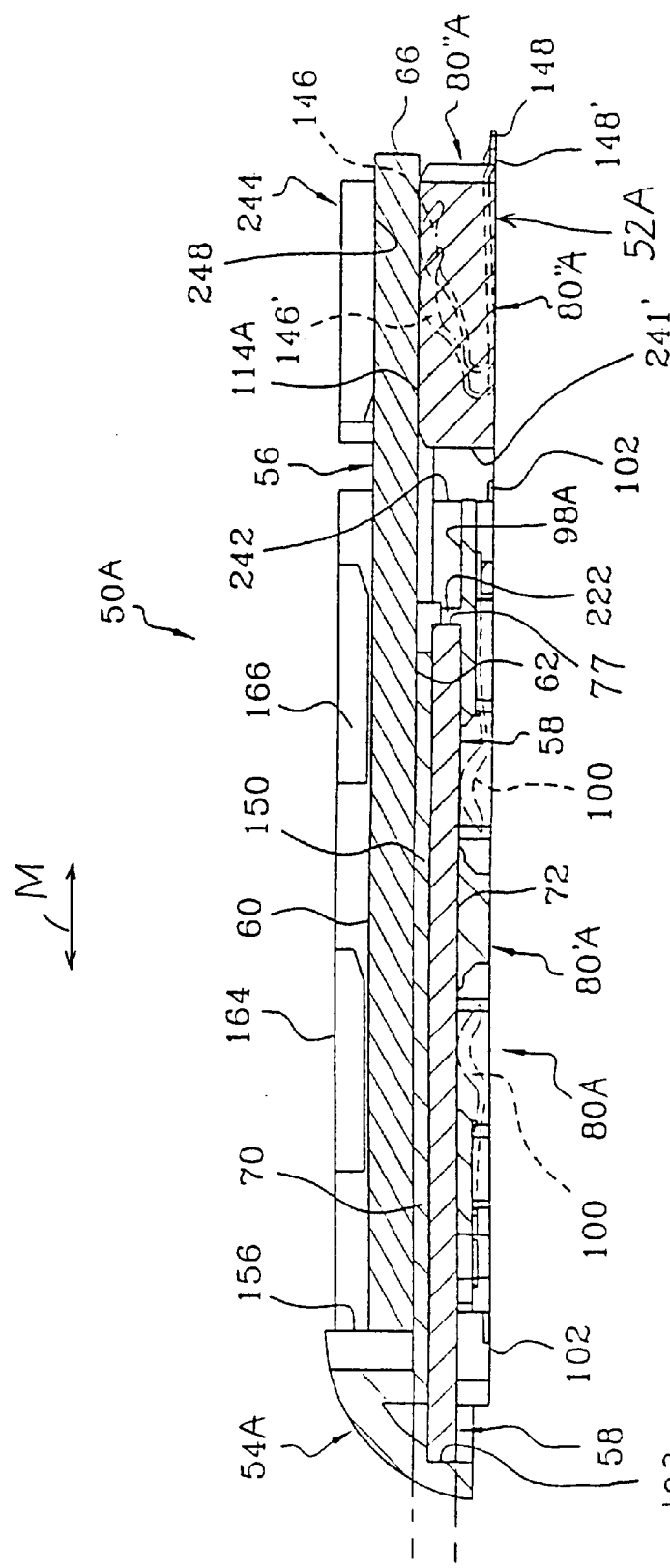
FIG. 37 is a sectional view of the connector body of FIG. 25, with the card-holding unit FIG. 25C fully installed therein and with cards in each of the compartments of the unit.

FIG. 37 shows the entire connector 50A with the upper and lower cards 56, 58 fully installed on the unit 54A, and the unit fully installed on the connector body 52A. The front edge 66 of the upper (MMC) card 56 lies far forward of the front edge 77 of the lower (MICROSIM) card. This allows the upper card to engage the upwardly-facing face 114A and the contact ends that project slightly above it, while the lower card can engage the upper face 98A and the contact ends that project slightly above it. It is noted that when a card active face engages a connector body face, the faces lie very close, but may not actually touch one another since the contact ends push the faces apart.

FIG. 25 shows that there are right angle pieces 244 at opposite sides of the front part 80"A to hold down the front end of the upper card.

Figure 44:
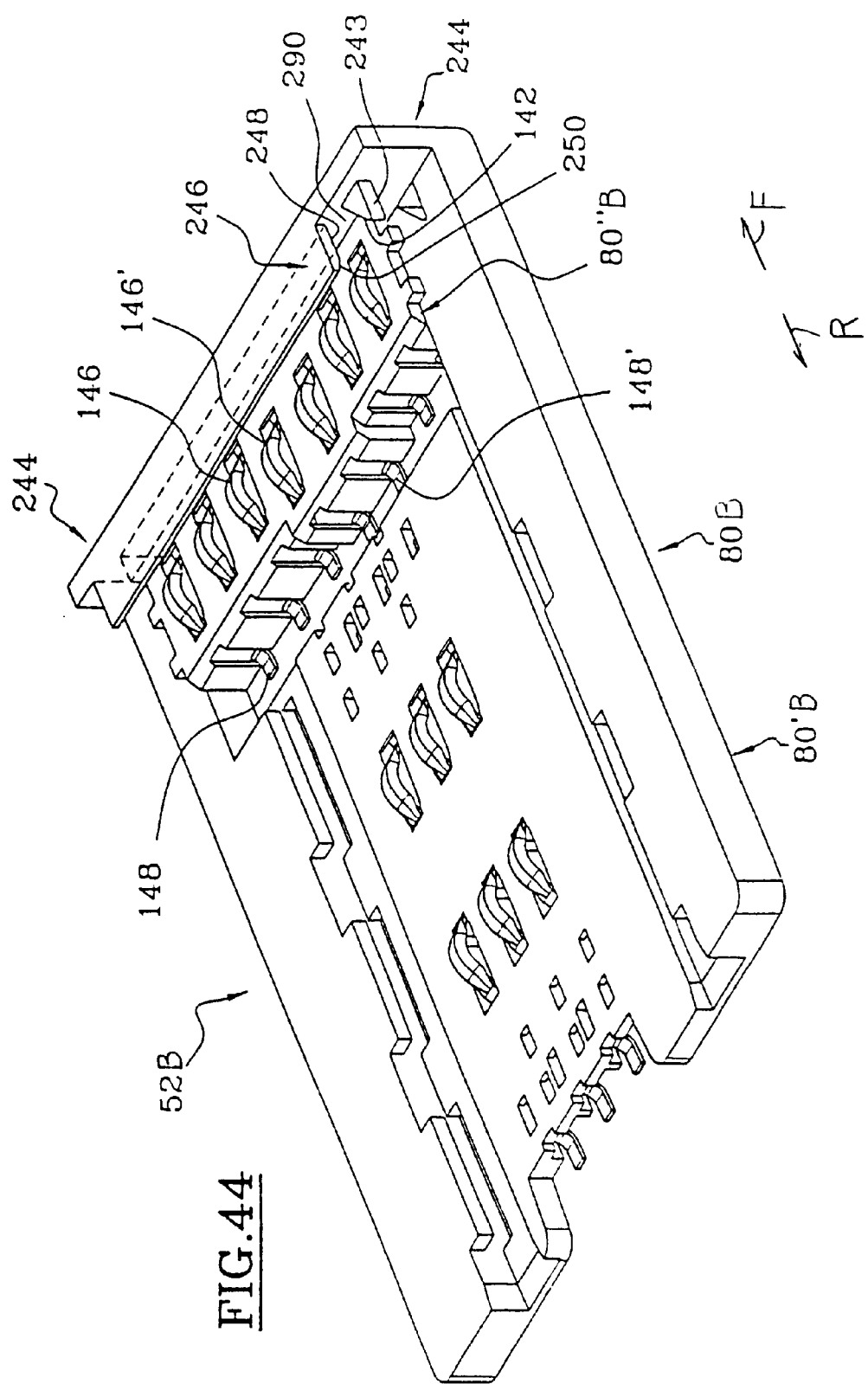
FIG. 44 is a rear and top isometric view of a connector body of a third embodiment of the invention.
Figure 45:
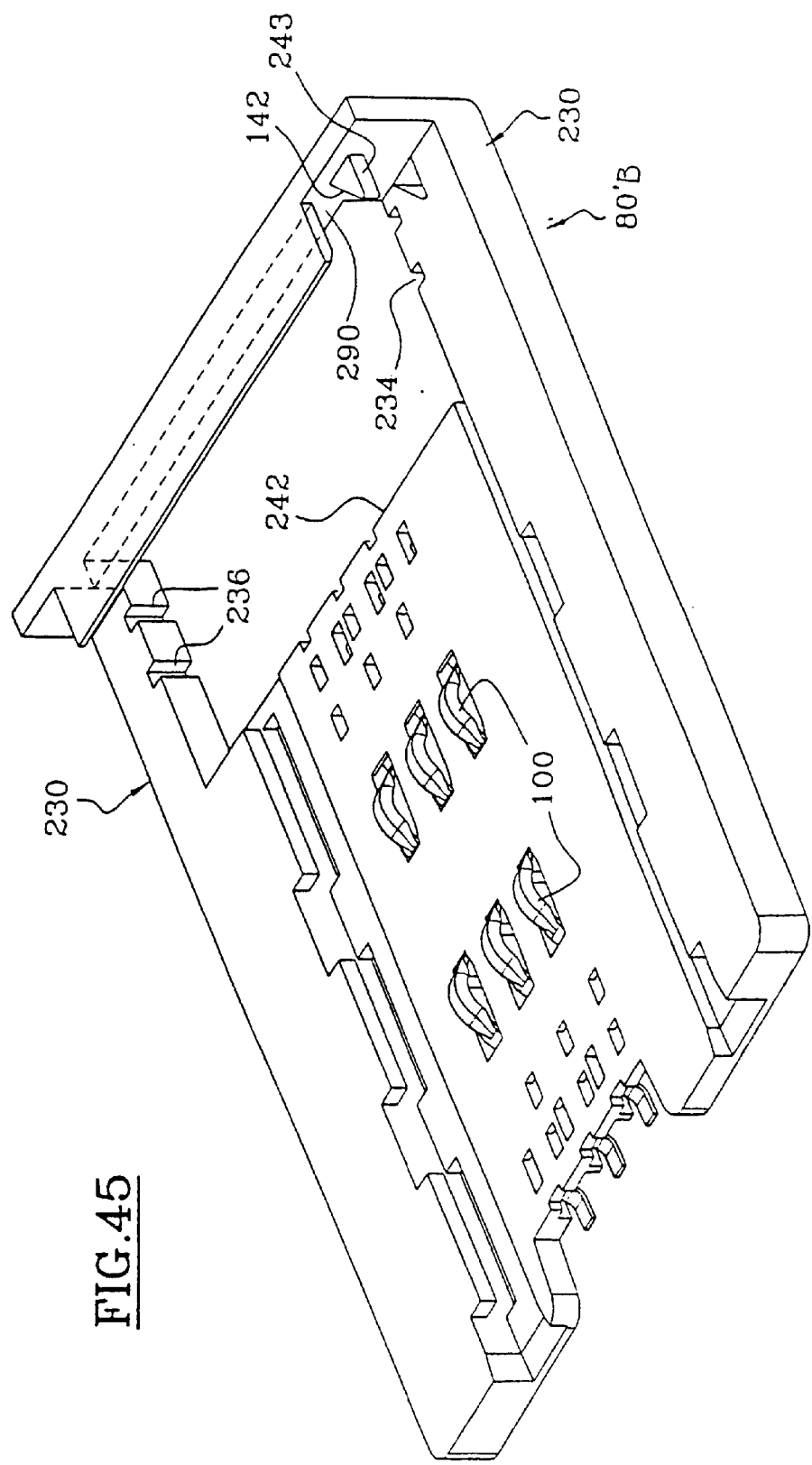
FIG. 45 is a view of the connector body of FIG. 44 without the front contact block.
Figure 46:
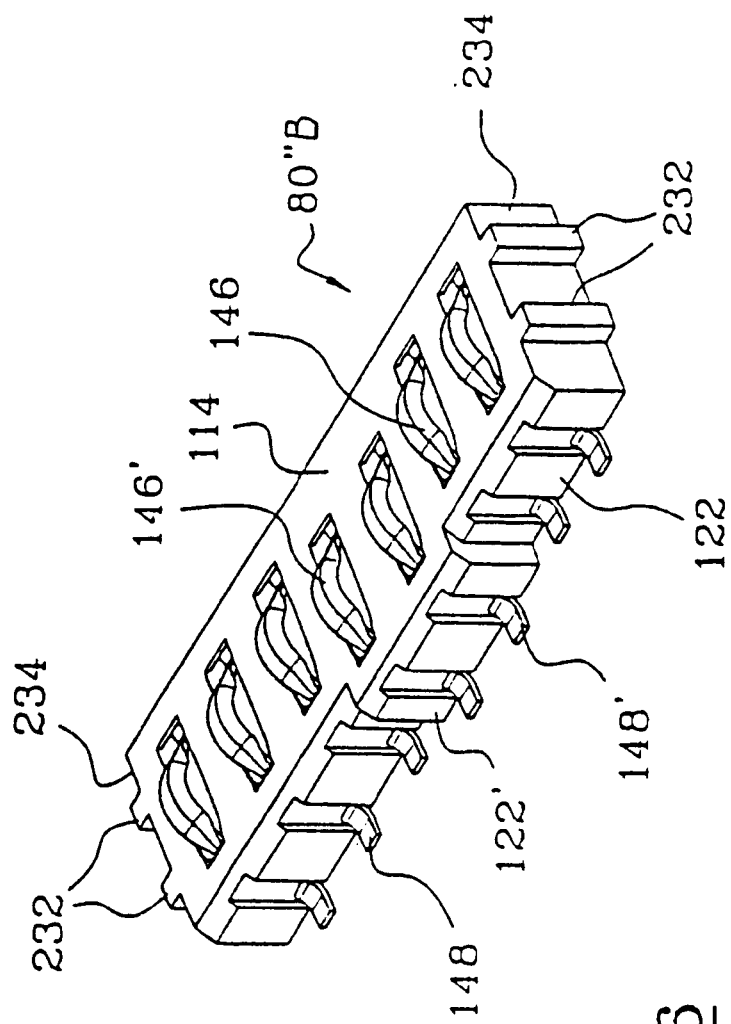
FIG. 46 is a front and top isometric view of the front contact block of FIG. 44.

FIG. 44 shows another connector body 52B that is similar to that of FIG. 25, but with a front upper part 246 of the lower body part 80'B that presses down the front end of the upper card. The upper body part is shown in FIG. 46 at 80"B.

Figure 56:
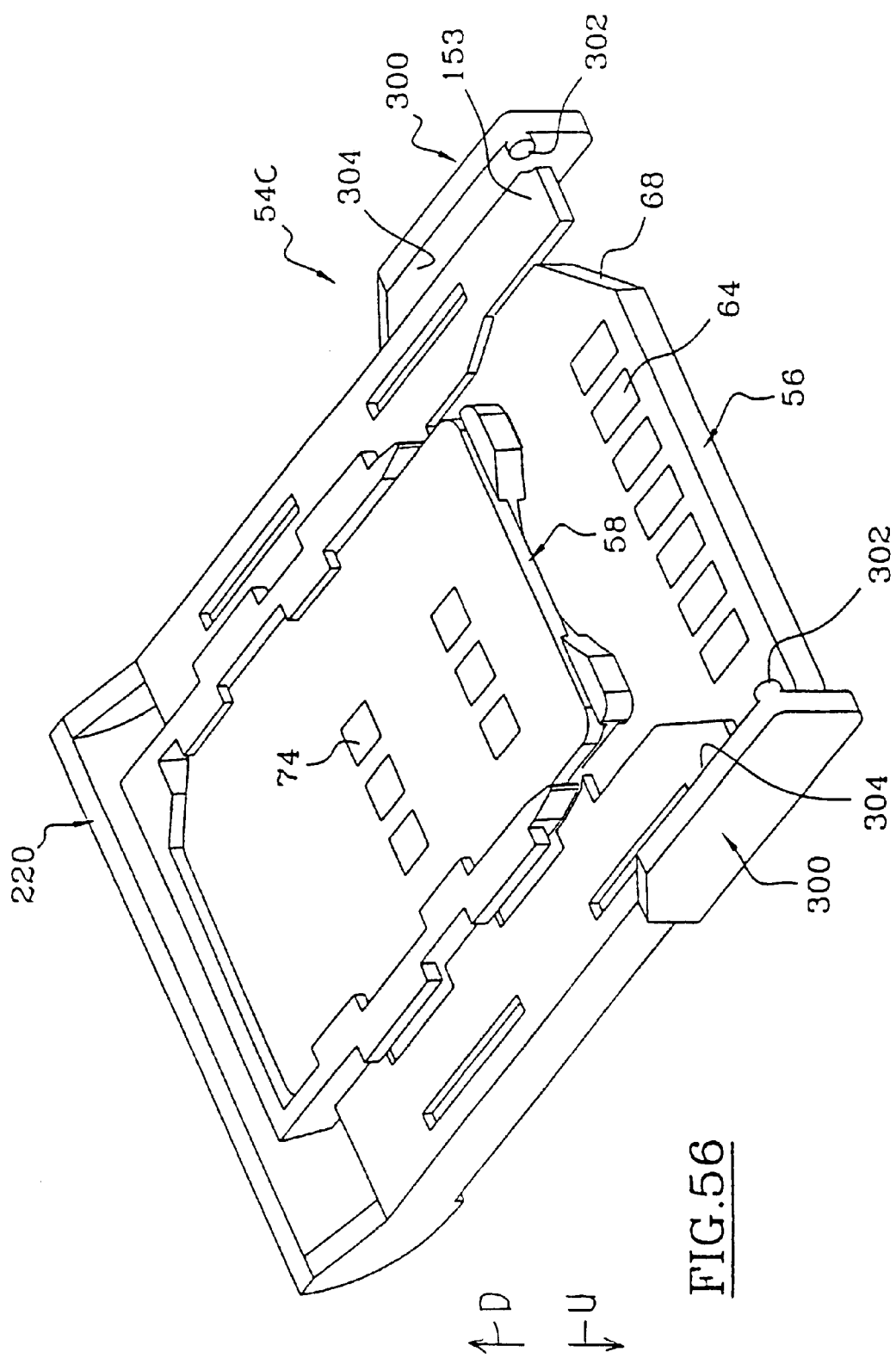
FIG. 56 is an isometric view of a card-holding unit of a connector of another embodiment of the invention, shown in an upside-down position.
Figure 57:
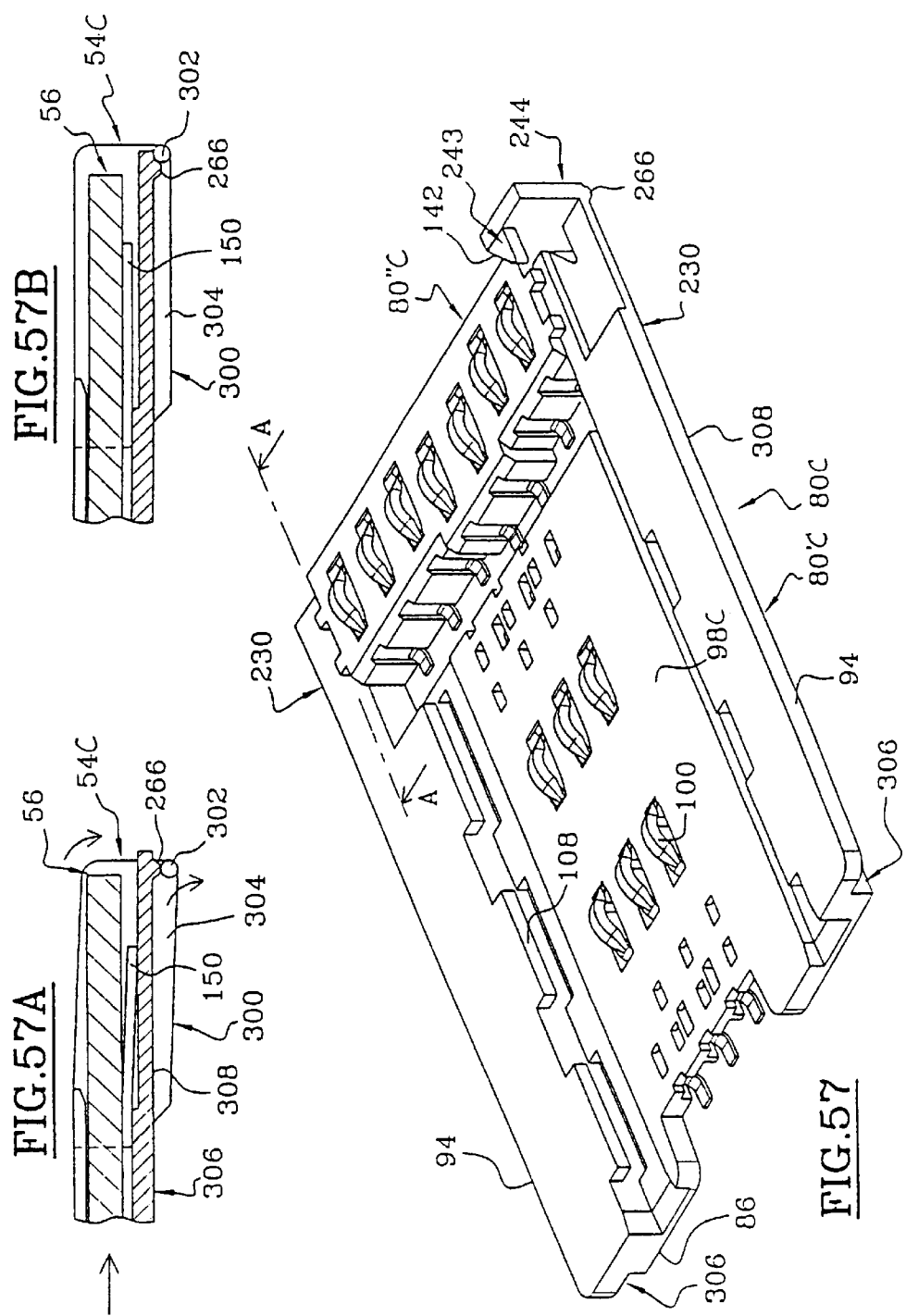
FIG. 57 is an alternative connector body which is slightly modified from the connector body of the embodiment of FIG. 44, and which is used with the card-holding unit of FIG. 56.

FIG. 57 shows another connector body with a lug 266 for holding the card-holding unit in its fully installed position. FIG. 56 shows the card-holding unit 54C with a finger 302 that can engage the lug. FIGS. 57A and 57B show the process of engagement.

Figure 61:
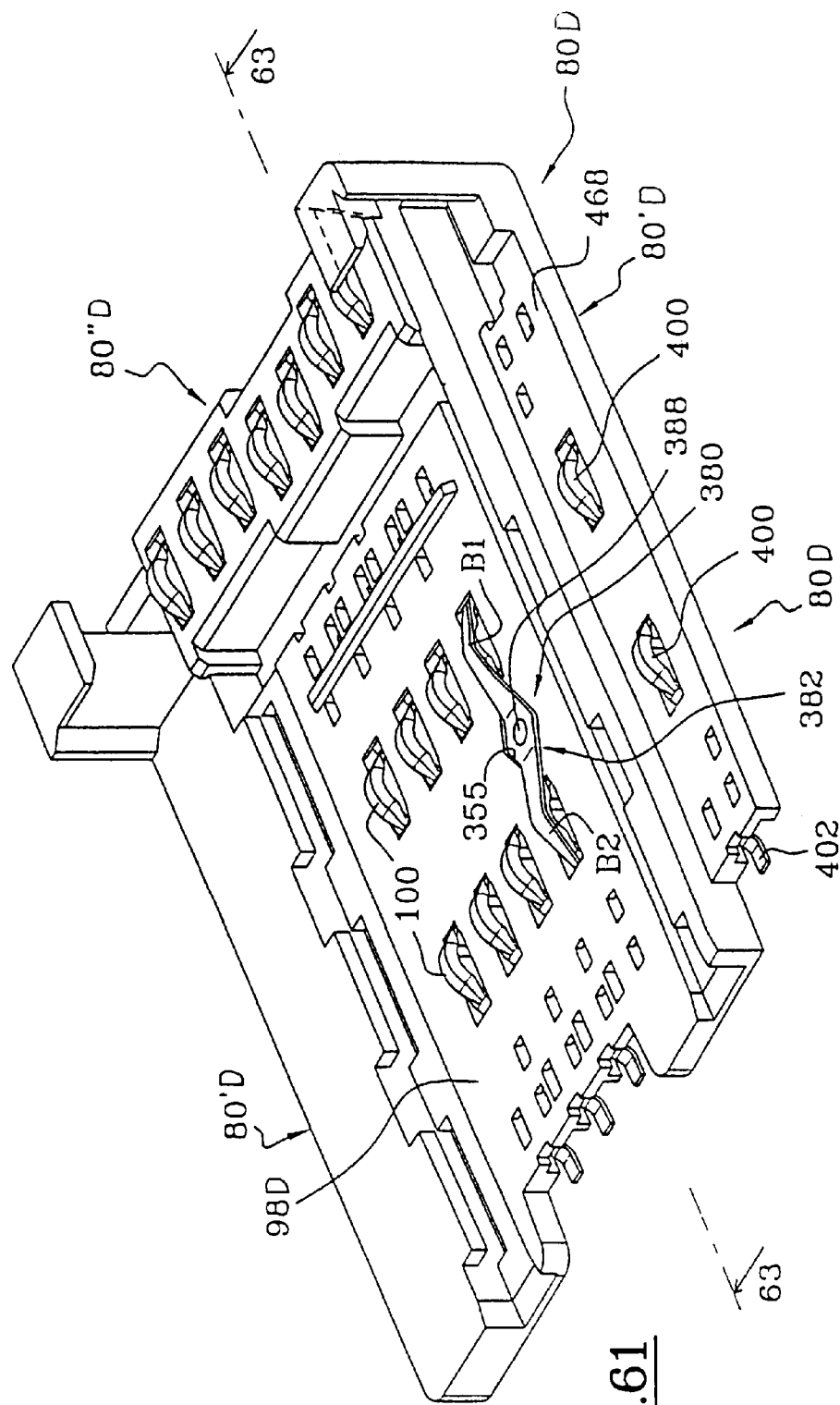
FIG. 61 is a rear and top isometric view of a connector body of an alternative embodiment of the invention which is similar to that of FIG. 25, except that it includes a switch of the normally-open type for detecting the presence of a MICROSIM card.
Figure 62:
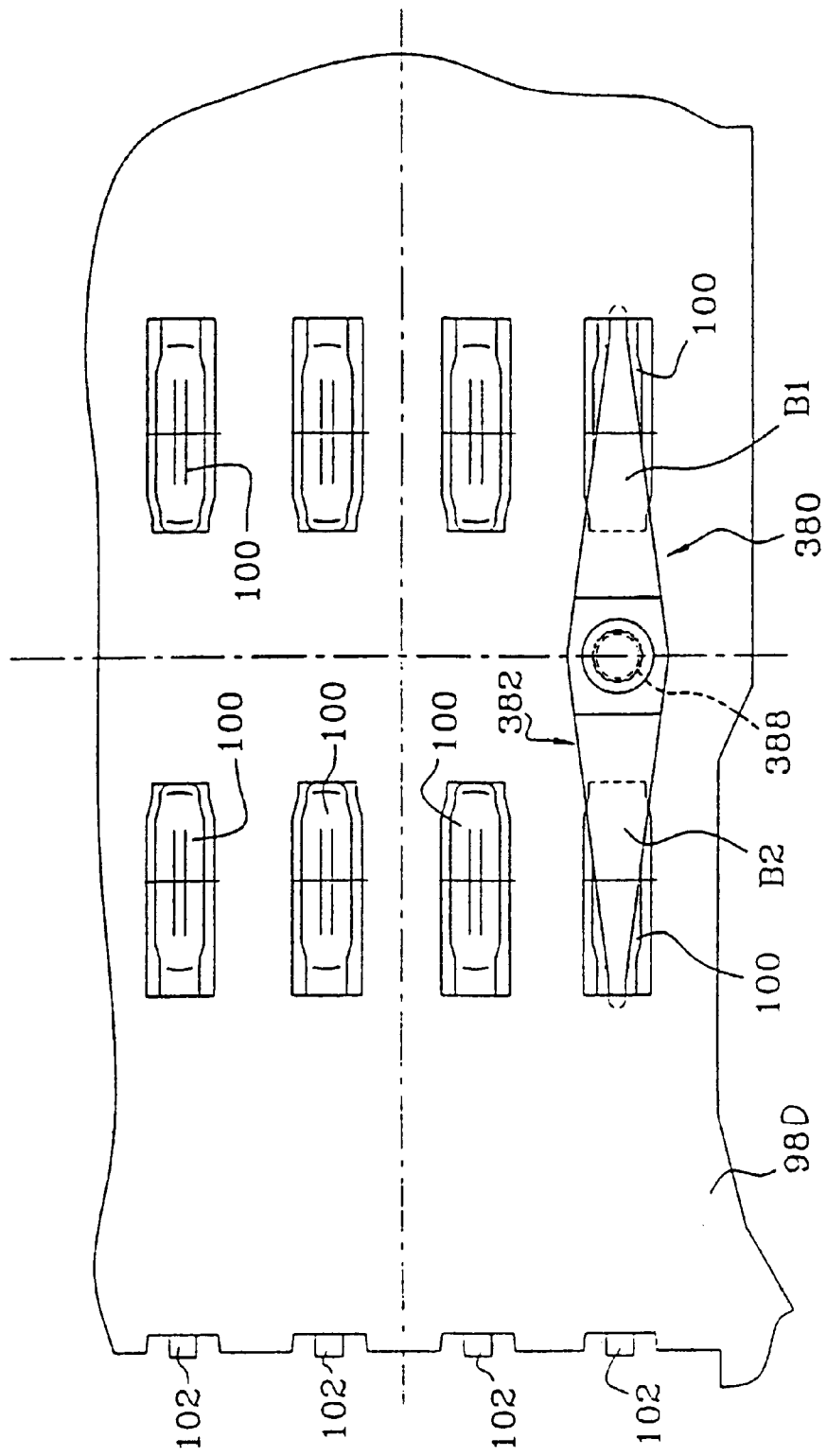
FIG. 62 is an enlarged partial plan view of the switching blade of the switch of the connector body of FIG. 61.
Figure 63:
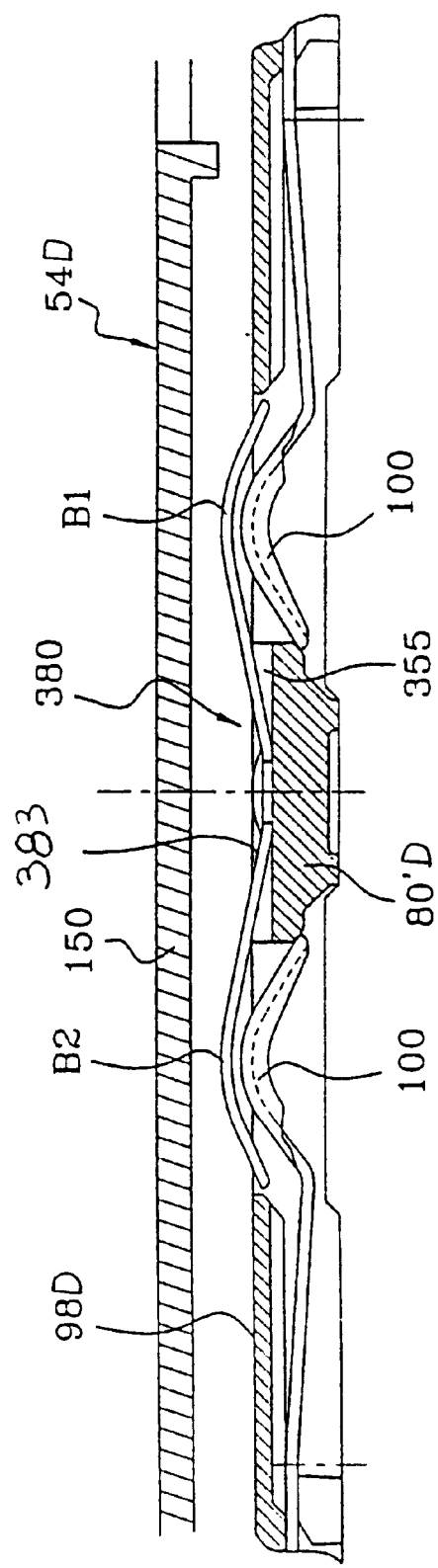
FIG. 63 is a sectional view of the connector of FIG. 62, without the card-holding unit or cards in place.
Figure 64:
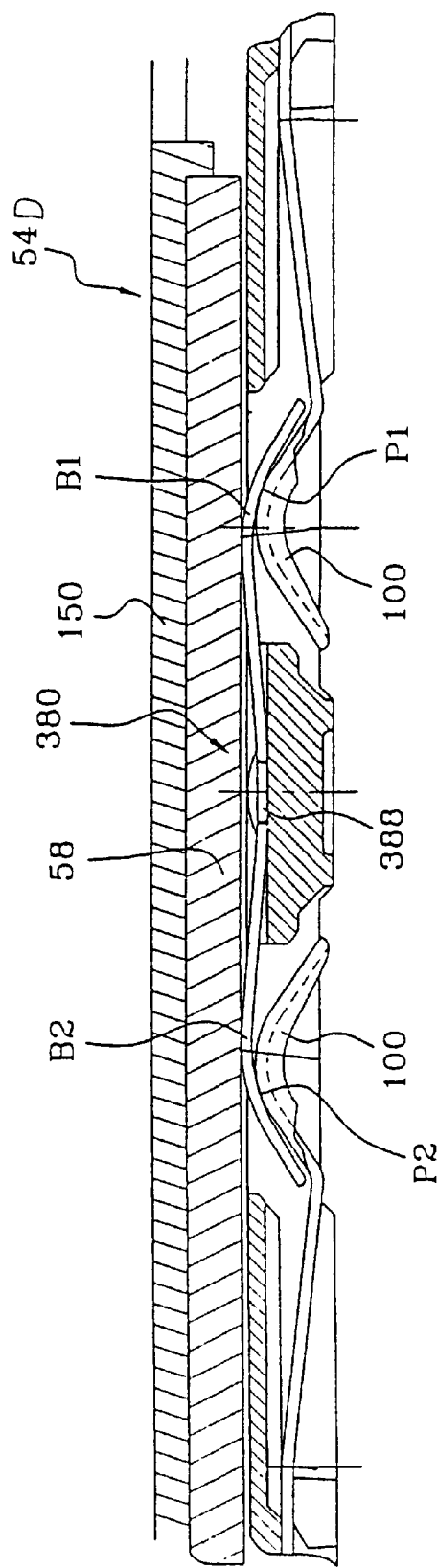
FIG. 64 is a view similar to FIG. 63, but with a MICROSIM card fully installed in the card-holding unit and the unit installed on the connector body.

FIG. 61 shows a connector body 80D with a switch 380 that detects the presence of the lower MICROSIM card in the connector body. The switch includes a blade 382 with a pair of beams B1 and B2 that lie over corresponding contact ends 100. FIG. 63 shows that the beams B1, B2 initially lie above and out of engagement with the corresponding contact ends 100. FIG. 64 shows that when the lower MICROSIM card 58 in installed, it depressed both beams B1, B2 to cause them to engage the two contact ends 100. Electrical connections between the two contact ends 100 enables a circuit to detect the presence of the MICROSIM card. It is possible to have the switch blade 382 permanently engage one of the contacts and have only one of the beams B1 or B2 be downwardly deflected against one of the contact ends by the presence of the lower card.

Figure 65:
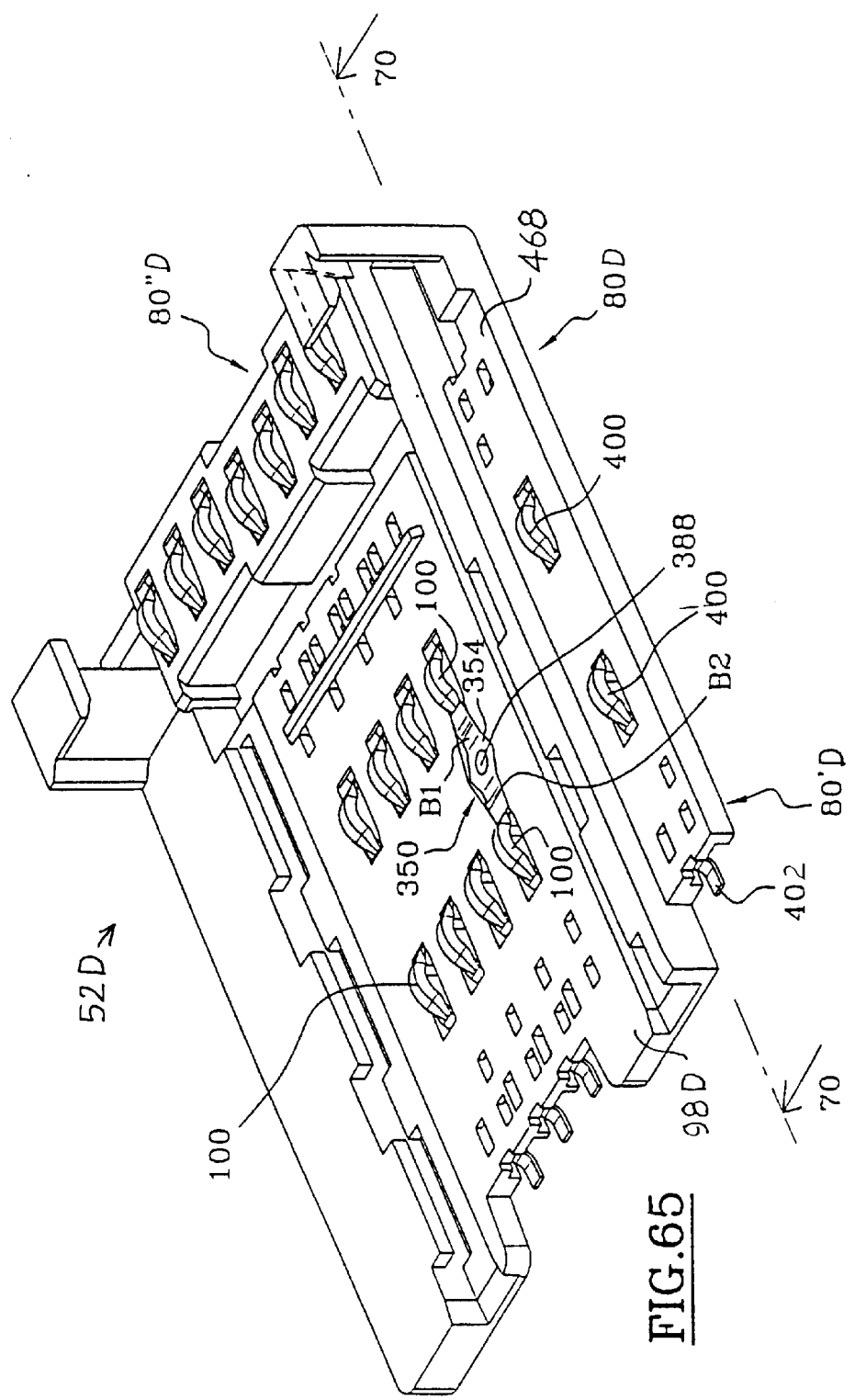
FIG. 65 is a front and top isometric view of a connector body similar to that of FIG. 61, but with a modified switch for detecting the presence of a MICROSIM card.
Figure 66:
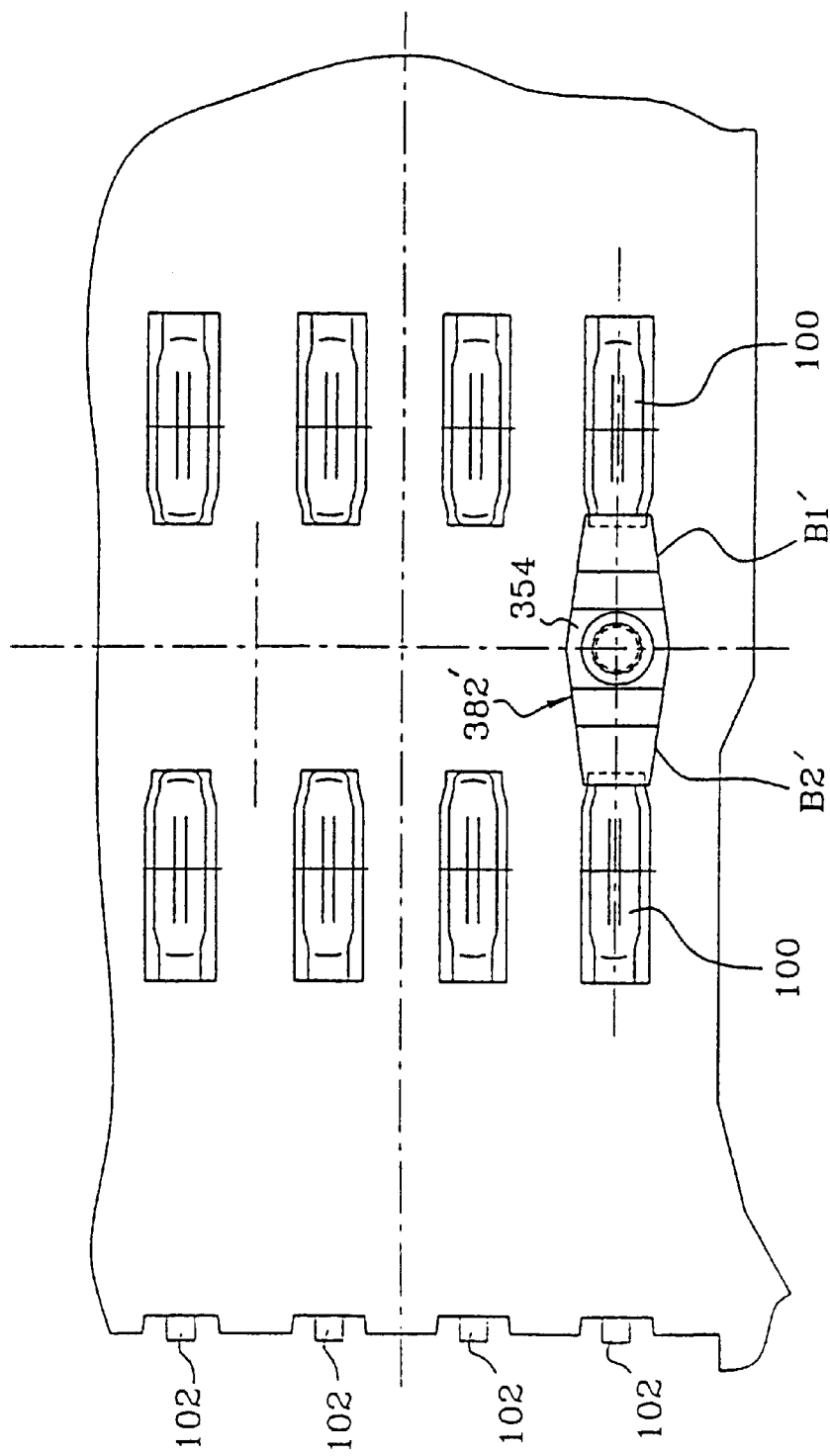
FIG. 66 is a plan view of a portion of the connector body of FIG. 65.
Figure 67:
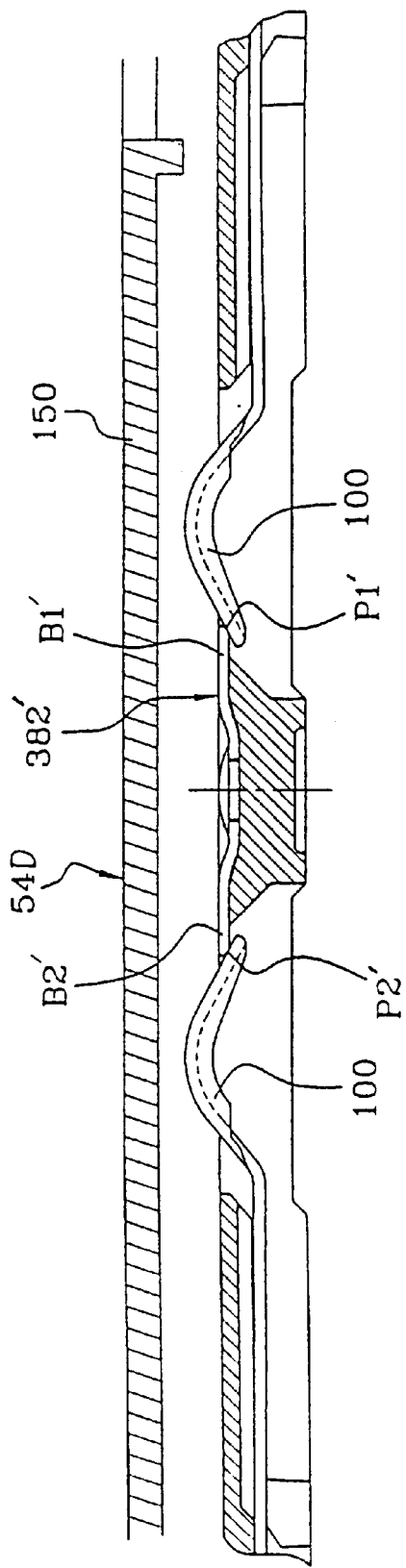
FIG. 67 is a sectional view of the connector body of FIG. 66, prior to insertion of the card.
Figure 68:
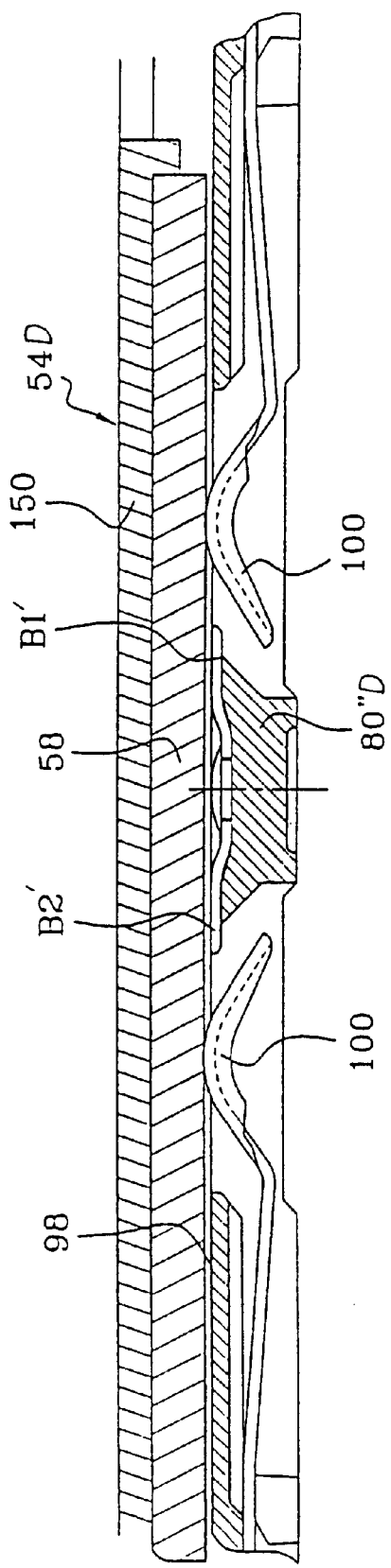
FIG. 68 is a view similar to FIG. 67, but with the MICROSIM card fully inserted and the switch opened.

FIG. 65 illustrates the connector body 52D with another switch 350 that includes a contact blade with a pair of beams for the detecting the presence of the lower card. As shown in FIG. 67, the pad-engaging ends 100 of the two contacts initially engage both of the beams or parts B1', B2'. However, as shown in FIG. 68, when the lower card 58 is installed, it deflects both contact ends 100 out of engagement with the beams.

FIG. 70 illustrates a switch blade 482 that enables detection of an upper card in the card holding unit 54D. When no card is present in the upper chamber, then the switch blade 482 lies at a high level and will not depressed the contact ends 400 when the card-holding unit 54D is installed. However, FIG. 71 shows that when the upper card 56 is present and the card-holding unit 25 is installed, the card 56 depresses the switch blade, causing it to engage both contact ends 400 and electrically connect them. FIG. 65 shows that the contact ends 400 lie at a side platform that is laterally spaced from the contact ends 100 that engage the lower card.

Figure 72:
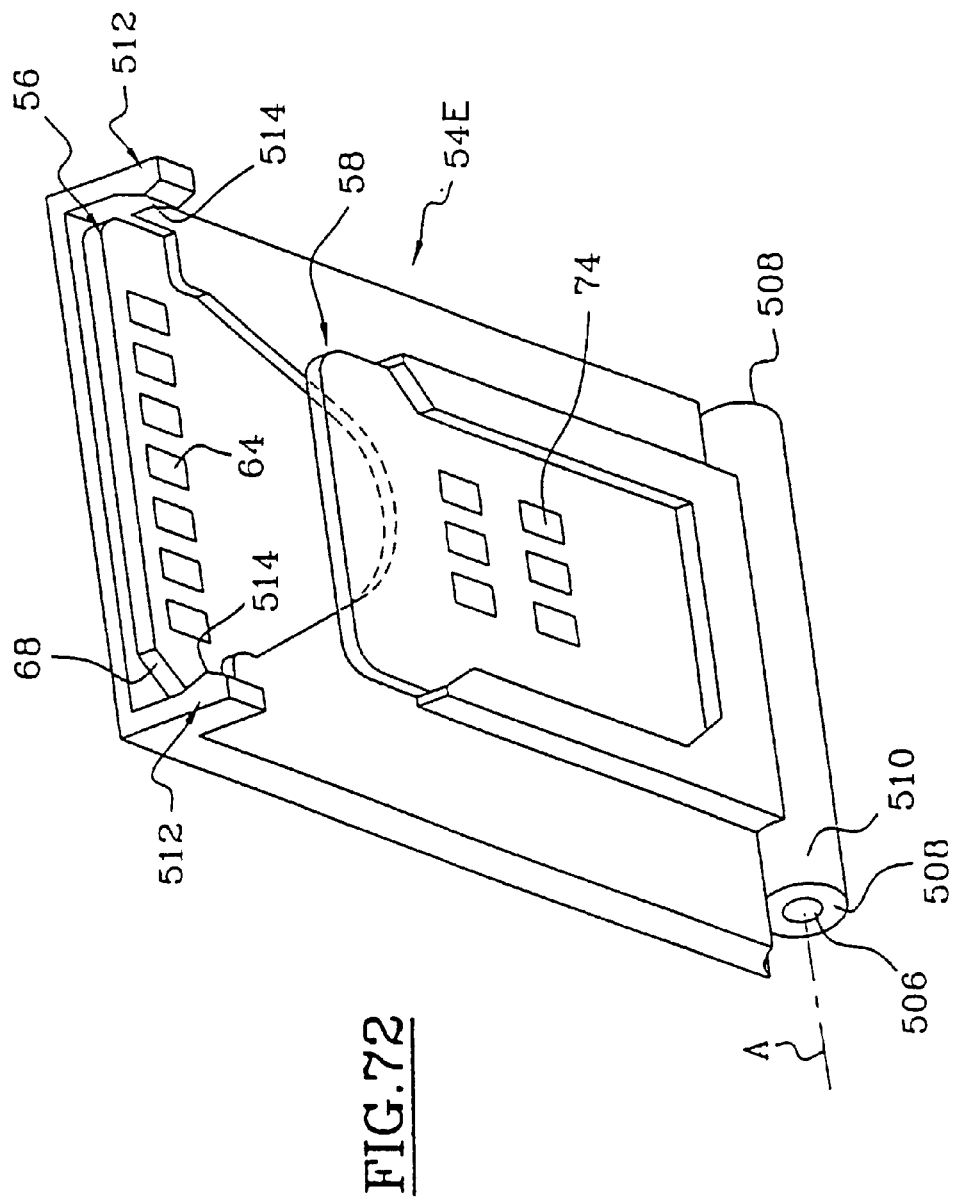
FIG. 72 is a bottom and front isometric view of a card-holder unit which is designed for pivotal mounting on a connector body.
Figure 73:
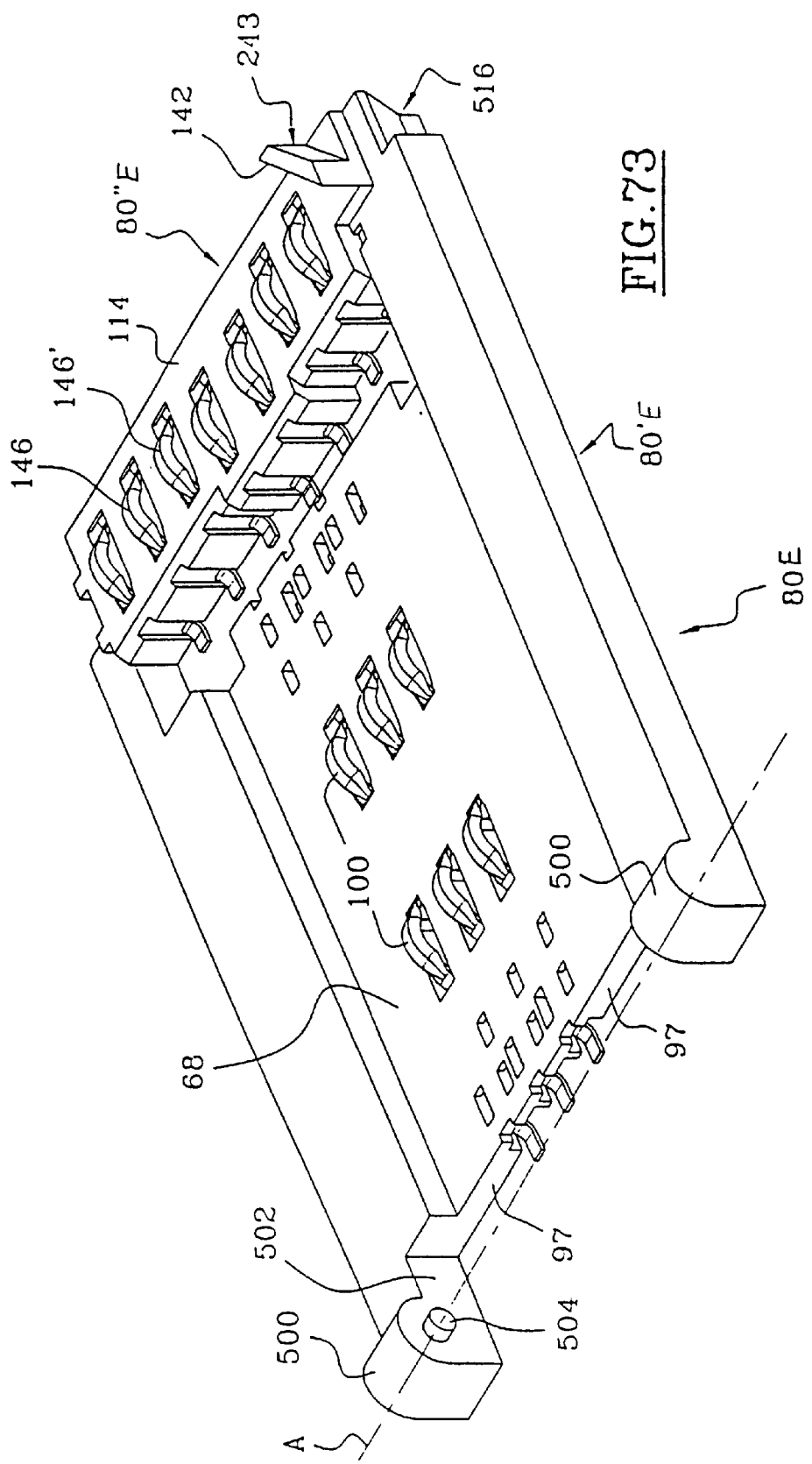
FIG. 73 illustrates a connector body designed for a pivotal connecting to the card-holding unit of FIG. 2.

FIG. 72 shows a card-holding unit 54E that can be pivotally connected to the connector body at holes 506. FIG. 73 shows that the connector body 80E has lugs or trunnions 504 that pivotally engage the card-holder unit. Catches 514 (FIG. 72) hold down the front end of the card-holder unit.

Figure 75:
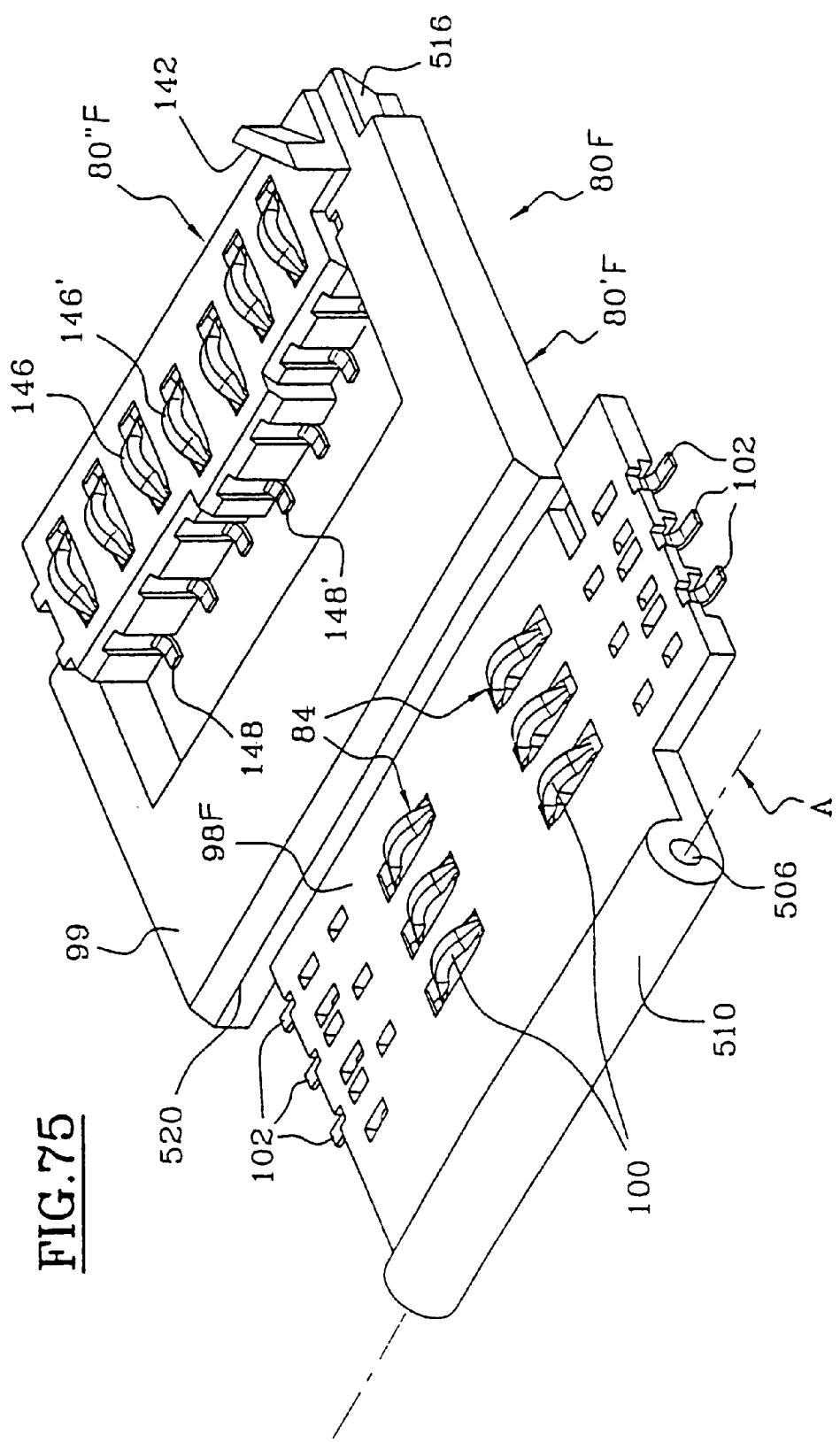
FIG. 75 is a top and rear isometric view of a connector body that can be used with the card-holding unit of FIG. 74.

FIGS. 74–76 show another connector body 80F and card-holding unit 54F wherein the cards are in different orientations. In FIG. 74, the MMC card 56 has its contact pads 64 in a laterally-extending row at the front end of the unit, while the MICROSIM card 58 has its contact pads 74 in two longitudinally M extending rows at one lateral side of the unit. FIG. 76 shows that there is no partition wall between the cards, 56, 58.

Thus, the invention provides a compact electrical connector for making electrical connections with contact pads on the active faces of at least two thin and flat circuit cards, with the two cards usually being of two difference types. The connector can be used to connect to only one circuit card of a particular type at a time, or it can connect to two different cards of two different shapes, or even two cards of the same shape, simultaneously. The connector includes a connector body with an insulative frame and includes first and second sets of contacts with pad-engaging contact ends arranged in predetermined patterns corresponding to the contact pads on the cards. An apparatus for locating the cards against the frame faces can be fixed to the frame, or can be a separate card-holder unit. A separate card-holder unit has card-holding compartments for holding first and second cards against the contact ends. The unit is moveable between a first position at which cards can be installed in its compartments, and a second position at which pads on the cards engage contacts of the connector body. The compartments on the unit hold the cards in parallel planes that are vertically spaced apart, with at least a portion of a card in one compartment lying directly over a card in a second compartment, when the cards lie in horizontal planes. In one arrangement, the card-engaging walls of the body are arranged with a first card-engaging wall facing upwardly and a second card-engaging wall facing downwardly and lying above the first card-engaging wall. In another arrangement, the first and second walls both face upwardly, but with the second wall lying at a higher level than the first wall. The connector can include a switch that detects the presence of the lower card, and/or a switch that detects the presence of the upper card.

While terms such "upper", "lower", "horizontal", etc. has been used in describing the relative positions of parts, it should be understood that the connector can be used in any orientation with respect to the Earth.

DETAILED DESCRIPTION OF PREFERRED EMBODIMENTS OF THE INVENTION

In the description which follows, identical, similar or analogous components and elements will be denoted by the same reference numbers.

The terms front, rear, vertically, horizontally, upper, lower, etc., will be used with reference to the appended drawings for the purpose of simplifying the description and the claims and to make them easier to understand.

A first embodiment of the invention, illustrated in FIGS. 1 to 24, will now be described.

As may be seen in FIG. 2, the electrical connector 50 according to the invention essentially consists of a connector body 52 and of a card-holder charger 54 in the form of a slide-in unit which is intended to hold one or two cards having integrated circuits, especially a card 56 of the MMC type and a card 58 of the MICROSIM type.

Figure 23:
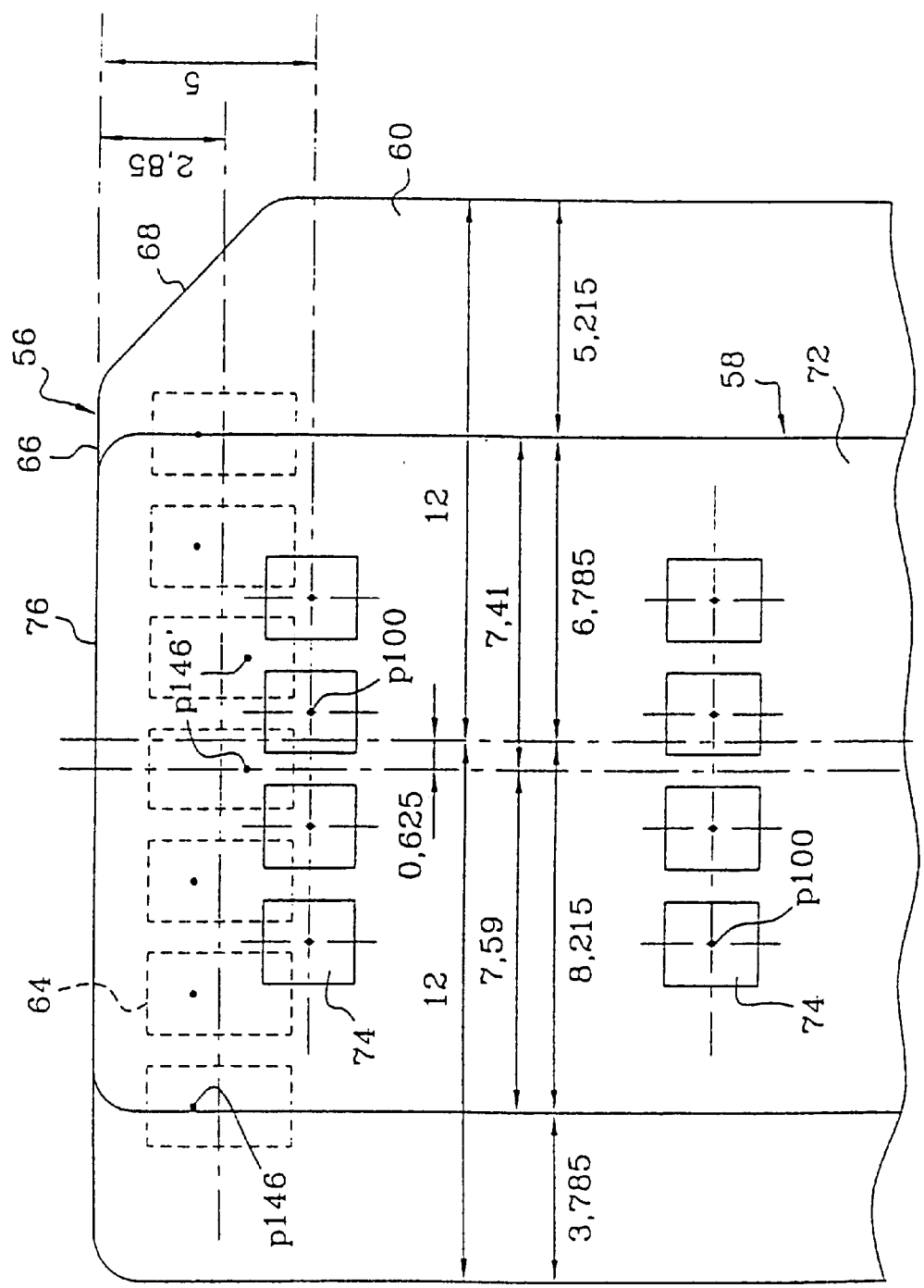
FIG. 23 is a diagrammatic view which illustrates the front portions of the MMC and MICROSIM cards, showing the relative positions that they and their contact pads occupy in the card-holder unit.

The MMC card 56 is of a known and standardized general design and has a rectangular general shape comprising a first plane large face 60, this being an "inert" face which, in the first embodiment, will be the lower face of the MMC card 56, and an upper opposite second plane large face 62, this being the "active" face which carries the contact pads 64 which are aligned longitudinally near the front end transverse edge 66 of the card, there being seven of these pads here (see especially FIG. 23).

The MMC card 56 includes, in its front end edge 66, a 45° cut corner 68 for polarizing the orientation of the card.

Likewise, and as may be seen especially in FIGS. 12 and 23, the MICROSIM card 58 is of known and standardized general design and is of a rectangular general shape having a first plane large face 70, this being an "inert" face which is the lower face of the MICROSIM card 58, and an upper opposite second plane large face 72, this being the "active" face which carries the contact pads 74 which are aligned longitudinally in four pairs whose standardized positions are defined with respect to the rear transverse edge 77 which has the cut corner 78 for polarizing the orientation of the card.

The connector body 52 illustrated in the figures is produced by moulding two parts—the lower part 80 and the upper part 82—in an insulating plastic, these parts being produced separately and then joined together.

Figure 19:
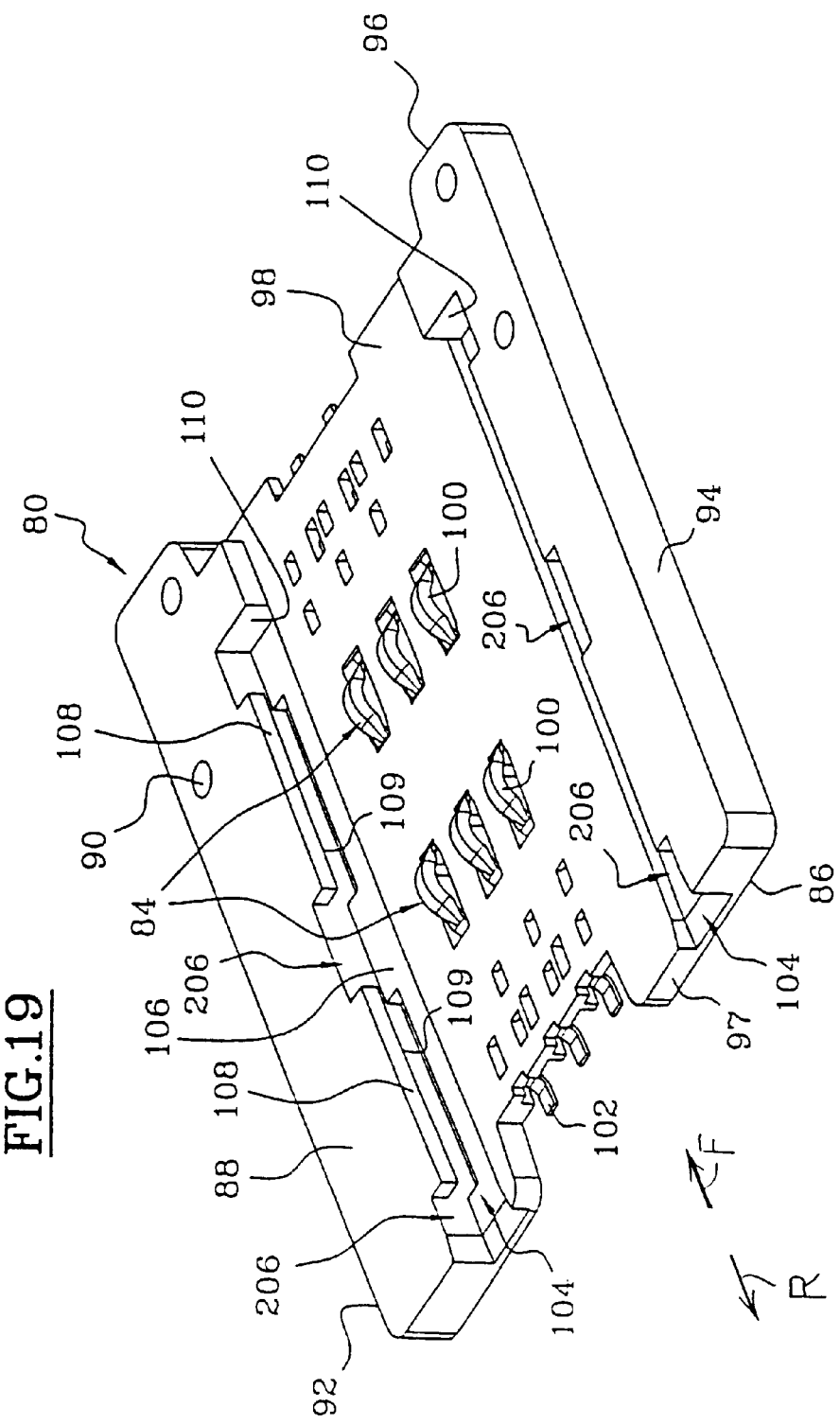
FIG. 19 is a rear and top isometric view of the lower part of the connector body of FIG. 1.
Figure 20:
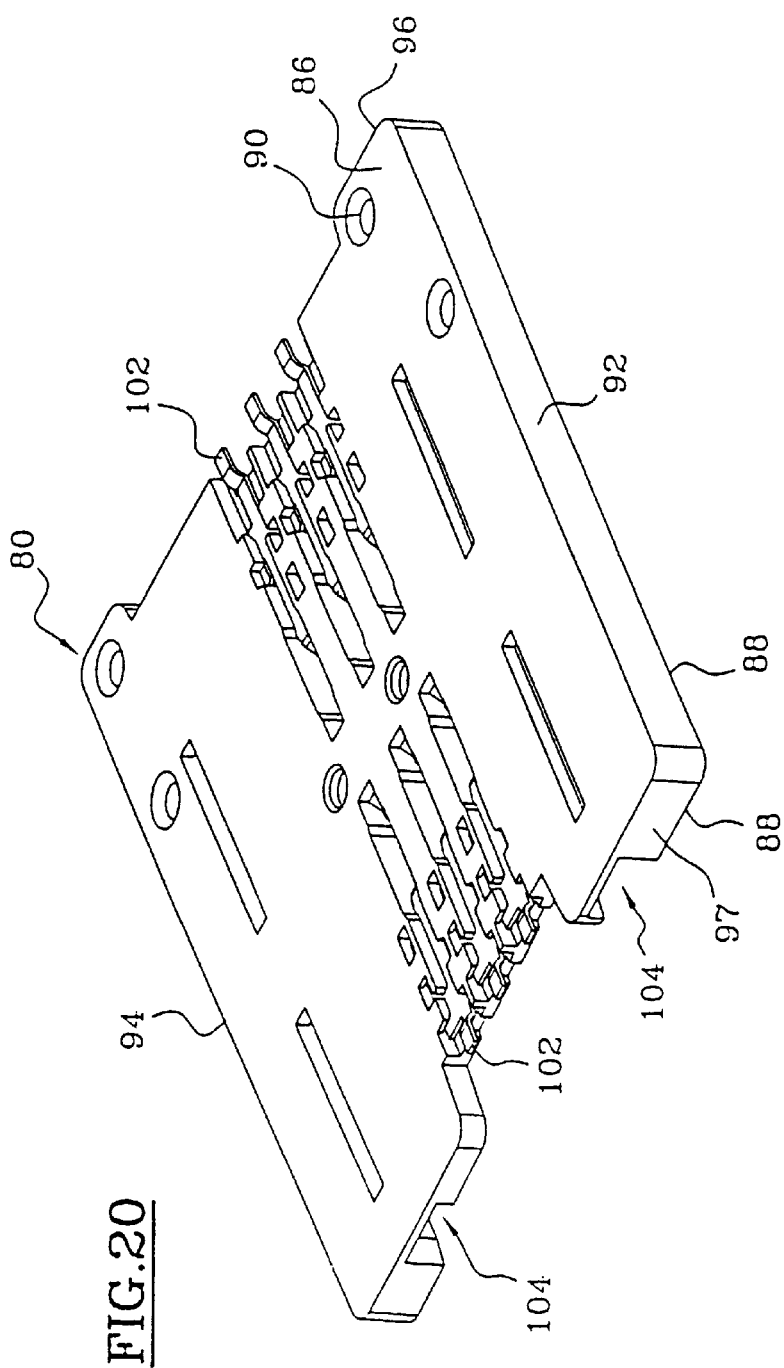
FIG. 20 is a rear and upside-down view of the connector lower part of FIG. 19.

As may be seen especially in FIGS. 19 and 20, the lower part 80 is a piece in the form of a plate forming a support for the electrical-contact elements 84 of known general design for electrical connection to the contact pads 74 on the MICROSIM card 58.

The lower part 80 is thus bounded by a plane lower face 86 intended to bear against a facing face of a printed-circuit board P (shown in FIG. 24) belonging, for example, to a device for exchanging data with the memories formed by the integrated circuits of the MMC card 56 and the MICROSIM card 58.

The lower part 80 is also bounded by a parallel plane upper face 88 forming the bearing and mounting face for the upper part 82. For this purpose, the lower part 80 has four vertical through-holes 90 which are arranged in pairs near the lateral edges 92 and 94 and close to the front transverse edge 96 of the lower part 80.

The plane upper face 88 has, in its central part, and over the entire length, a recess which is bounded vertically downwards by a horizontal plane face 98 from above which project, vertically upwards, the contact ends 100 of the contact elements 84.

In a known general manner, each contact element 84 has a connection end 102 (for connection to a conducting track on the printed-circuit board P) which is bent so as to extend approximately in the plane of the lower face 86 close to the front transverse edge 96 and to the rear transverse edge 97.

The horizontal face 98 forms a bearing face for the lower face 72 of the MICROSIM card 58 when the latter is in position in the connector 50.

On each side of the bearing face 98, the lower part 80 has two rails or grooves 109 for bayonet mounting of the card-holder slide-in unit 54. Each groove 104 is bounded downwards by a bottom 106 and upwards by two tabs 108. Each groove 104 is open and chamfered at its rear end and closed by a transverse stop face 110 at its front end.

Figure 21:
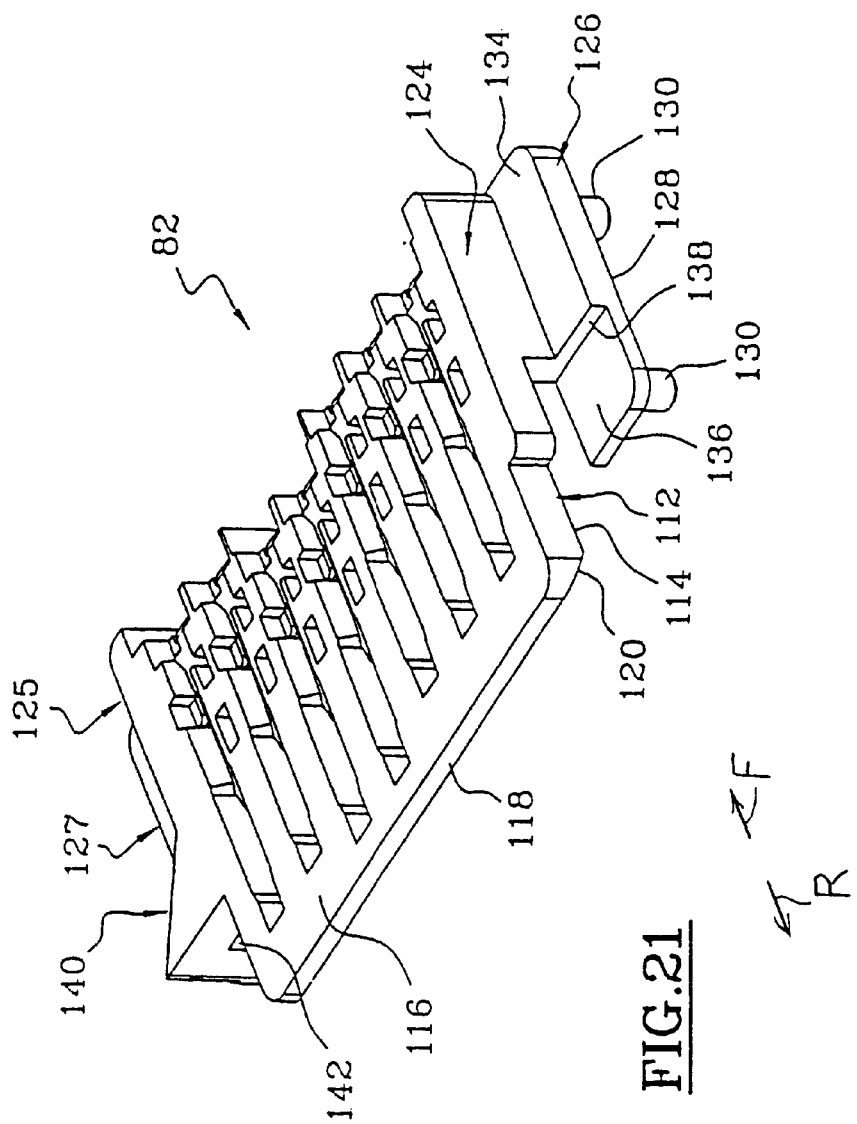
FIG. 21 is a rear and top isometric view of the upper part of the connector body of FIG. 1.

The upper part, illustrated especially in detail in FIGS. 21 and 22, also essentially consists of an upper piece in the form of a plate 112 which is bounded vertically by a lower plane face 114 and by an upper plane face 116. Near the rear transverse edge 118 of the plate 112, the lower face 114 has a chamfer 120 for insertion of the card-holder slide-in unit 54.

At its front end, the upper part 82 has a transverse vertical wall 112 which extends vertically downwards from the lower face 114.

Laterally, the upper part 82 has two vertical and longitudinal walls 124 and 125, each of which is extended, in its lower part, transversely outwards by a horizontal tab 126, 127 for the upper part 82 to bear on and be fixed to the lower part 80.

For this purpose, the horizontal lower faces 128 of the tabs 126, 127 are coplanar in order to bear vertically on the corresponding parts of the horizontal upper face 88 of the lower part 80, each of them having a pair of positioning and fixing studs 130, each of which is designed to be taken through a corresponding hole 90 in the lower part 80 and the lower free end 132 of which is used to fix the two parts 80 and 82 definitively, by hot crimping.

The upper face 134 of the horizontal tab 126 has, at its rear end, a thinned part which defines an upper facet 136 that is offset vertically downwards and bounded longitudinally forwards by a vertical transverse facet 138.

The longitudinal wall 125 is extended at its rear longitudinal end by a vertical wall 140, the internal face of which is inclined at 45° so as to form an internal polarizing facet 142 intended to engage with the cut corner 68 of the MMC card 56 (see FIG. 21).

The upper part 82 in the form of the upper plate 112, in the same way as the lower part 80, bears electrical-contact elements 144 whose curved free contact ends 146 project vertically downwards below the lower face 114, the latter forming a horizontal bearing face for the facing upper face 62 of the MMC card 56.

The front free connection ends 148 of the flexible electrical-contact blades 144 are bent vertically downwards along the corresponding part of the front external face 123 of the vertical wall 122 so as, as may be seen especially in FIGS. 15 to 18, to extend in the same horizontal plane as the connection ends 102 of the electrical-contact elements 84, i.e. approximately in the plane of the lower face 86 of the lower part 80.

Figure 16:
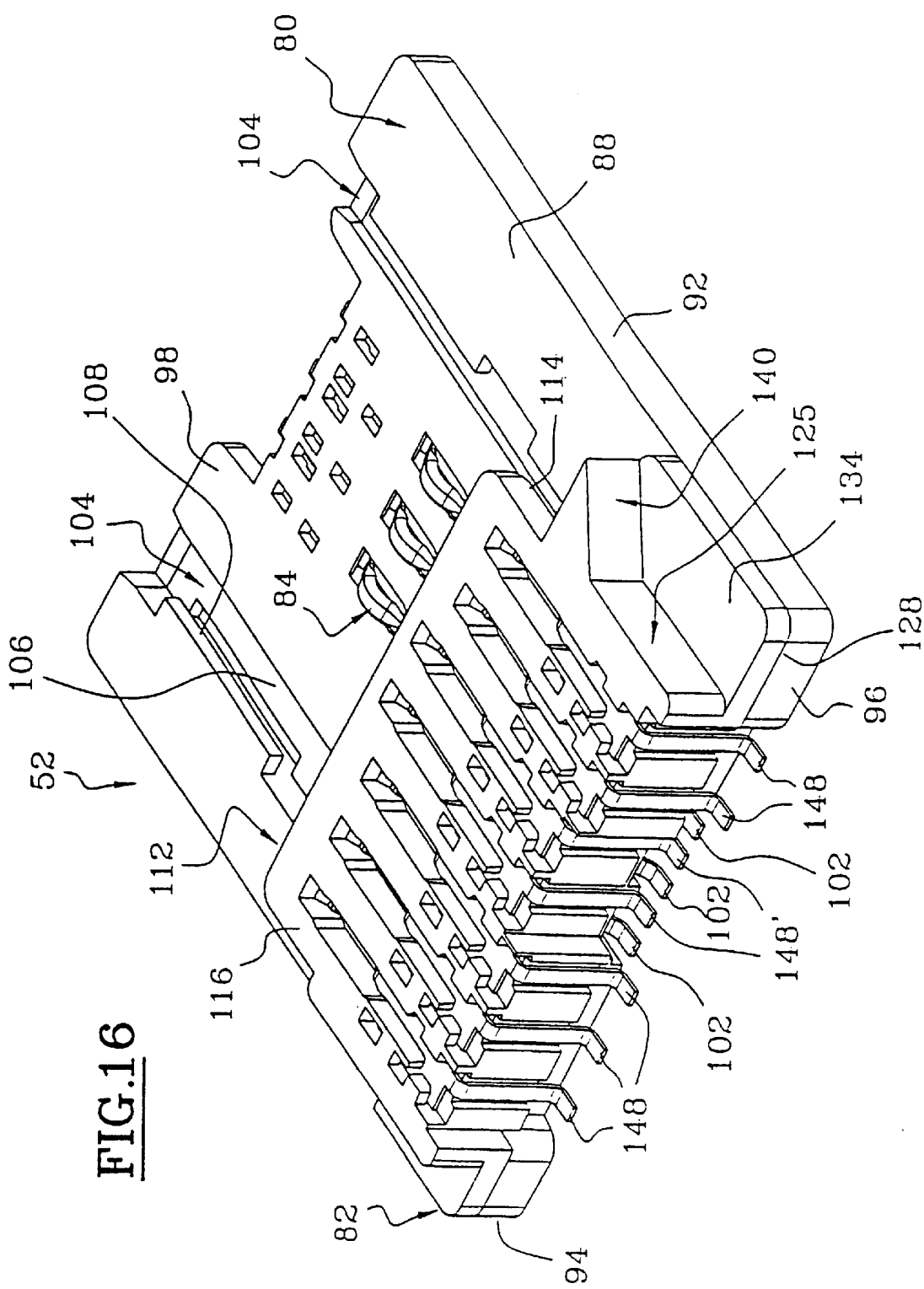
FIG. 16 is a rear and top isometric view of the connector body of FIG. 1.
Figure 17:
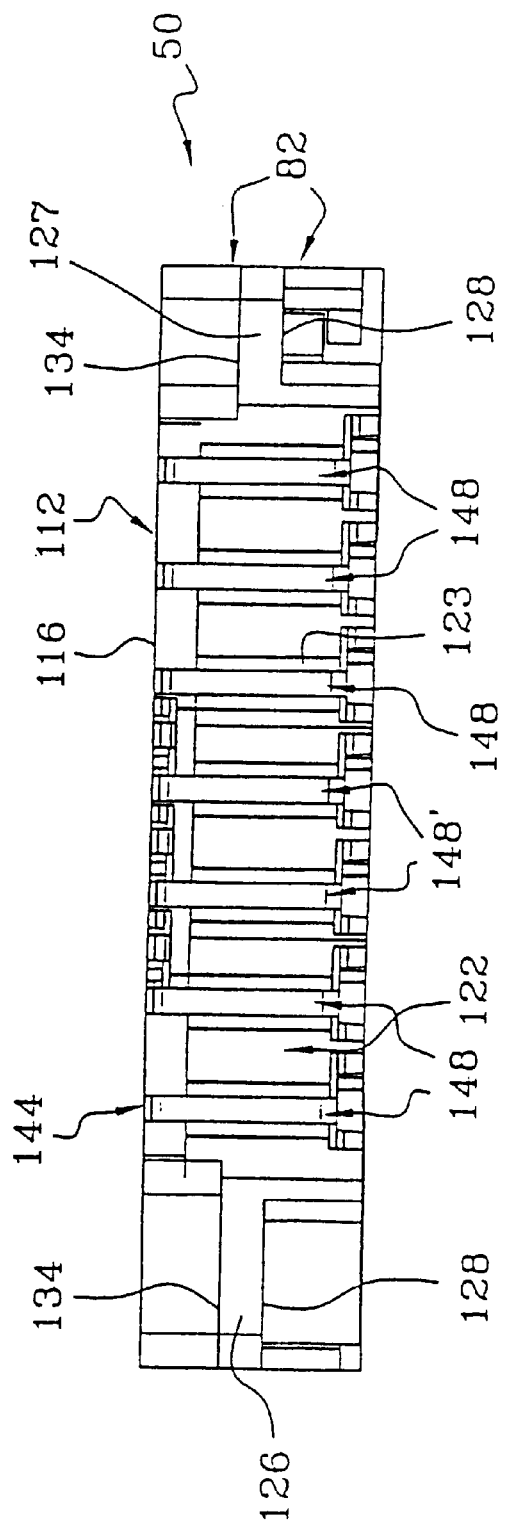
FIG. 17 is a front elevation view of the connector body of FIG. 1, with the card-holder unit fully installed.
Figure 18:
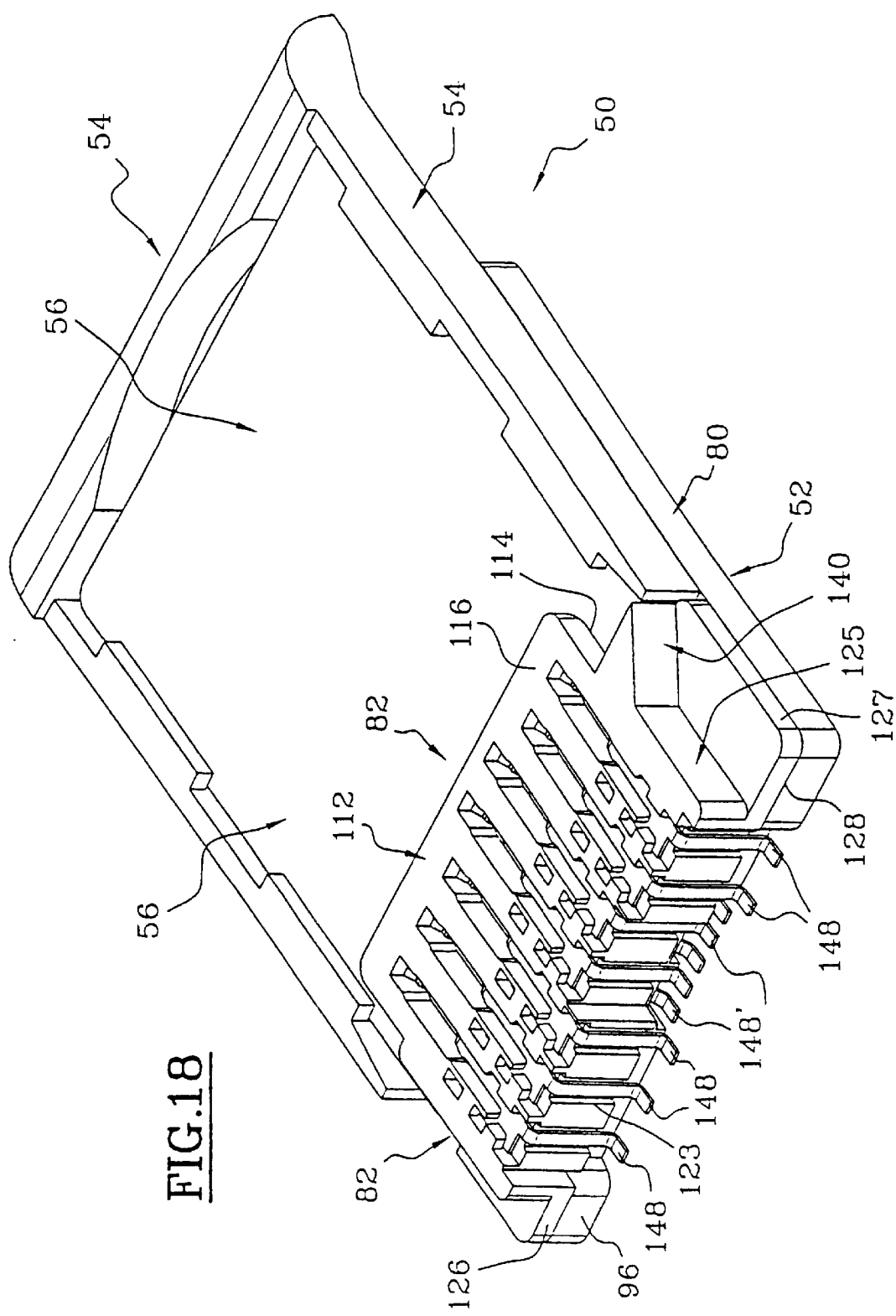
FIG. 18 is a rear isometric view of the body of FIG. 16, but with a card-holder unit fully installed therein, and with cards lying in compartments of the unit.

As may be seen especially in FIGS. 5, 16 and 18, and this being in accordance with the standardization of the method of connecting the MMC card which requires two special contact pads to be connected to a power supply before the other pads are connected, two contact ends 146' are offset longitudinally rearwards with respect to the contact ends 146 of the other five contact elements 144 and in the same manner their associated connection ends 148' are offset longitudinally rearwards with respect to the other five connection ends 148.

In order to use electrical-contact elements 144 all seven of which are identical, the vertical partition 122 has a central part 122' which is offset longitudinally rearwards, As may be seen specifically in FIGS. 4 and 5 and FIGS. 23 and 24, the transverse distances separating the standardized contact pads 64 on the MMC card 56 and 74 from the MICROSIM card 58 are such that it is possible to interpose the two central connection ends 148' of the MMC card between three connection ends 102 of the electrical-contact elements 84 of the front row of the lower part 80 and to longitudinally align these two ends 148' with the three ends 102 between which they are interposed by offsetting longitudinally rearwards (see FIGS. 4 and 5) this group of five connection ends with respect to the other five connection ends 148 which themselves are aligned and offset longitudinally forwards.

The card-holder slide-in unit 54 will now be described in detail with reference especially to FIGS. 9 to 14.

The card-holder slide-in unit 54 is a moulded plastic component which essentially consists of a horizontal plate 150 forming a horizontal partition that separates an upper compartment 152 intended to house the MMC upper card 56 from a lower compartment 154 intended to house the MICROSIM lower card 58.

The upper compartment 152 is generally longitudinally open to the front and is bounded to the rear by a vertical transverse wall 156 having a convex housing 158 in the form of a cylindrical arc, intended to make it easier to extract the MMC card 56.

The upper compartment 152 is bounded transversely by two vertical and parallel longitudinal walls 160 whose facing internal faces 162 form lateral faces for guiding the MMC card 56 longitudinally, the longitudinal and parallel edges 57 of which are thus guided, in longitudinal sliding, when the MMC card 56 is inserted from the front to the rear, i.e. along the direction indicated by the arrow I in FIG. 11.

In order to provide vertical retention of the MMC card 56 in its upper compartment with its face 60 bearing against the upper face 151 of the separating partition 150, each of the side walls 160 has, in its upper face 164, two retaining tabs 166 which extend transversely inwards and the lower faces 168 of which are intended to engage with the facing portions of the upper face 62 of the MMC card 56.

In order to make it easier to insert the MMC card 56 into its compartment 152, the front longitudinal ends 170 of the internal faces 162 of the side walls 160 each have a chamfer 172.

The partition 150 is bounded longitudinally forwards by a front transverse edge 174 and it is extended longitudinally forwards in its central part, beyond the front transverse edge 174, by a transversely narrower portion 176 which has a convex circular cut-out 178 in order to make it easier to grip the cards and which, on its upper face, has two thicker regions 180 each of which defines a transverse stop facet 182 that is intended to engage with the front transverse edge 66 of the MMC card 56 in order to provide longitudinal retention in its compartment 152.

As may be especially seen in FIG. 13, in the position in which the MMC card 56 has been inserted into its compartment 152, the front transverse edge 66 of the MMC card 56 extends longitudinally forwards beyond the transverse edge 174 of the partition 150, particularly so that its cut corner 68 is "free" to engage with the inclined vertical polarizing facet 142, as will be explained below.

Likewise, the lower compartment 154 intended to house the MICROSIM card 58 is bounded transversely by two longitudinally oriented, opposed and parallel, vertical walls 184 which extend vertically downwards, the internal lateral face 186 of each wall 184 forming a guiding face, along which the MICROSIM card 58 slides, and being intended to engage with a longitudinal facing edge 59.

Each of the vertical walls 184 has an internal chamfer 188 intended to make it easier to insert the MICROSIM card 58.

The compartment 154 is bounded longitudinally rearwards by a transverse vertical wall 191 whose internal vertical face 193 has a facet 194 inclined at 45° and intended to engage with the cut corner 78 for polarizing the MICROSIM card 58 in order to define a single position for inserting and for installing the card 58 in its lower compartment 154 when its rear transverse edge 77 butts against the internal vertical face 193.

Longitudinal retention of the MICROSIM card 58 in its compartment 154 is provided by two thickened regions 196 which extend vertically downwards and each of which defines a stop facet 198 intended to engage with the facing portion of the front transverse edge 76 of the MICROSIM card 58.

The external lateral faces 200 of the vertical walls 184 each have three horizontal tabs 202 which extend transversely outwards level with the lower plane 204 of the walls 184. These tabs 202 form the complementary means of the rails 104 and of the tabs 108 of the lower part 80 of the connector body 52 in order to ensure bayonet mounting of the card-holder slide-in unit 54 on the connector body 52.

Thus, the tabs 202 are capable of simultaneous vertical penetration into notches 206 (see FIG. 19), and they can then slide in the corresponding rail 104 beneath the lower faces 109 of the tabs 108 in order to provide vertical retention of the card-holder slide-in unit 54 with respect to the lower part 80 of the connector body 52.

In order to facilitate the longitudinal insertion during the bayonet-type movement, the front longitudinal ends of the vertical walls 184 have external chamfers 208.

In order to provide downward vertical retention of the MICROSIM card 58 in its compartment 154, the vertical walls 184 each have, on the lower face 204, a pair of retaining tabs 210 which extend vertically inwards and the upper faces 212 of which are designed to engage with the facing portions of the lower face 72 of the MICROSIM card 58 in order to provide its downward vertical retention.

Figure 14:
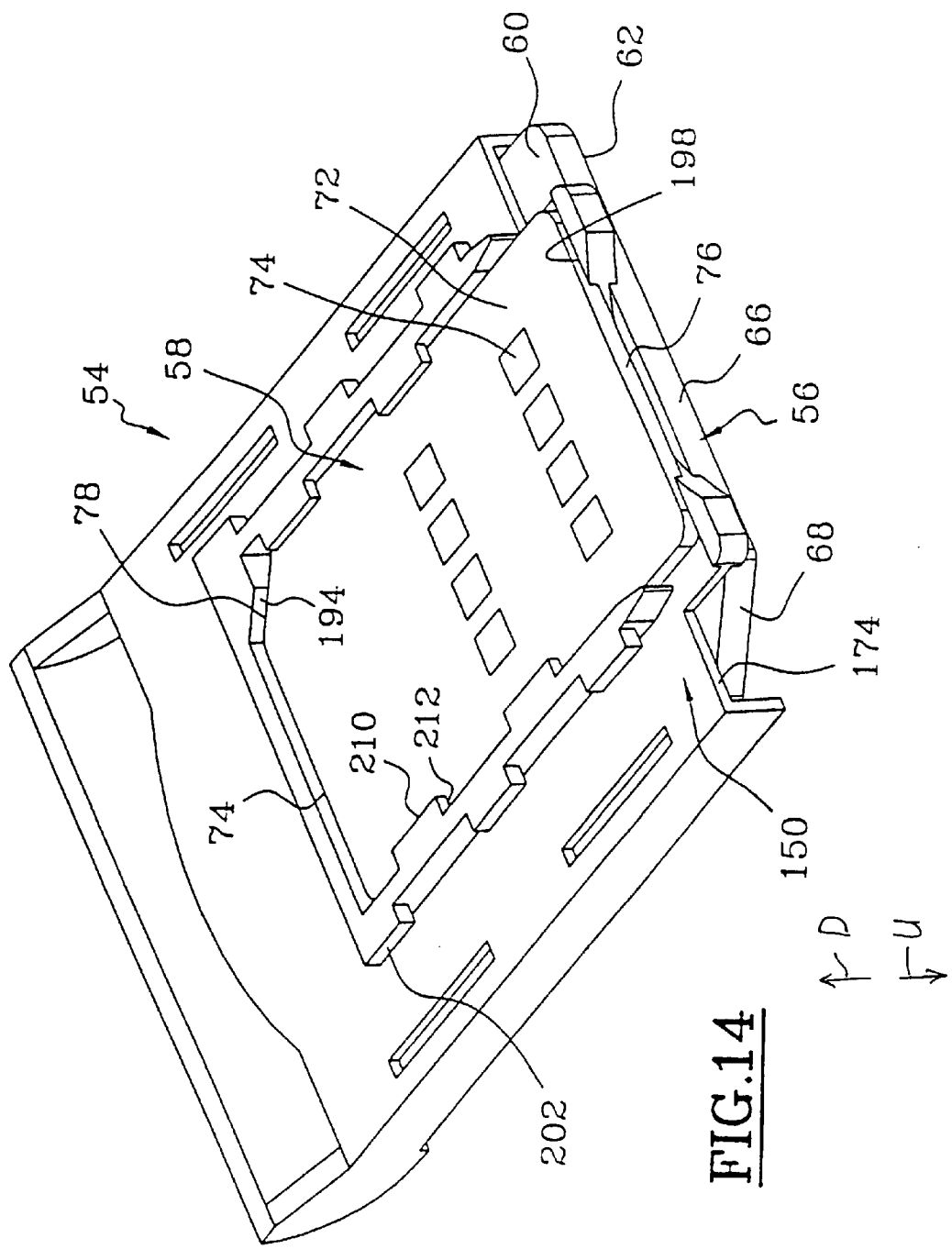
FIG. 14 is an isometric view of the unit of FIG. 13 with two cards fully installed therein, but showing the unit and cards in an upside-down configuration.
Figure 15:
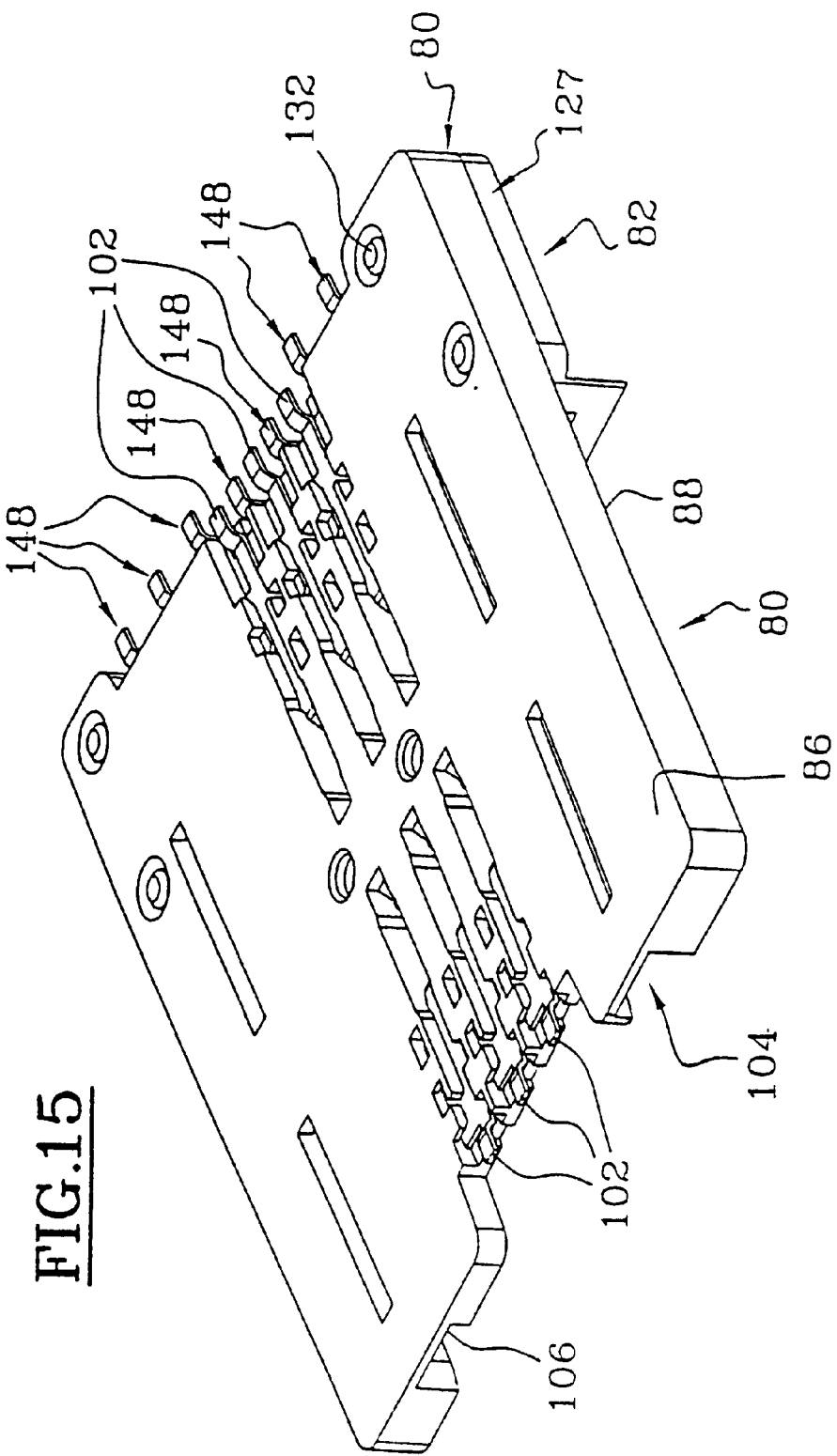
FIG. 15 is a front isometric view of the connector body of FIG. 1, in an upside-down position.

The arrangement according to the first embodiment is such that, when the two cards 56 and 58 are each in place in their corresponding compartment 152, 154, their front transverse edges 66 and 76, which are the reference edges for the standardized positioning of their respective contact pads 64 and 74, are aligned longitudinally with respect to each other (see FIGS. 13, 14 and 6).

When the two cards 56 and 58 are in position in the card-holder slide-in unit 54, there is a clearance between the two cards which corresponds approximately to the thickness of the partition 150 and which makes it easier to grip the cards in order to remove them. If both cards are present, the elasticity of the MICROSIM card 58 is brought into play and, in order to remove the MMC card, the partition 150 is deformed slightly. If it is desired to remove the MMC card 56 first, a force is applied to the blocks consisting of the thickened regions 180 and 196 in order to deform the partition sufficiently and to retract the stops 182.

The vertical positioning of the card-holder slide-in unit 54 with respect to the connector body 52 is defined by the lower face 153 of the intermediate partition bearing against the facing portions of the upper face 88 of the plate-shaped lower part 80 of the connector body 52.

Figure 10:
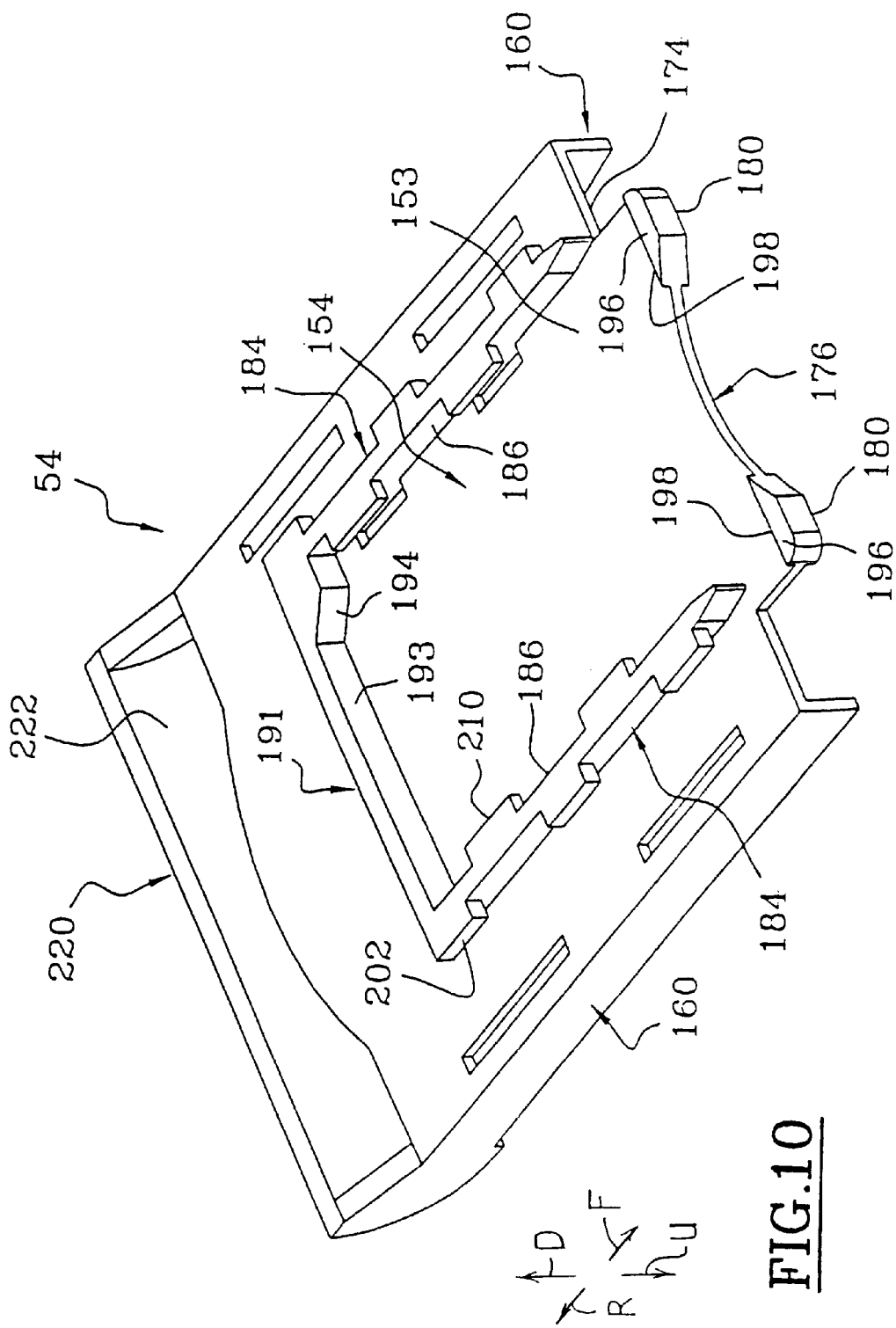
FIG. 10 is an isometric front view of the card-holding unit of FIG. 9, but shown in an upside-down orientation.

By virtue of this positioning, and of the vertical positioning of the MMC upper card 56 in the card-holder slide-in unit 54, the face 60 of the MMC card 56, at its front transverse edge 66, passes above the facet 136, as may be seen in FIG. 10, whereas, if the MMC card 56 is positioned correctly in its compartment 152 its cut corner 68 engages with the polarizing wall 140, 142.

Should the MMC card 56 be mounted incorrectly, the cut corner 68 is not in the proper position and it is then one of the other three corners of the MMC card which butts against the vertical polarizing wall 140, 142 thus preventing complete insertion, into the data-access position, of the card-holder slide-in unit 54, this improper insertion or incomplete insertion able to be detected visually from outside the apparatus insofar as the profiled rear longitudinal end part 220 of the card-holder slide-in unit 54 then projects longitudinally rearwards with respect to the casing, for example, that surrounds the apparatus fitted with the connector 50.

Likewise, if the MICROSIM lower card 58 is in an improper position in its corresponding lower compartment 154, its front transverse edge 76 then projects longitudinally forwards beyond the card-holder slide-in unit and butts against a transverse stop bar 222 formed in relief on the horizontal face 98—which is illustrated in the context of the second and third embodiments (see especially FIG. 25)—thus again preventing complete insertion of the card-holder slide-in unit 54 into the operating position in the connector 50.

As may be seen in FIG. 6, the profiled rear longitudinal end part 122 is recessed, that is to say it has a concave inner and lower face 224 making it easier to grip the slide-in unit 54 in order to remove it from the connector 50 longitudinally from the front to the rear.

Likewise, the rounded cut-out 176 makes it easier to remove the MMC card 56 and the MICROSIM card 58 from their respective compartments 152 and 154, allowing them to be gripped by their front transverse edge 66, 76.

In FIG. 23, it may firstly be seen that the length of the conducting pads 64 on the MMC card 56 is great enough to guarantee that, despite the longitudinal offset of the contact ends 146 and 146', these ends are in contact with a corresponding track when the MMC card with the slide-in unit 54 is in position in the connector 50.

The points of contact with the pads 64 are denoted by the references p146 and p146'.

Likewise, in FIG. 23 the points of contact between the contact ends 100 of the contact blades 84 and the pads 74 are denoted by the reference p100.

Figure 24:
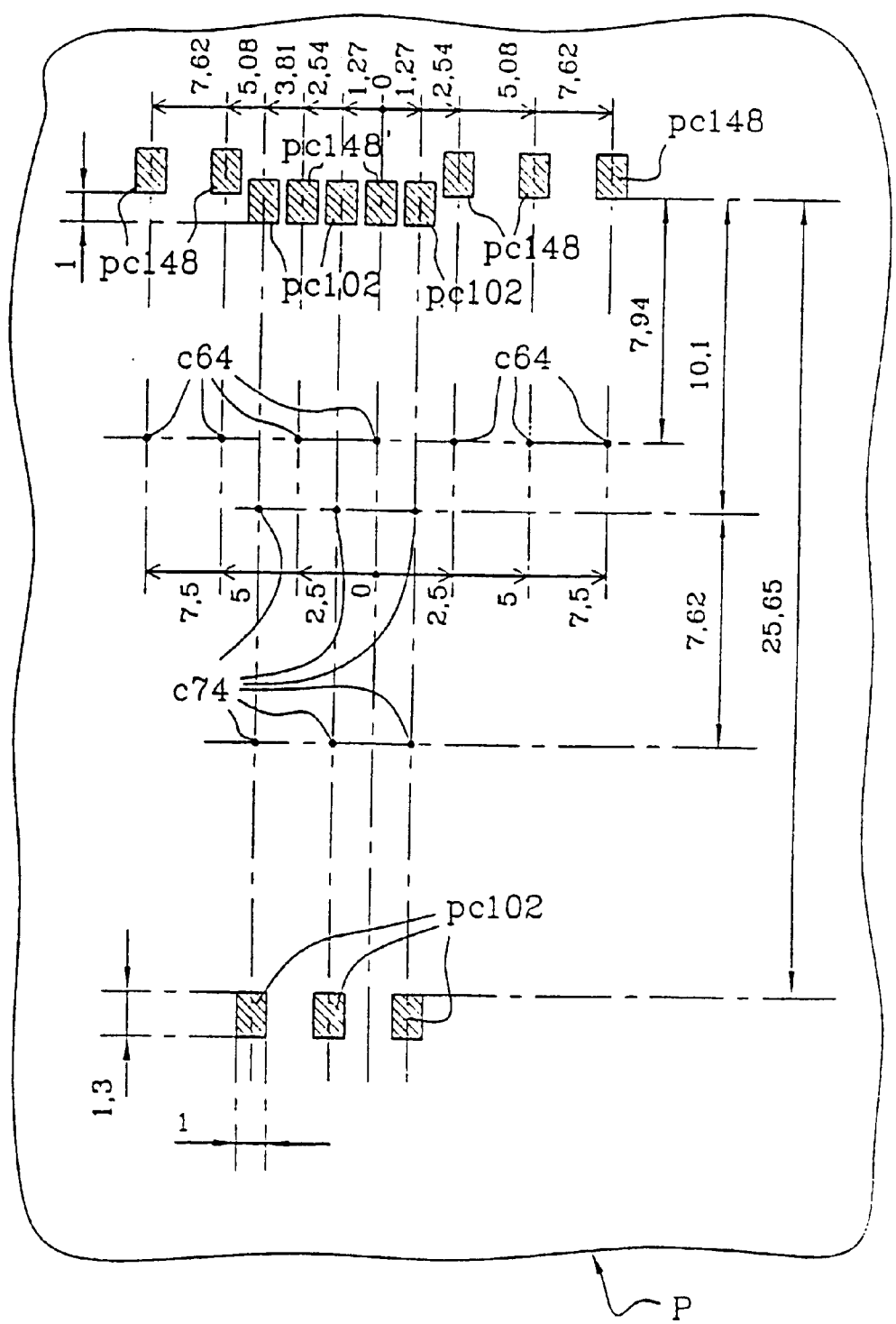
FIG. 24 is a plan view of portion of a circuit board on which the contacts of the connector of FIG. 2 are mounted, including a diagram showing the positions of tracks that connect to the tails of the contacts.
Figure 30:
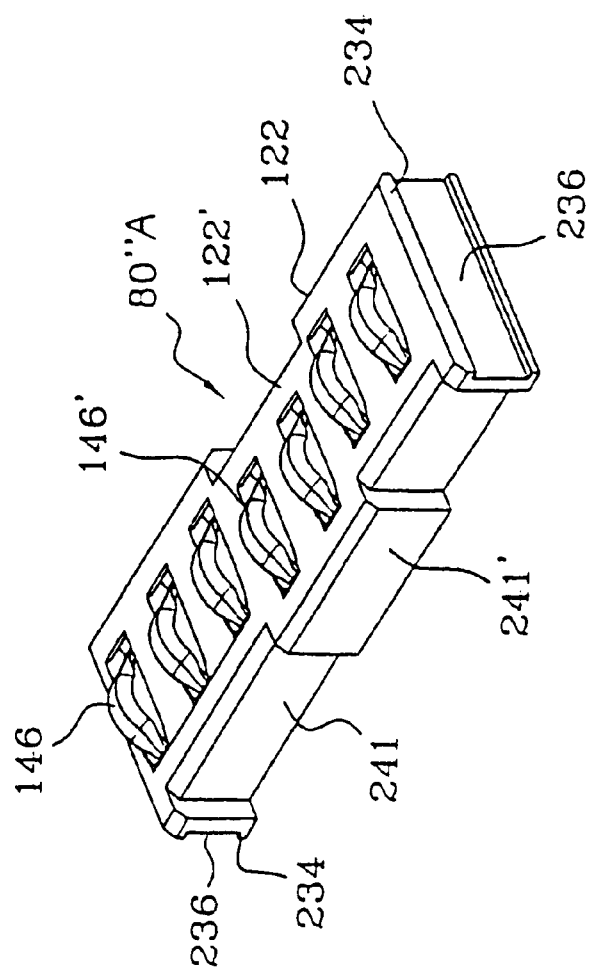
FIG. 30 is a rear and top isometric view of the front part of the connector body of FIG. 25.

FIG. 24 shows the printed-circuit board P with its upper face having conducting pads intended to be connected by soldering to the output connection leads 102, 148 and 148', which are denoted by the references pc102, pc148 and pc148'.

FIG. 24 also shows the centres c64 and c74 of the conducting pads on the MMC card 56 and on the MICROSIM card 58.

Referring to FIG. 23, it may be observed that the two cards are not centred transversely with respect to each other but that the MICROSIM card, with regard to this same FIG. 23, is slightly offset to the left with respect to the MMC card.

The second embodiment illustrated in FIGS. 25 to 43 will now be described.

In this embodiment, if it is compared with the previous one, there is no longer an upper part of the connector 50, but its insulating body consists essentially of a lower part 80A made of two parts—a rear part 80A and a front part 80"A—that are joined together by means which will be described later.

Another major difference consists in that both the contact ends 100 intended to allow connection to the MICROSIM card 58 and the contact ends 146, 146' intended to allow connection to the contact pads on the MMC card 56 are oriented vertically upwards. In a complementary manner, the two cards 56 and 58 carried by the card-holder slide-in unit 54A are positioned in the slide-in unit, as may be seen in FIGS. 25C and 36, with their respective faces 62 and 72 bearing the contact pads 64 an 74 oriented vertically downwards when the slide-in unit is in the operating position in the connector.

On the other hand, the bayonet-type means of mounting the slide-in unit 54A on the lower part 80A are preserved and are arranged thereon essentially in the rear lower part 80A of the body 52.

Figure 32:
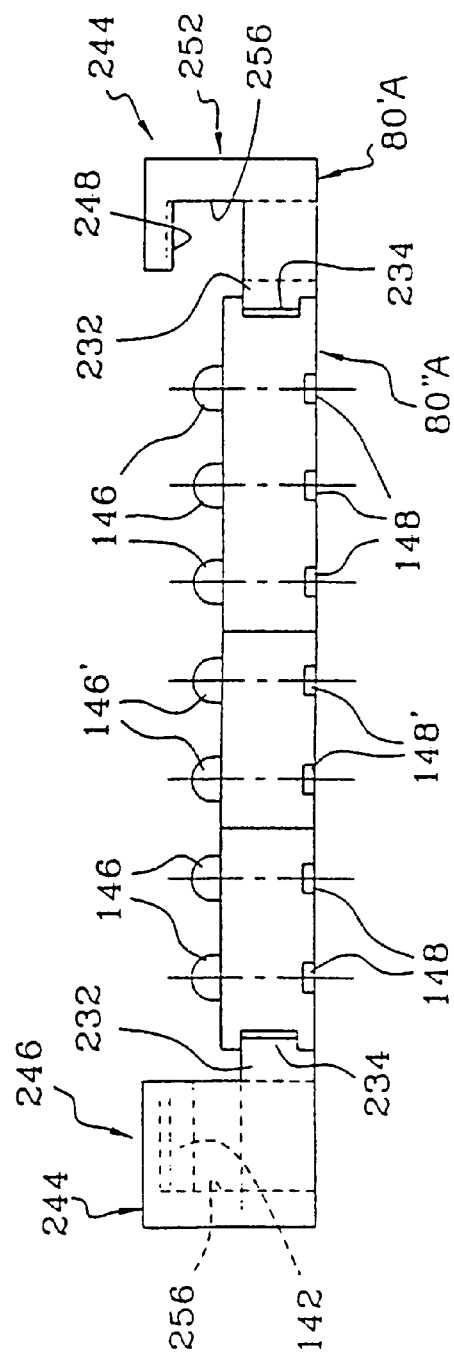
FIG. 32 is a front elevation view of the connector body of FIG. 25.

Referring especially to FIGS. 26, 27 and 32, it may be seen that, near its front end, the rear part 80A is extended by two parallel and opposed lateral arms 230 which between them define, on the inside, two guiding and positioning rails 232 for the block of insulating material forming the front part 80"A, each of the opposed lateral faces 234 of which includes a corresponding horizontal slideway 236.

A stop 238 formed in the rails 232 defines the rearward longitudinal position of the front block 80"A and this is held in the assembled position by two chamfered lugs 240 formed on the internal faces of the rails 232, the latter bending elastically transversely outwards when fitting the front block.

Figure 31:
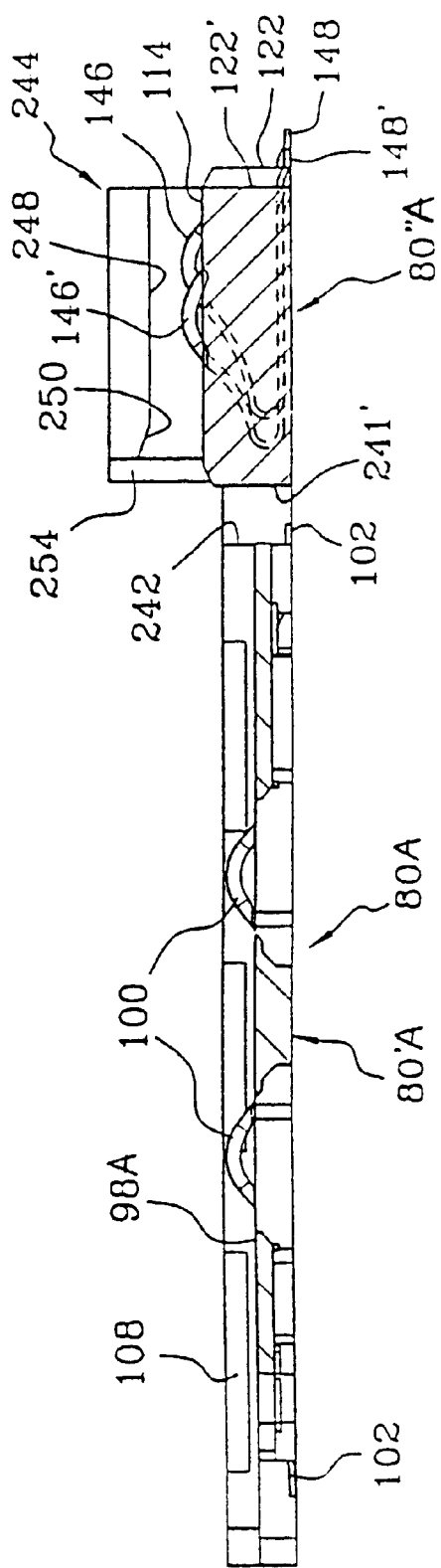
FIG. 31 is a sectional side view of the connector body of FIG. 25.
Figure 35:
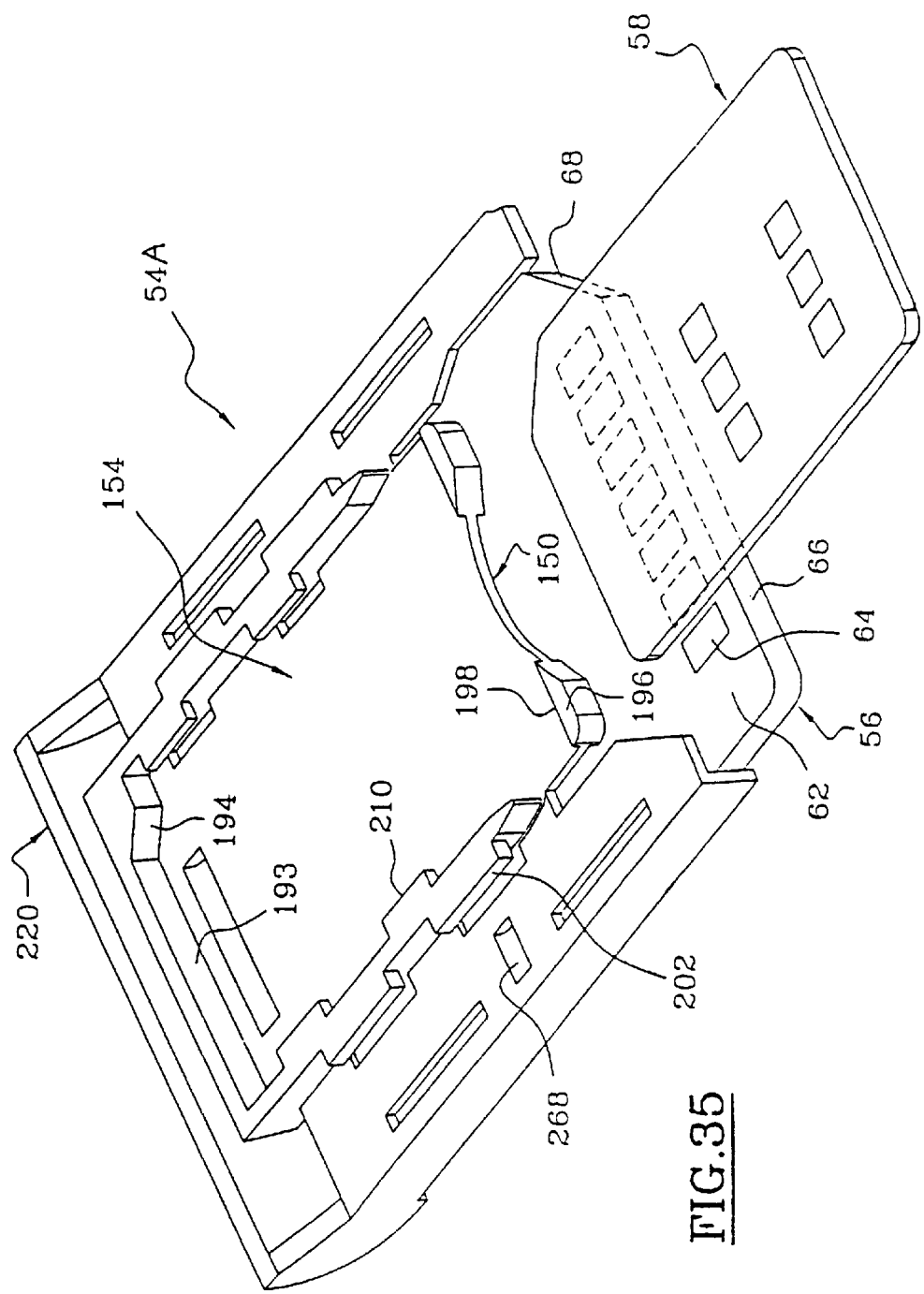
FIG. 35 is a view similar to that of FIG. 25C, showing the MICROSIM lower card close to insertion in the lower compartment of the card-holder unit, and the MMC card fully installed.
Figure 36:
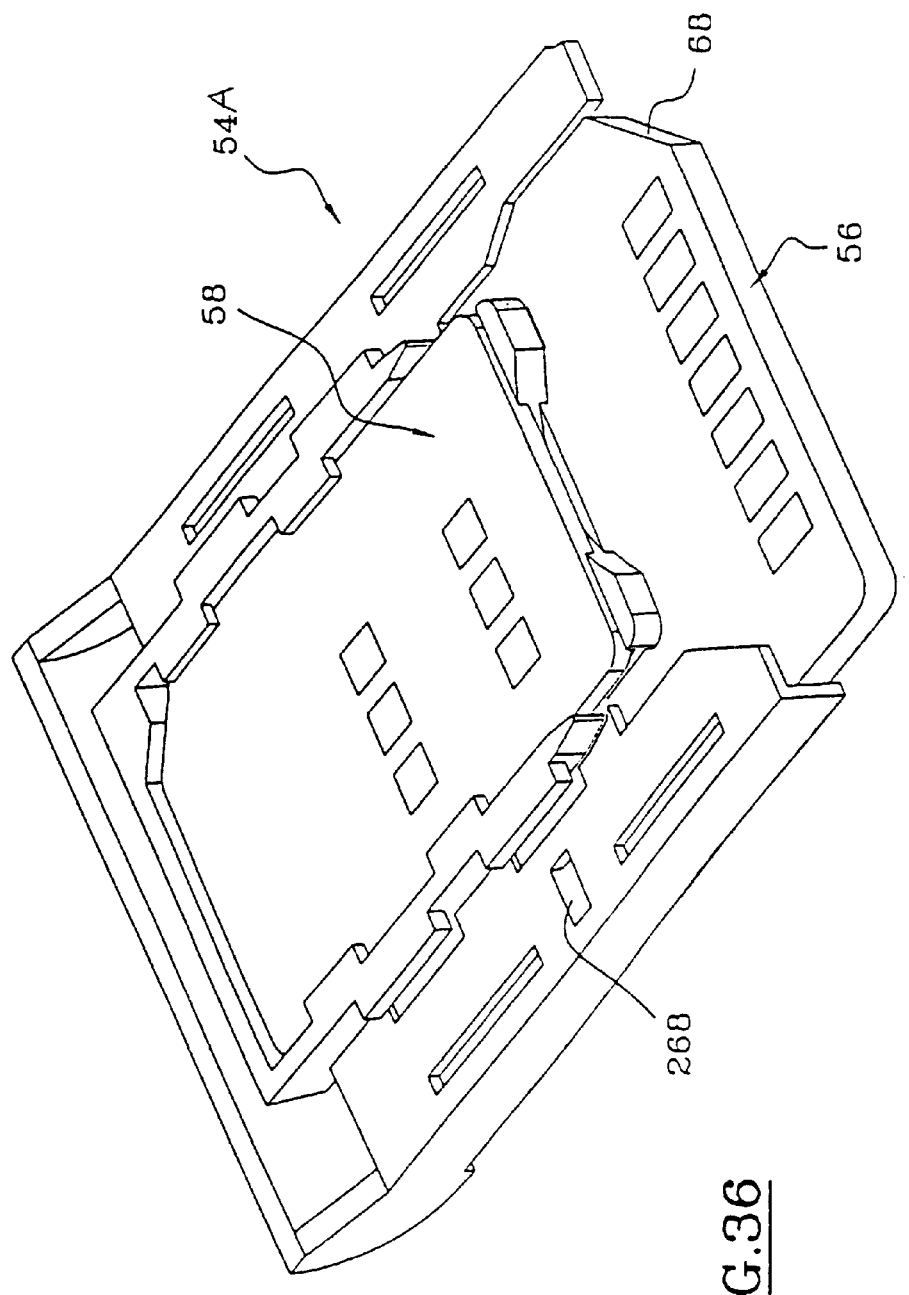
FIG. 36 is a view similar to that of FIG. 35, but with both cards fully inserted into the corresponding compartments.

In the assembled position of the two parts—the rear part 80A and the front part 80"A—as may be seen for example in FIGS. 35 and 31, there is a space between the front transverse face 242 of the rear part 80'A and the rear transverse face 241, 241' of the front block 80"A so that the connection or output leads 102 associated with the contact elements that are borne by the rear part 80A and are arranged longitudinally to the front, can extend into this clear region in order to be connected to the corresponding tracks on the printed-circuit board P.

The seven connection leads 148, 148' of the contact blades for connecting the MMC card themselves project longitudinally forwards beyond the rear transverse face 122, 122' of the front block 80"A.

In order to ensure that the front part of the MMC card 56, which projects longitudinally forwards out of the slide-in unit 54A and whose face 62 bearing the contact pads 64 is well pressed vertically downwards in the direction of the ends 146 and 146', the opposed lateral arms 230 of the rear block 80A each have a vertical right-angled piece 244 whose horizontal branch or roof 246 forms, by its lower face 248, a bearing face for the upper face 60 of the MMC card 56, entry chamfers 250 making it easier for the card to pass under the branches 246.

Likewise, the vertical branches 252 of the right-angled pieces 244 each have an entry chamfer 254 so as to guide the opposed lateral edges 57 of the front part of the MMC card 56, guiding it between the vertical and opposed internal faces 256 of the vertical branches 252.

The 45° inclined facet 142, designed to allow the position of the MMC card 56 to be polarized, by the latter engaging with the cut corner 68, is formed here inside the right-angled piece 244 on the right-hand side in FIG. 26, and this facet is designed to engage with the upper portion of the cut corner 68, while the lower portion of the latter is designed, as will be explained below, to hold the MMC card 56 in the card-holder slide-in unit 54A.

In the operating position, and as may be seen in FIG. 37, the lower face 62 of the MMC card 56 is thus pressed against the upper face 114 of the front block 80" beyond which the contact ends 146 and 146' normally project.

Figure 38:
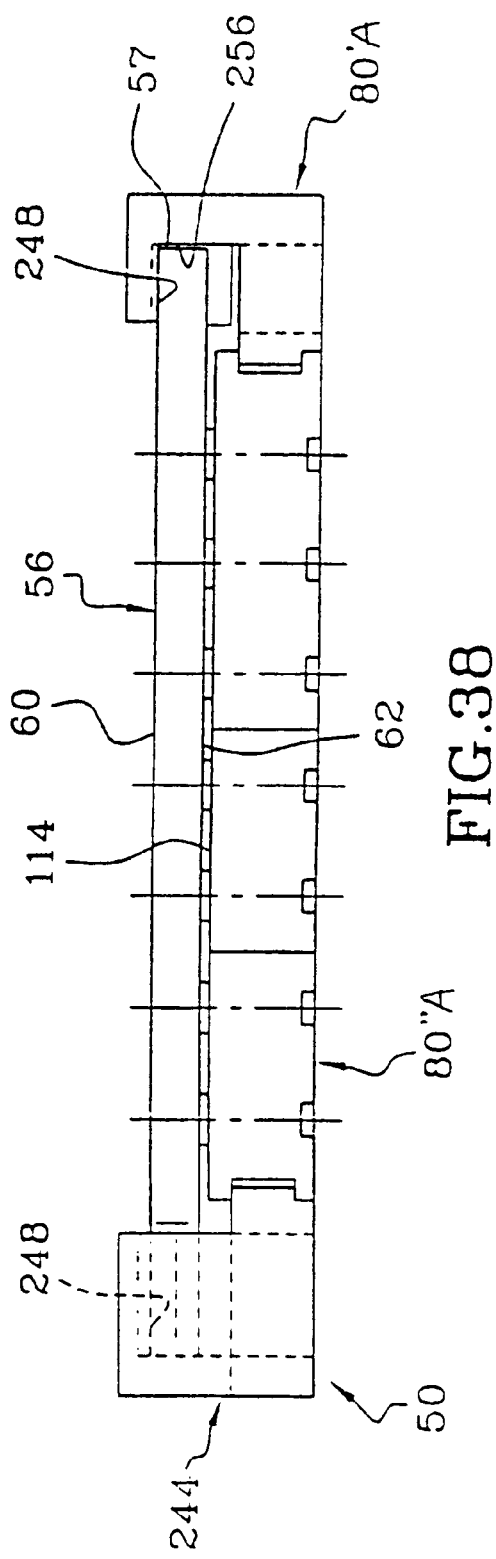
FIG. 38 is a front elevation view of the connector body of FIG. 25.

Given the tolerances, there may be a slight clearance between the surfaces 114 and 62, the MMC card then being pressed elastically upwards by the ends 146 and 146', so as to bear against the lower horizontal faces 248 of the right-angled pieces 244 (see FIG. 38).

The lower face 260 of the front block 80" is, of course, coplanar with the lower face 86 of the rear part 80".

FIG. 41 shows the MICROSIM card 58 and the MMC card 56 as well as part of the intermediate partition 150 of the card-holder slide-in unit, and it may be seen in this figure that it is the MICROSIM card 58 which has its longitudinally offset transverse edge 77, which here is its rear edge, further to the rear than the transverse edge 67 of the MMC card 56.

The dimensions given in millimeters in FIGS. 40 and 41 allow the dimensions of the various elements and their relative positioning to be understood.

With regard to the card-holder slide-in unit 54, its design is generally similar to that described above with reference to the first embodiment.

Thus, all the means relating to positioning and holding the MICROSIM lower card 58 are identical, but it may simply be observed, for example by comparing FIG. 25C with FIG. 10, that the cavity 154 for the MICROSIM card 58 is generally offset longitudinally rearwards with respect to the gripping part 220 of the slide-in unit so that the front transverse edge 76 of the MICROSIM card 58 is also offset longitudinally rearwards in order to be clear of the lower face 62 of the front part of the MMC card 56 which bears the contact pads 64, as may be seen in FIG. 25C for example.

Figure 33:
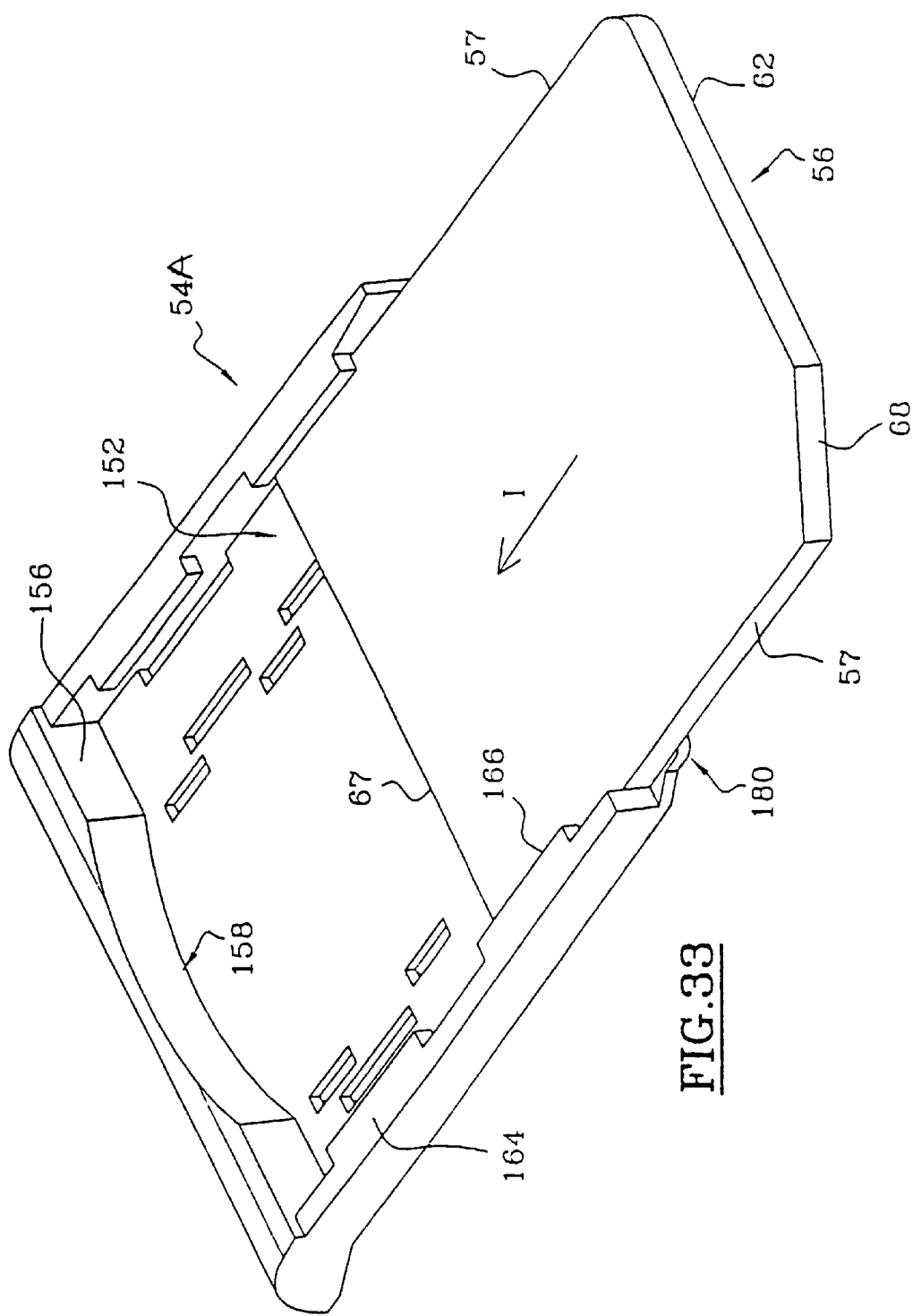
FIG. 33 is a front and top isometric view of the card-holder unit of FIG. 25C, with an MMC card partially installed in the unit.
Figure 34:
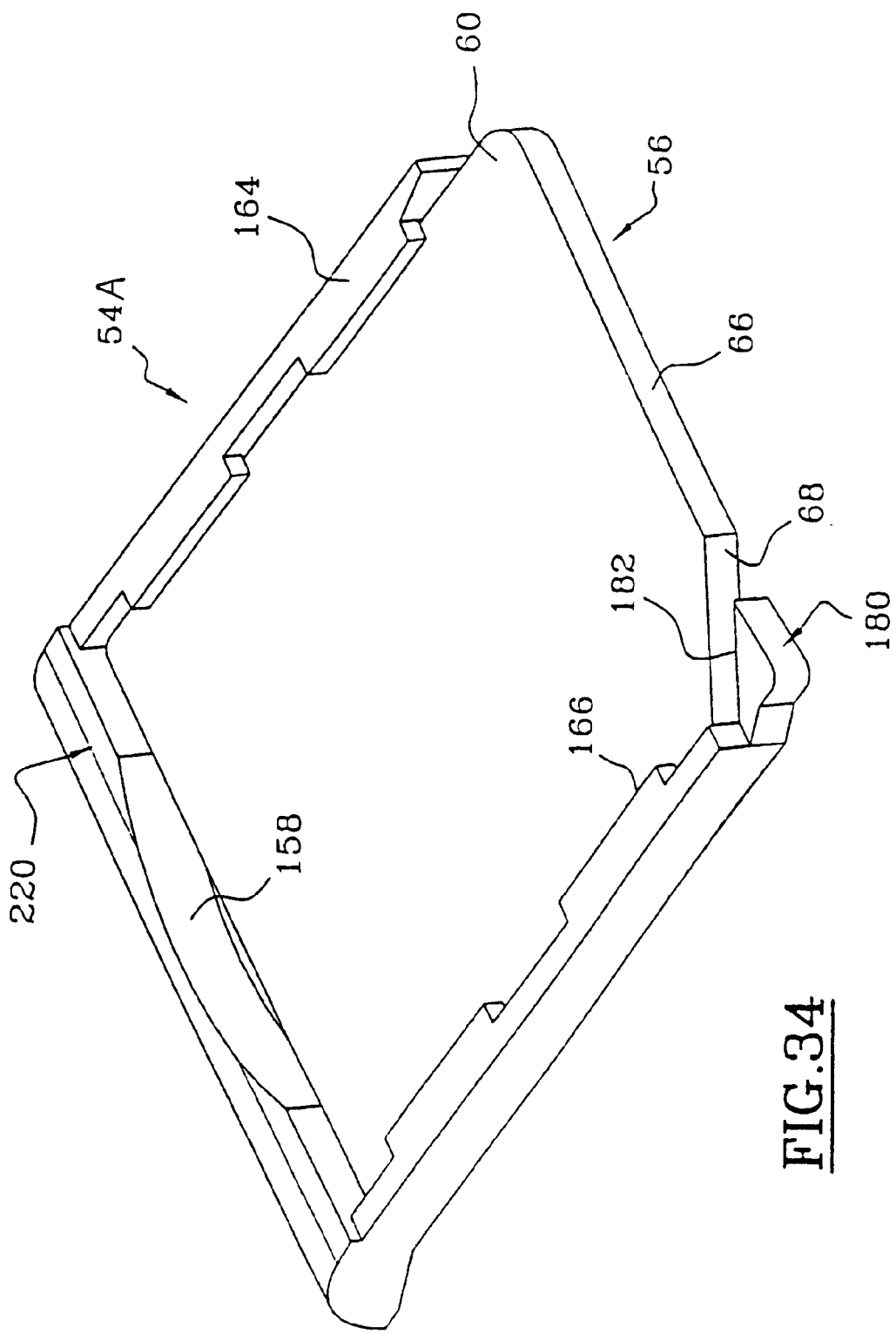
FIG. 34 is a view similar to that of FIG. 33, with the MMC card fully installed in the unit.

Comparing FIGS. 33 and 34 with FIGS. 11 and 13 for example, it may be seen that the design of the upper cavity 152 of the card-holder slide-in unit 54A is generally similar in the first two embodiments, except for the means of longitudinal retention of the MMC card 56 in its housing, which means comprise here a single thickened region 180 which is formed along one of the lateral edges of the cavity 152 and which has a stop facet 182 oriented generally transversely rearwards, this facet here being inclined at 45° in order to engage with the lower part, with regard to FIG. 34, of the cut corner 68 and to form the means of polarizing the position of the MMC card in its housing (see FIG. 34).

FIGS. 25, 25C and 25D show a stop device for the longitudinal position of the card-holder slide-in unit 54A with respect to the rear part 80'A.

These means consist of an elastic blade 264 which is moulded as one piece with the part 80'A and which has a protruding lug 266 which projects vertically upwards above the upper face 88. The longitudinal orientation branch or blade 264 may bend in the manner of a beam in order to allow the lug 266 to retract.

The lug 266 is designed to be housed in a complementary notch in the form of a concave cylindrical arc 268 formed opposite it in the lateral part of the lower face 153 of the slide-in unit 54A which slides, while being pressed vertically, on the upper face 88 of the rear block 80'.

Figure 39:
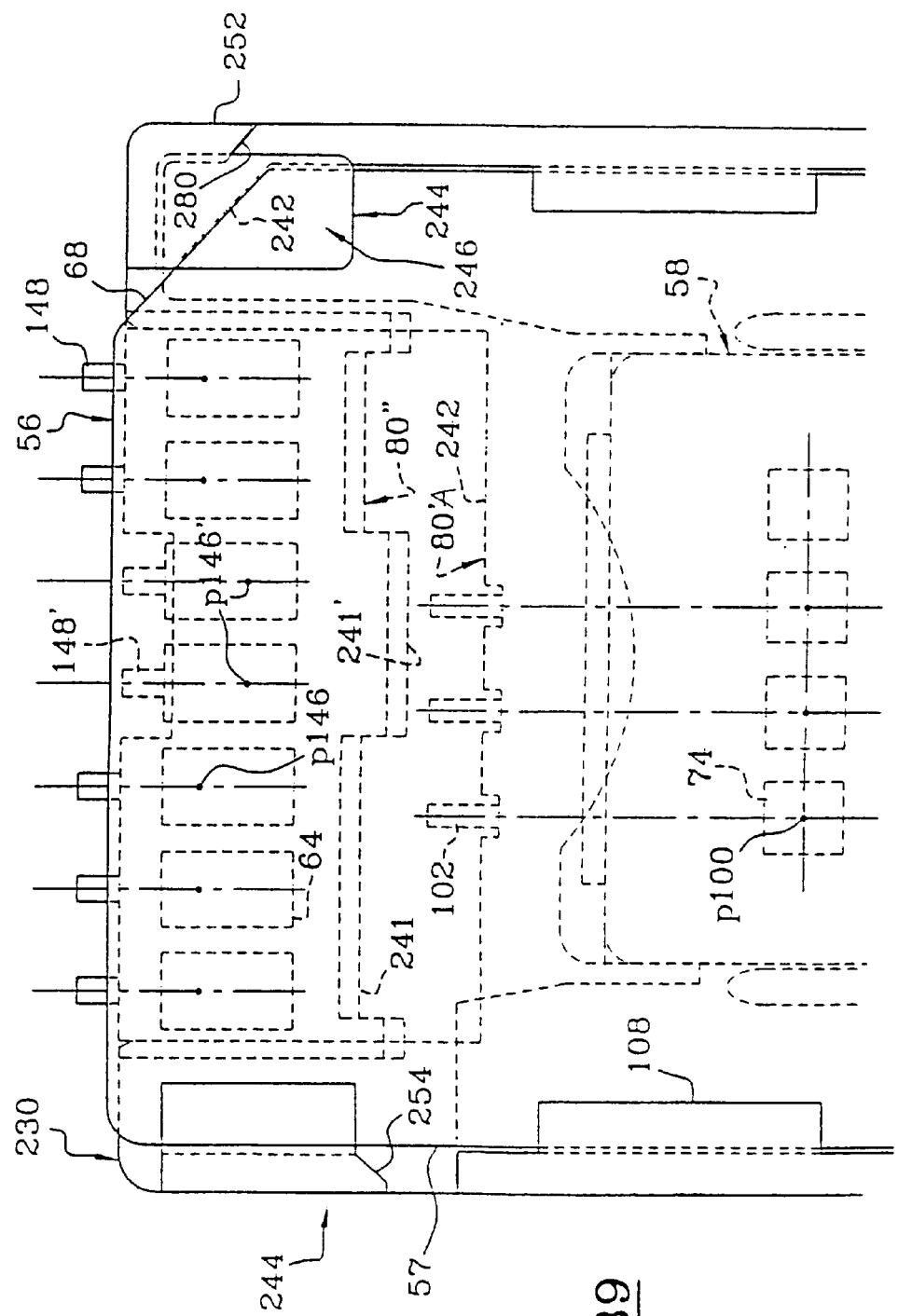
FIG. 39 is an enlarged top view of the front portion of the connector and card-holding unit of FIGS. 25 and 25C with the cards fully installed in the units and the unit fully installed in the connector body.
Figure 42:
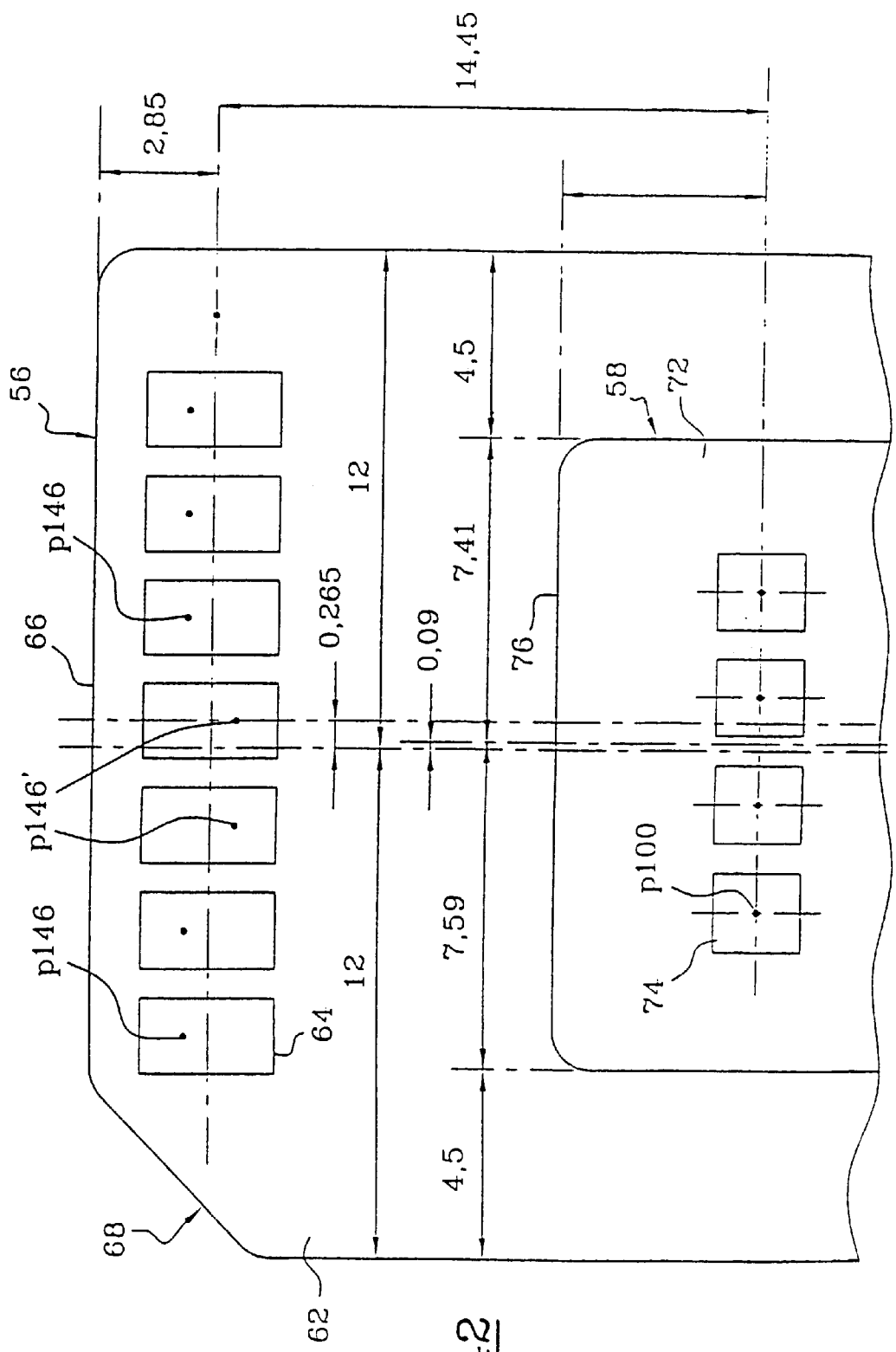
FIG. 42 is a partial diagrammatic view from below, showing the relative positions of the two cards and of their contact pads when mounted in the card-holding unit of FIG. 25C.
Figure 43:
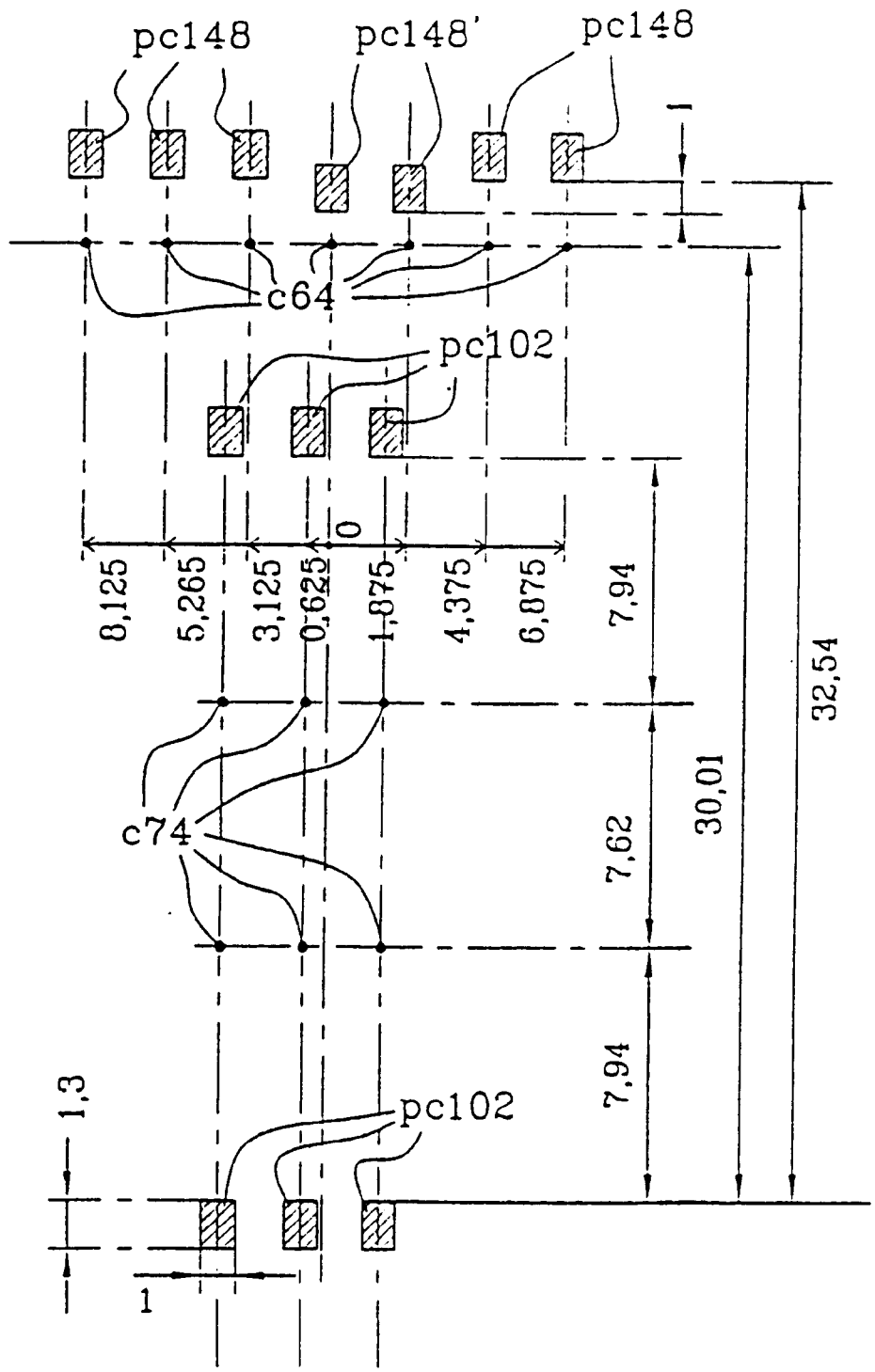
FIG. 43 is a diagram indicating the positions of tracks on a circuit board that connects to tails of the contacts of the connector of FIG. 24.

As may be seen especially in FIG. 39, in order to allow the card-holder slide-in unit to be fully engaged while especially allowing engagement with the means 68–142 for polarizing the MMC card 56, the vertical branch 252 of the right-angled piece 244 on the right-hand side has a shoulder or chamfer 280 allowing the free end 282 of the card-holder slide-in unit 56 to pass, this free end 282 also having a complementary shoulder 284.

The shoulder 280 advantageously forms over its entire height a chamfer 254 making it easier for the MMC card to be guided laterally during insertion of the card-holder slide-in unit 54.

Figure 54:
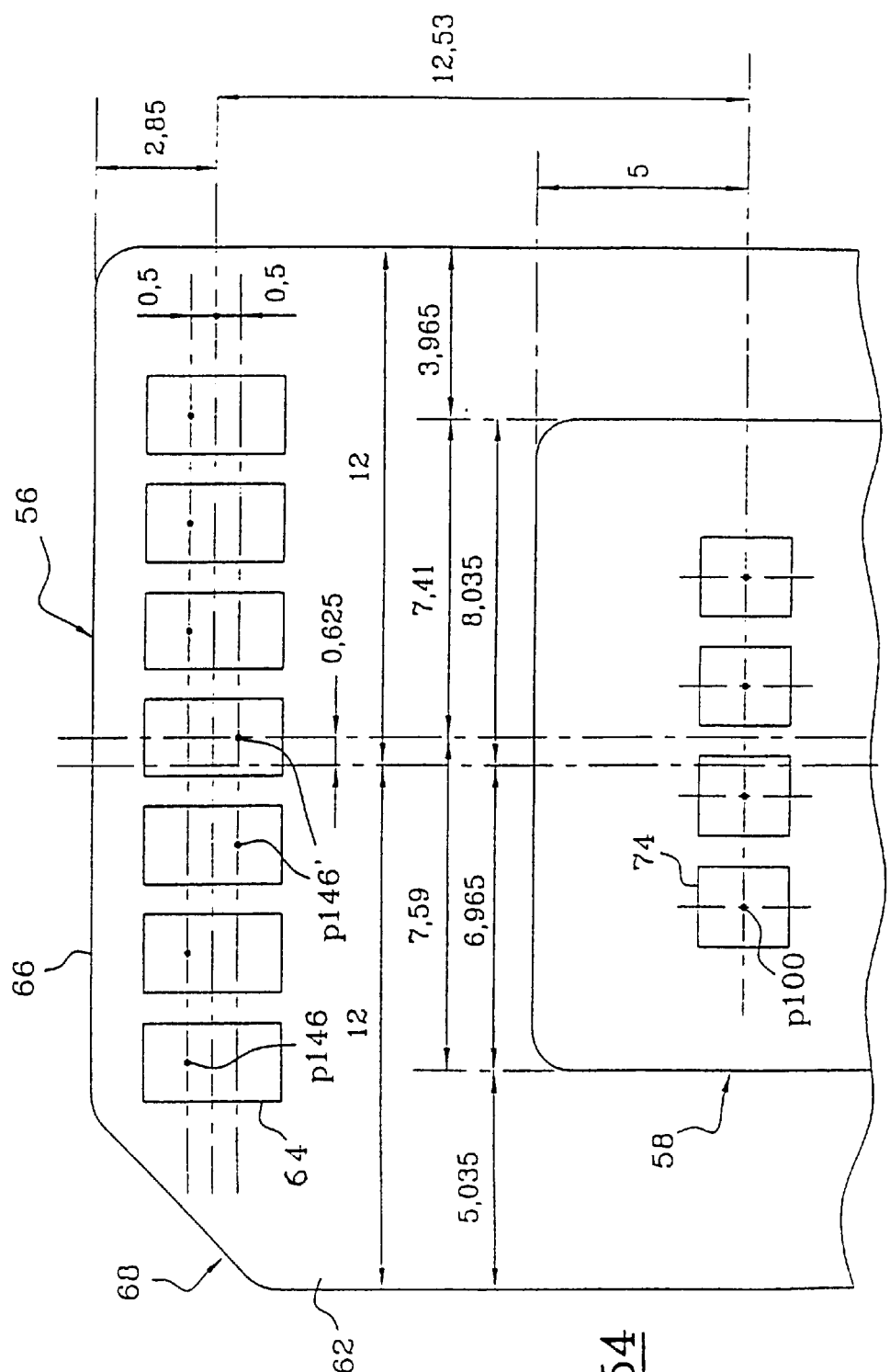
FIG. 54 is a partial plan view showing the relative positions of the two cards and of their contact pads when fully installed as in FIG. 49.

As may be seen in FIG. 54, the MICROSIM card 58 here is centred transversely with respect to the MMC card 56.

With regard to the third embodiment shown in FIGS. 44 to 55, comparison should be made with the second embodiment just described with reference to FIGS. 25 to 43.

In fact, it should firstly be noted that the design of the card-holder slide-in unit illustrated for example in FIG. 25C may be used in the third embodiment, as long as some dimensional modifications are made.

With regard to the body 52B of the connector, this again consists here only of a lower part 80B made of two pieces, i.e. a generally rear part 80'B and a generally front part 80"B.

The means of joining the front part 80"B to the rear part 80'B also consist here of opposed lateral arms 230 which extend the rear part 80'B longitudinally forwards and the facing internal faces of which have vertical slideways 236 emerging vertically upwards and downwards which house, so as to slide vertically, complementary rails 232 formed so as to project transversely outwards on the lateral faces 234 of the front block 80"B.

There are strictly speaking no means of vertical immobilization of the front block 80"B with respect to the rear block 80'B, it being possible for these means, which are not shown, to be provided but they are not obligatory insofar as, during the operation of soldering the subassembly consisting of the two pre-assembled parts 80'B and 80"B, this relative immobilization results from the soldering of the various connection faces to the corresponding printed-circuit board.

In order to press the front part of the MMC card 56 vertically so as to bear against the contact ends 146 and 146', the design of the two right-angled pieces 244 is simplified, these having a common upper roof 246 which extends over the entire transverse width of the connector and the lower face 248 of which bears against the facing face 60 of the MMC card.

The latter is polarized by a lug 243 which is borne by the right-angled piece 244 on the right-hand side and defines the internal polarizing facet 142.

In addition to the means of joining the rear part 80'B to the front part 80"B, the latter is distinguished essentially from that described with reference to the second embodiment in that the electrical-contact elements for connecting the MMC card are oriented longitudinally in the opposite direction, that is to say their output or connection leads 148 and 148' are oriented longitudinally towards the rear of the connector, that is to say they extend so as to face the front transverse face 242 of the rear part 80'B.

Figure 47:
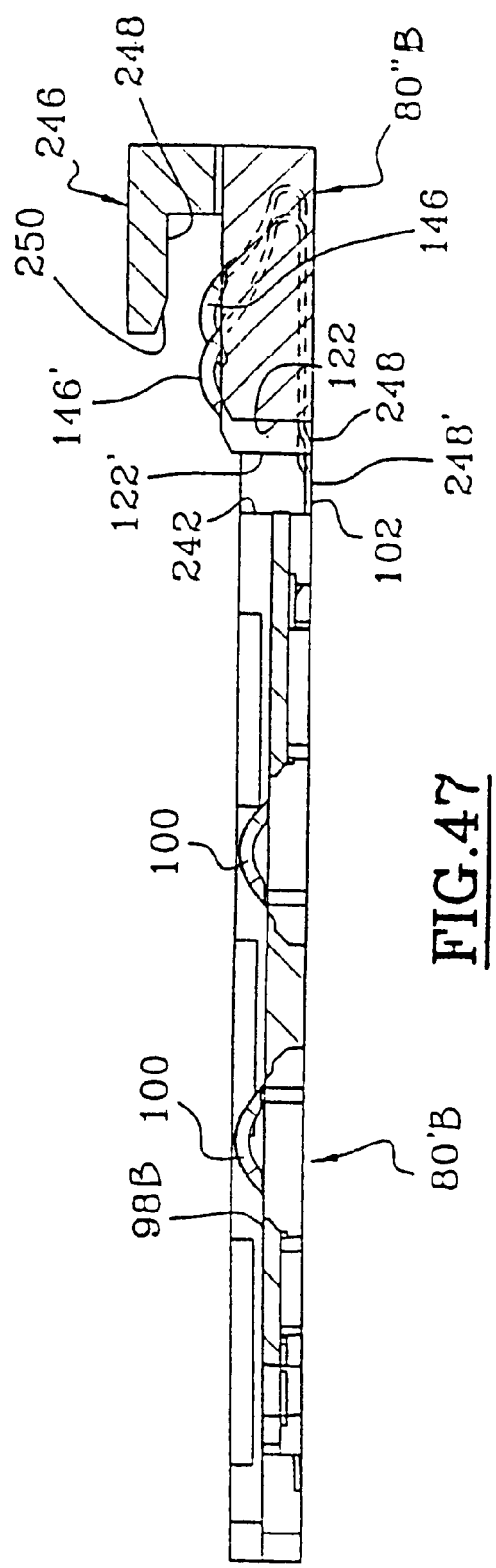
FIG. 47 is a sectional side view of the connector body of FIG. 44.
Figure 48:
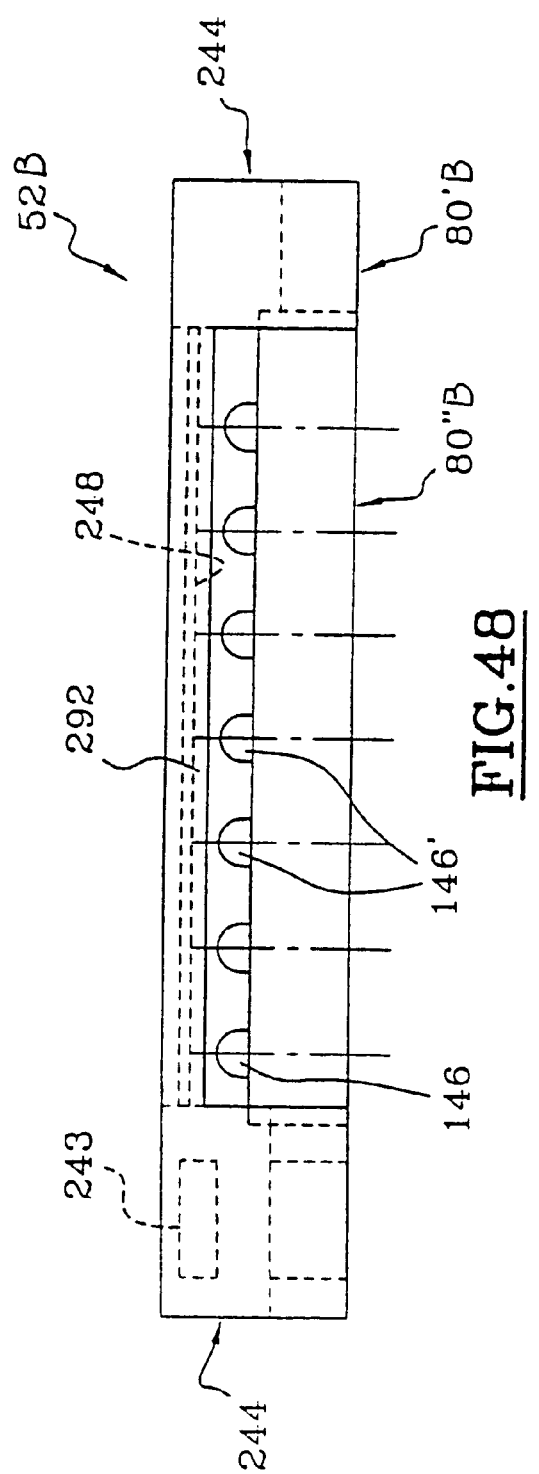
FIG. 48 is a front isometric view of the connector body of FIG. 44.

Thus, as may be seen in FIG. 47 by comparing it with FIG. 31, the output leads 102 and 248, 248" are adjacent and/or imbricated, and no output lead projects beyond the front end transverse face of the front block 80".

Figure 49:
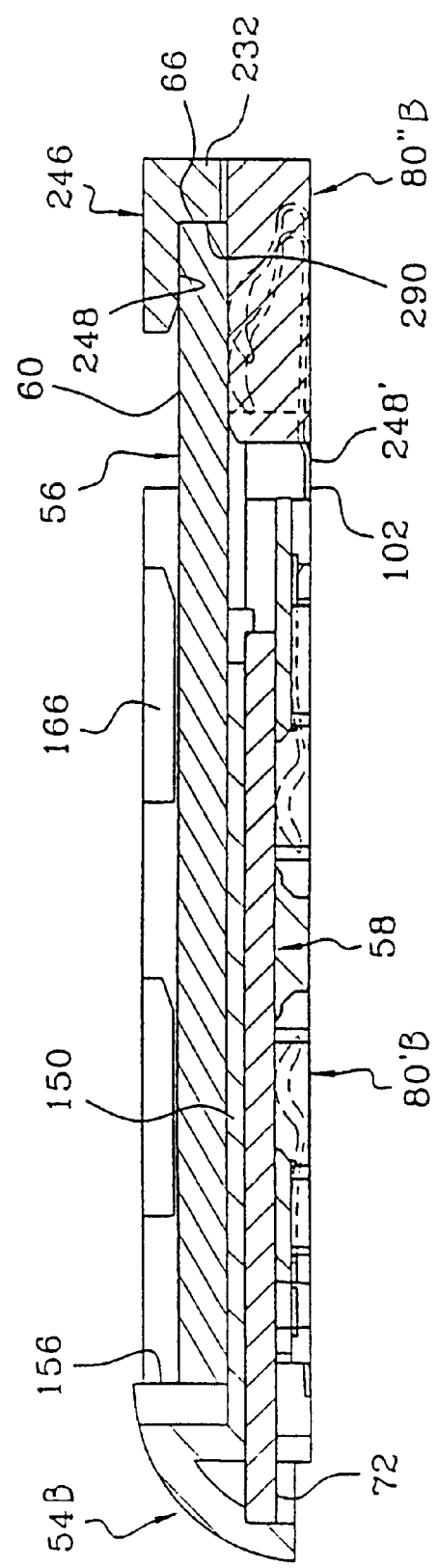
FIG. 49 is a sectional view similar to that of FIG. 47, but with the card-holding unit shown with the cards fully installed in the unit and the unit fully installed on the connector body.
Figure 50:
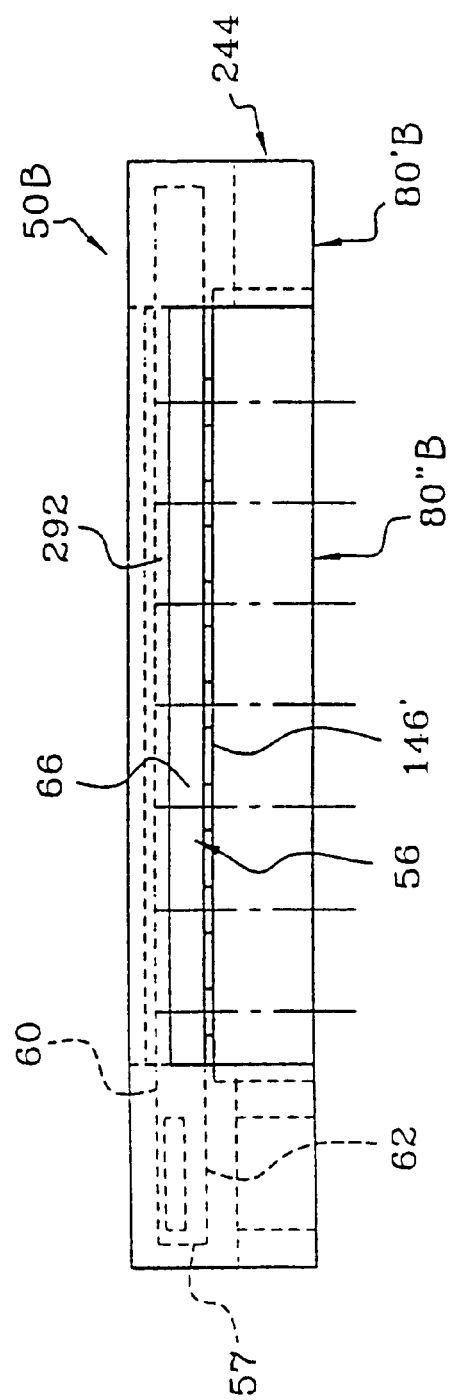
FIG. 50 is a view similar to the of FIG. 48, but with the front connector block in place.
Figure 51:
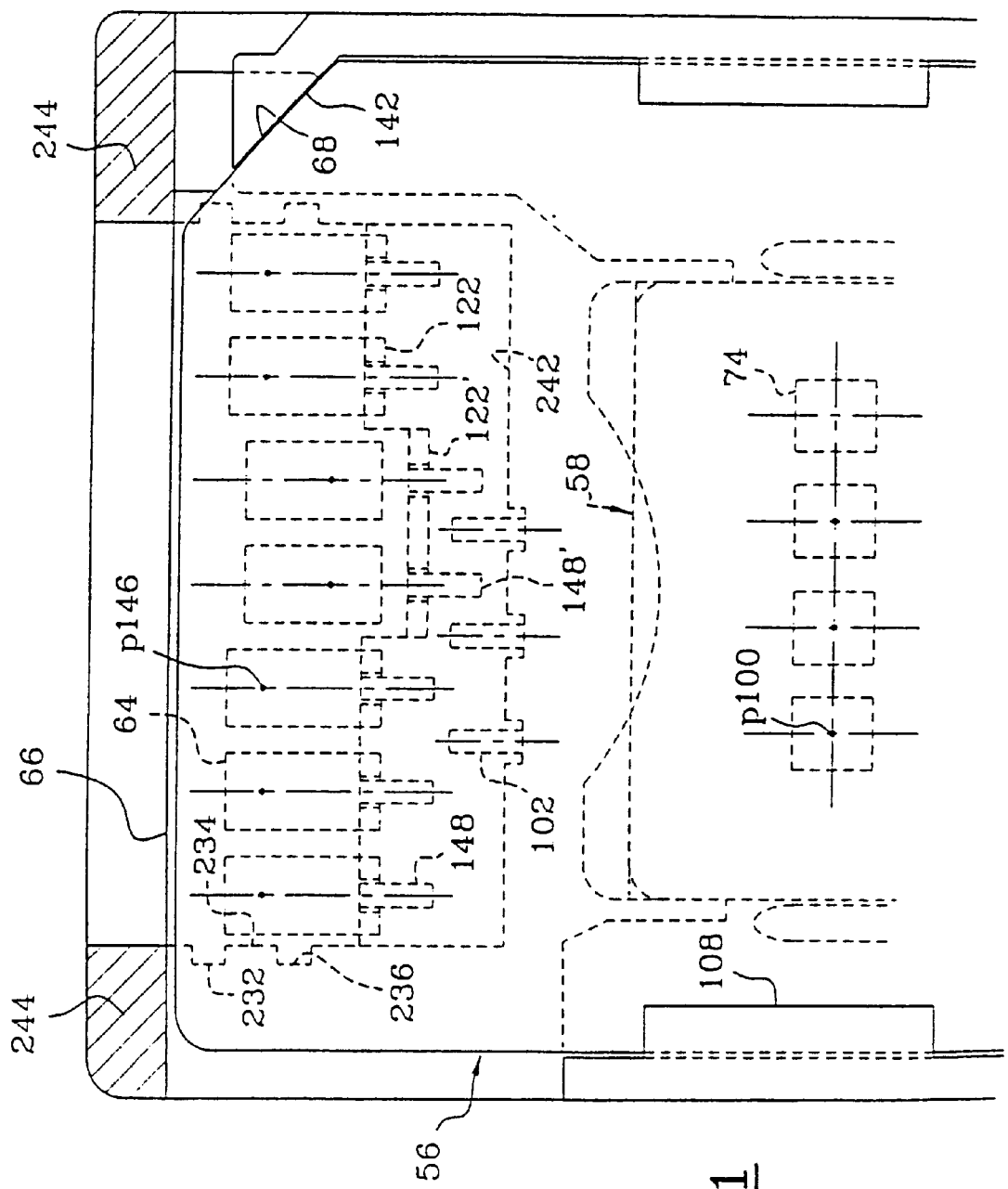
FIG. 51 is a partial top and sectional diagrammatic view of the connector of FIG. 25, showing the positions of the contact pads of the two cards.

As may be seen in FIG. 49, the front transverse edge 66 of the MMC card 56 may come into longitudinal abutment against the facing transverse face 290 formed in a vertical partition 292 which connects the right-angled pieces 244 together.

This abutment thus constitutes, in this embodiment, the longitudinal stop for insertion of the slide-in unit 54B.

The general design of the card-holder slide-in unit 54B for the third embodiment is identical to that described with reference to the second embodiment, except, of course, for the relative positioning of the two housings 152 and 154 and therefore for the positioning of the corresponding cards.

Figure 55:
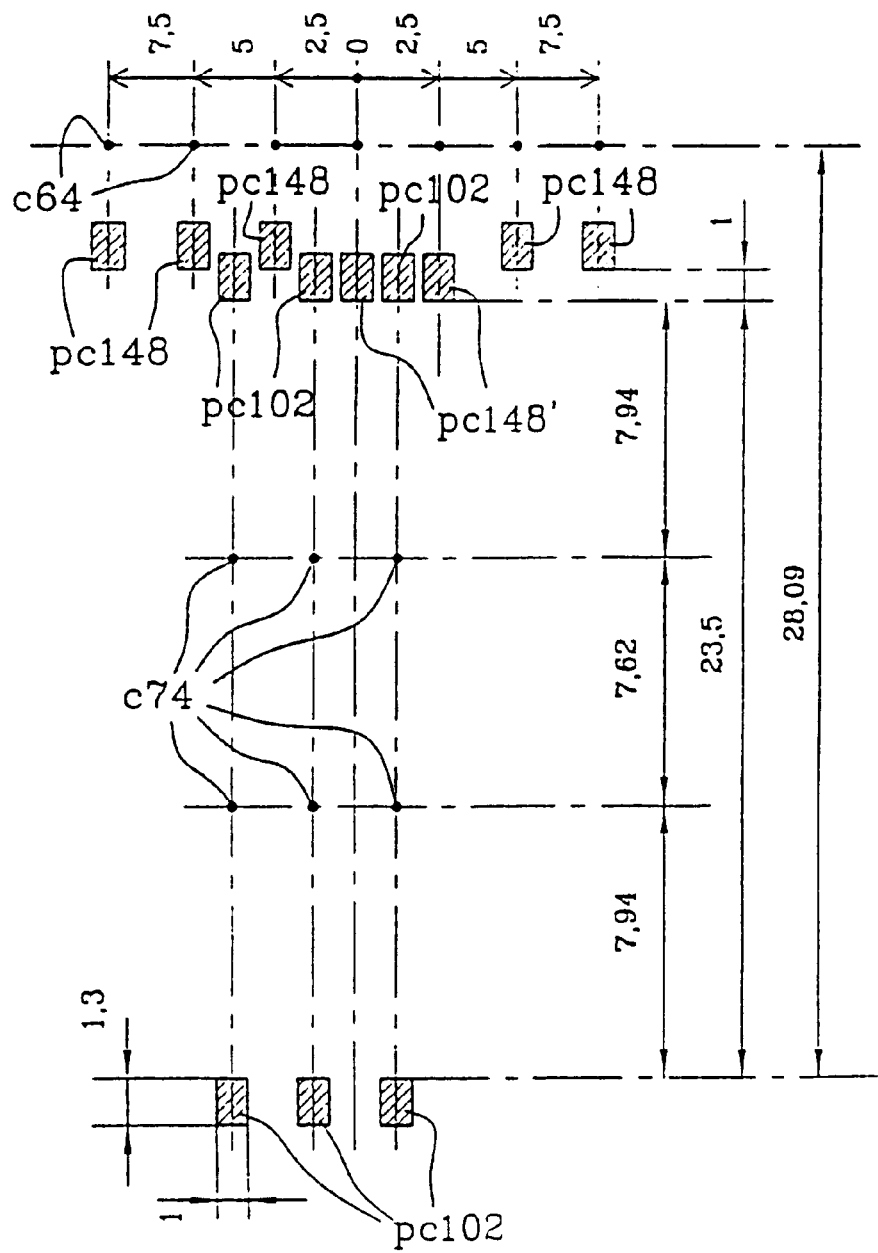
FIG. 55 is a diagrammatic view showing the positions of traces on a circuit board for connecting to tails of the contacts of the connector of FIG. 44.

This difference in positioning is especially apparent in FIGS. 53 to 55.

A description will now be given of the alternative form of the means of holding the card-holder slide-in unit in position on the support 52C, these means being illustrated in FIGS. 56 to 57B, the rest of the design of the slide-in unit and of the connector illustrated in these figures being generally identical to that of the third embodiment just described.

As may be seen in FIG. 56, the slide-in unit 54(here has two opposed lateral cheeks 300 which extend vertically downwards, beyond the lower face 153, at the front longitudinal end of the slide-in unit and each of which has a snap-fastening finger 302 which extends transversely inwards.

The cheeks 300 are designed to slide, by their opposed internal face 304, along the opposed external lateral edges 94 of the rear part 80'C of the lower part 80C of the connector body.

This lower part 80C has two lateral housings 306 in its lower face 86 in order to allow the two fingers 302 to pass, and the lower faces 308 of these housings have, near the front longitudinal ends of the arms 230, two lugs 266 of convex semicylindrical profile which extend vertically downwards.

As may be seen in FIG. 57A, during longitudinal insertion of the unit 54C from the rear to the front, the entire front part of the latter bends vertically downwards because of the engagement of the fingers 302 with the lugs 266, the very rigid MMC card 56 itself not being elastically deformed.

In the snap-fastened position illustrated in FIG. 57B, the fingers 302 are located longitudinally at the front with respect to the lugs 266 and the front part of the card-holder slide-in unit 54C is no longer elastically deformed downwards.

Moreover, the process of the lugs 266 getting past the fingers 302 provides a tactile sensation of the arrival in the operating position of the slide-in unit 54C.

Given the fact that the longitudinal retention means of the slide-in unit 54C with respect to the lower part 80C of the support for the connector are designed to bear beneath this lower part, it is no longer necessary to provide means for pressing the MMC card 56 vertically downwards in its front part and thus, as may be seen in FIG. 57, only a single "right-angled piece" 244 is provided on the longitudinal arm on the right-hand side, the function of this piece being simply to bear the polarizing facet 142 intended to engage with the cut corner 68 of the MMC card.

The alternative form, illustrated in FIGS. 58 to 60, called the "low-profile" form, that is to say a form which has a very small overall height, will now be described.

Figure 58:
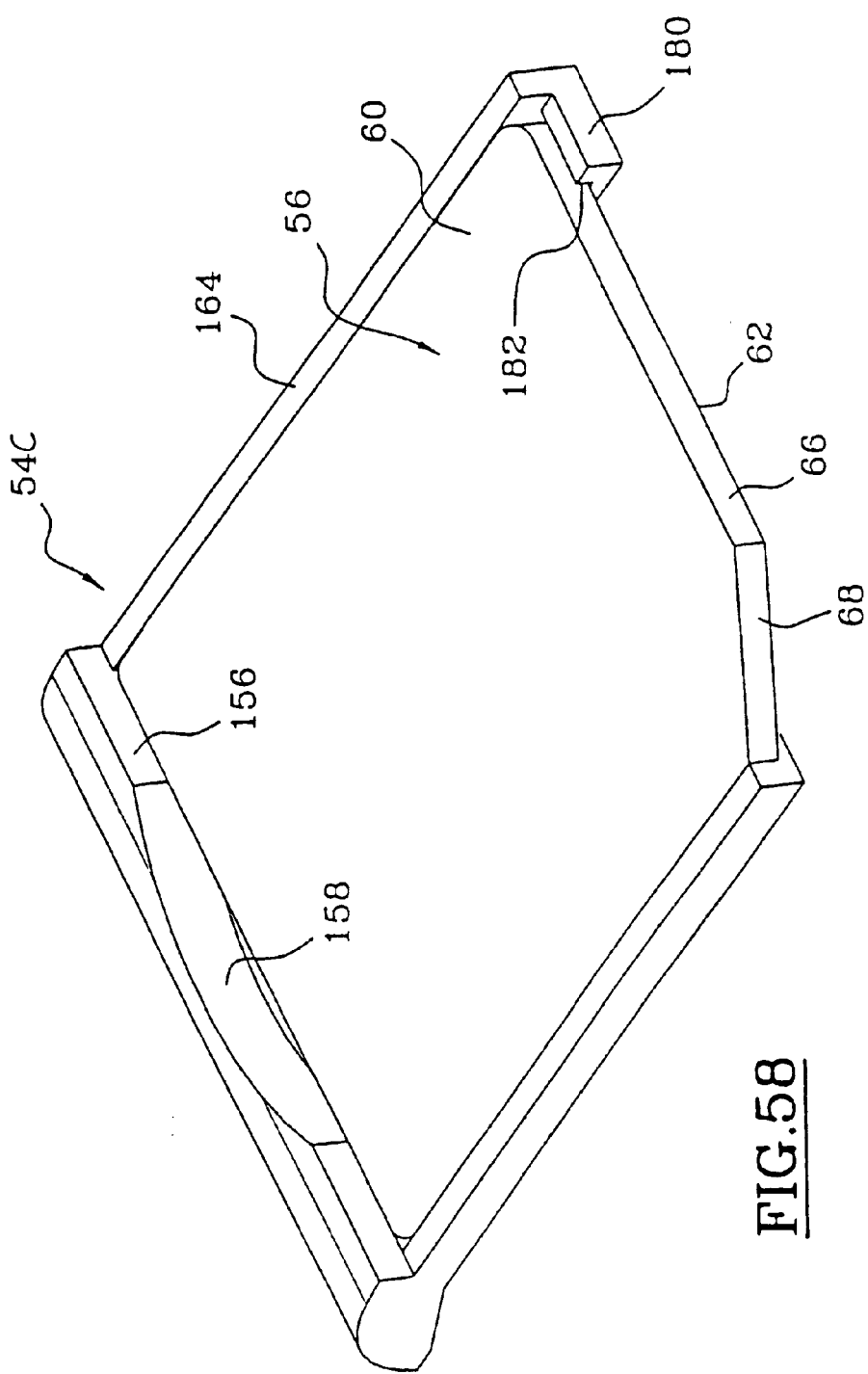
FIG. 58 is a rear and top isometric view of an alternative card-holding unit, where the unit and connector body are of especially low profile.

For this purpose, as may firstly be seen in FIG. 58, the upper part of the card-holder slide-in unit 54C, that is to say that part which includes the upper housing that houses the MMC card 56, is simplified insofar as there are no means for the upward vertical retention of the card 56, the free face 60 of which, here the upper face, is flush with the plane of the upper face 164 of the card-holder slide-in unit 54C.

The cut corner 68 is completely clear and the MMC card 56 is retained longitudinally by a transverse stop facet 182 on a thickened region 180 made along the lateral edges of the card-holder slide-in unit.

That lower part of the card-holder slide-in unit 54C which is not illustrated in detail in the figures is generally identical to that described with reference to the third embodiment, the arrangement of the two cards—the MMC card 56 and the MICROSIM card 58—also being identical, with the contact pads 64 and 74 longitudinally offset with respect to one another and oriented vertically downwards.

Figure 59:
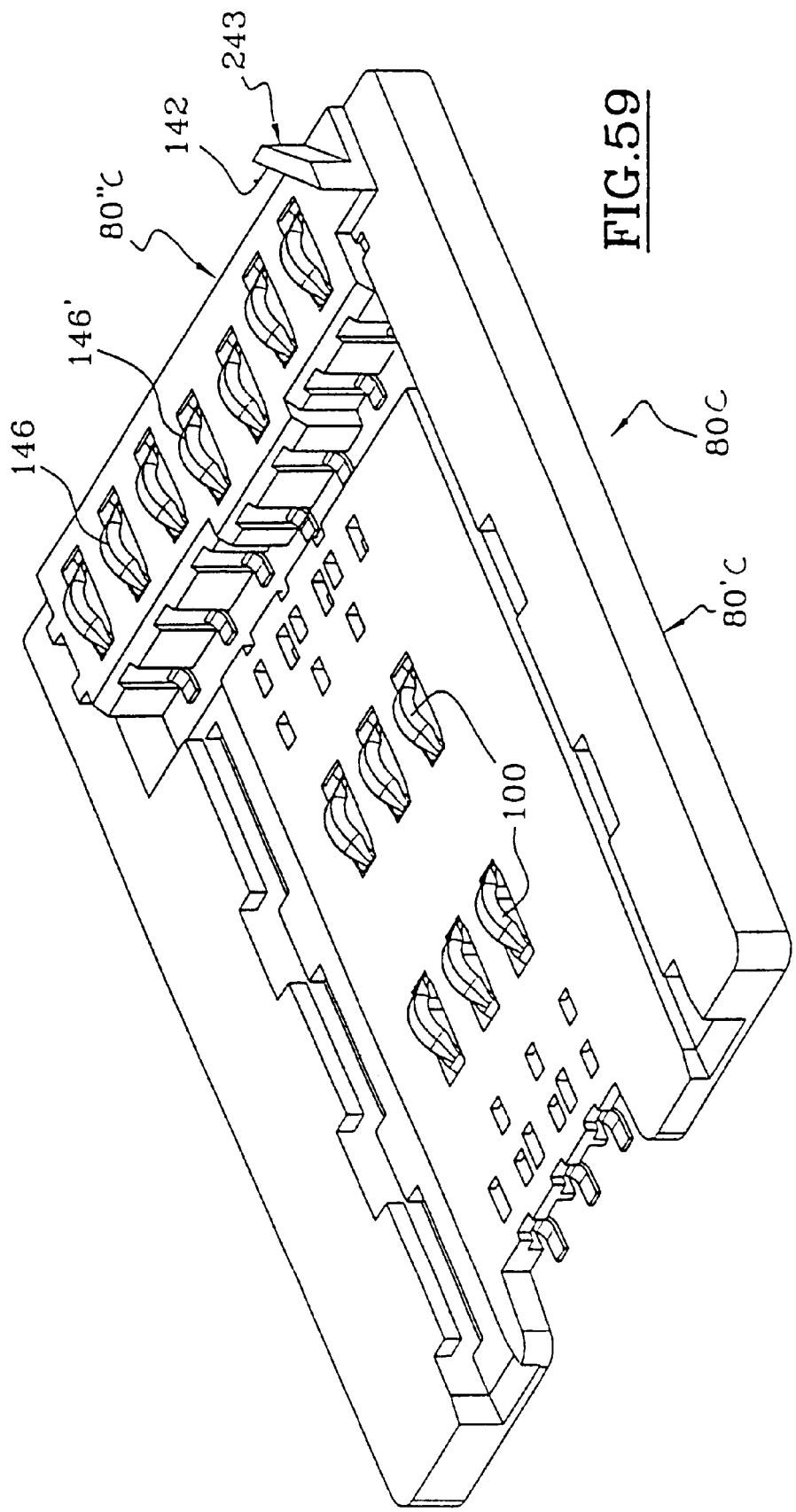
FIG. 59 is a rear and top isometric view of the connector body which receives the card-holding unit of FIG. 58.

As may be seen in FIG. 59, the single lower part 80C of the connector support made of two parts—the rear part 80'C and the front part 80"C—is also simplified insofar as there are no means integrated into the connector for pressing the MMC card vertically downwards.

Figure 60:
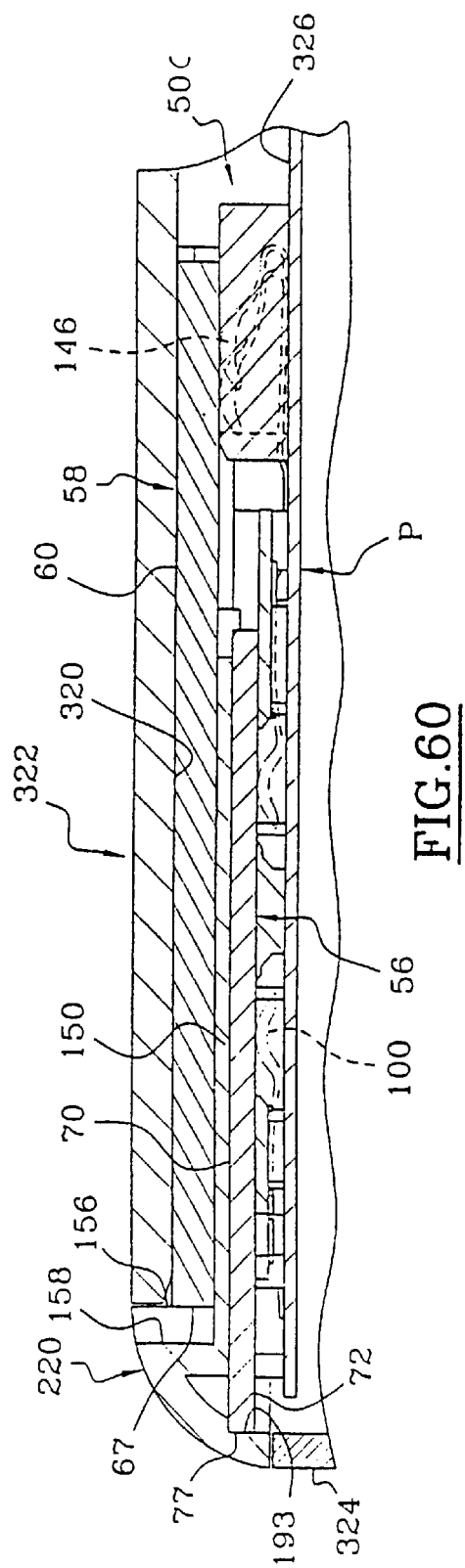
FIG. 60 is a partial sectional view of the connector body of FIG. 59 with the card-holding unit of FIG. 58 fully installed therein.

As may be seen in FIG. 60, in which the connector 50C is illustrated mounted in a piece of equipment which houses it, the MMC card 58 is held vertically upwards by the facing lower face 320 of an upper plate or wall 322 forming part of the piece of equipment, the latter also having a rear vertical wall element 324 and a printed-circuit board P to the upper face 326 of which the connector 50 is fixed.

Thus, the total height of the connector 50C is reduced and corresponds approximately to the height available between the lower face 320 of the upper wall 322 of the piece of equipment and the upper face 326 of the printed-circuit board P.

The body of the connector illustrated from FIG. 61 onwards corresponds to the second embodiment illustrated from FIG. 25 onwards and has a switch consisting of a blade for detecting the presence of the MICROSIM lower card and a switch consisting of a blade for detecting the presence of the slide-in unit with an MMC card in position.

The switch 380 illustrated in the figures consists essentially of a switch blade 382 made of conducting material which is mounted in a cavity 355 formed in the upper face 98 of the connector body and is fixed by a central stud 388, the head of which is hot-crimped.

The switch blade 382 has two branches B1 and B2 each of which engages with a contact end 100 belonging here to a standard pair of aligned contacts for connecting a MICROSIM card.

In this first exemplary embodiment, illustrated in FIGS. 61 to 64, the switch 380 is of the normally-open type, that is to say, as may be seen in FIG. 63, and in the absence of the MICROSIM card, the curved branches B1 and B2 are not in contact with the corresponding contact ends 100 but extend above them with a vertical clearance and they project vertically upwards above the plane upper face 98 of the insulating body 80'D.

When the MICROSIM card 56 is inserted longitudinally, from the left to the right in FIGS. 63 and 64, it causes the two contact branches B2 and B1 to bend in succession, these contact branches coming into contact with the contact ends 100 and also causing the latter to bend vertically downwards so as to form two contact points P2 and P1, a switching circuit then being established between the output or connection ends 102 of the two contact blades 100 used for producing the switch 380. When removing the slide-in unit 54D, which is carrying especially the MICROSIM card 58, it is firstly the first contact point P1 which is eliminated and then the second contact point P2, the switching circuit then being open again.

In the alternative form illustrated in FIGS. 65 to 68, the switch 350 for detecting the presence of the MICROSIM card 58 is of the normally-closed type that is to say, in the absence of a card and as may be seen in FIG. 67, the two branches B1' and B2' of the switching blade 382' are in contact with the aligned contact ends 100 and define two contact points P1' and P2' which close the switching circuit between the output or connection leads 102 of the two aligned electrical contacts.

When the MICROSIM card 58 is present, as illustrated in FIG. 68, the two contact ends 100 are bent elastically downwards, like the signal contacts used for connection to contact pads on the MICROSIM card, and the two contact points P2' and P1' are eliminated, that is to say the switching circuit is open, thus indicating that the MICROSIM card 58 is present.

The blade-type switch used for detecting the presence of the slide-in unit with an MMC card 56 will now be described.

For this purpose, and as may be seen in FIGS. 61 and 65, the lateral part on the right-hand side, in these figures, of the rear part 80'D of the insulating support has two additional contact blades which are similar to the signal contact blades and therefore each projects vertically above the upper face 468 of this lateral part in order to form a free contact end 400.

Each contact blade of the switch has, of course, a connection or output lead 402 designed to be connected to a conducting track (not shown) on the printed-circuit board carried by the connector.

The switch for detecting the presence of the card-holder slide-in unit shown in the figures is of the normally-open type and it is closed, in the presence of the card-holder slide-in unit, by a switch blade 482 carried by the slide-in unit and which projects vertically downwards in the corresponding lateral part of the lower face 153 of the slide-in unit, which bears normally on the insulating support.

Figure 69:
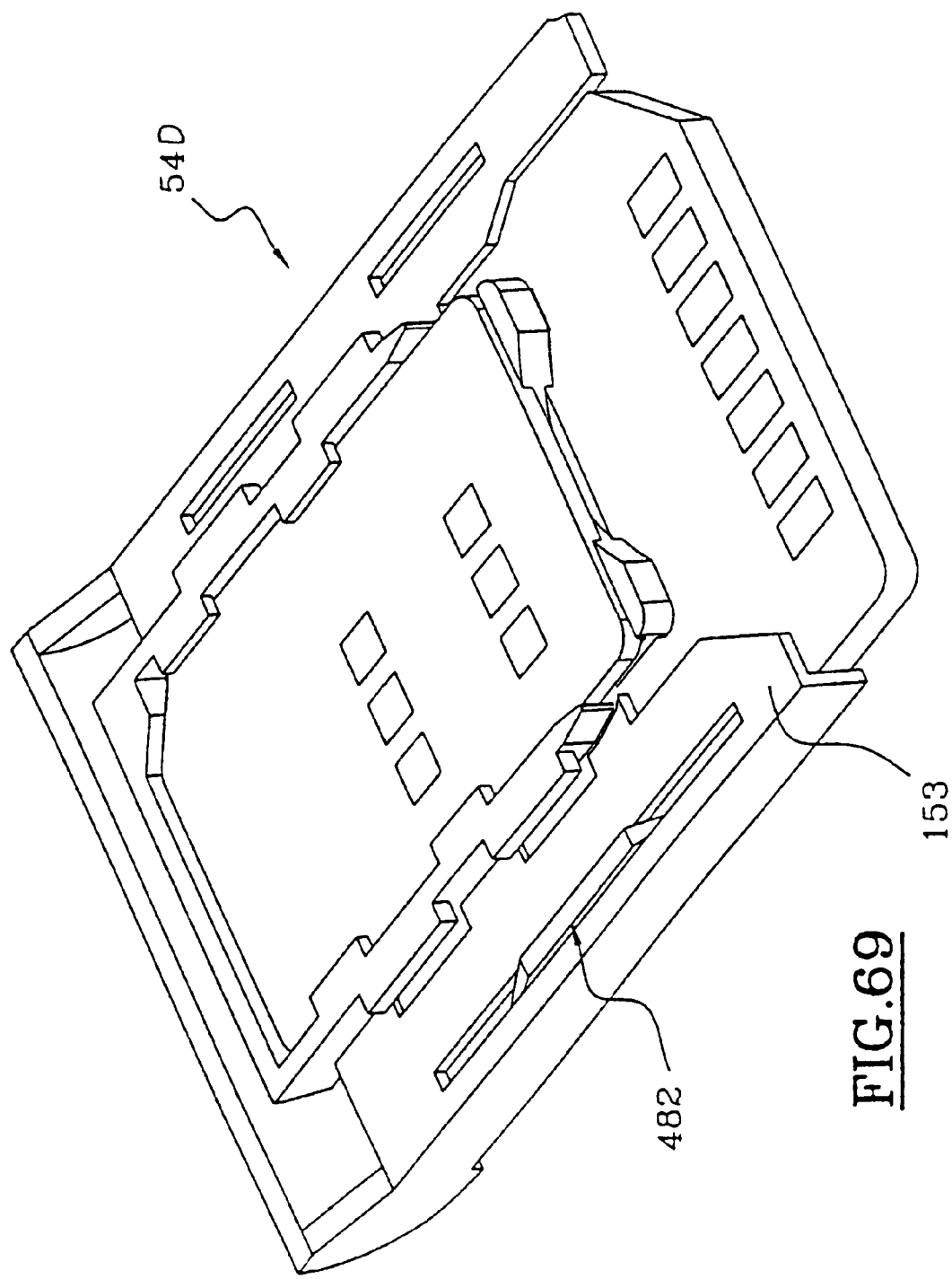
FIG. 69 is a front and bottom view of a card-holding unit of another embodiment of the invention, with means for detecting insertion of the MMC card when inserted into the upper compartment of the card-holding unit and with the unit inserted into the connector body of FIG. 65.

As may be seen in FIGS. 69 to 71, this switch blade 482 has two catching branches 484 which pass into corresponding holes 486 where they are caught by their free longitudinal ends 488 in notches 490 in the card-holder slide-in 2 unit 54D.

The central branch B of the switch blade 482 extends opposite the two contact ends 400 and, in the absence of the MMC card 56 in the slide-in unit, the vertical position of the central branch B is such that it is not in contact with its contact ends 400.

As illustrated in FIG. 71, when the MMC card 56 is present it acts via its lower face 62 on the catching branches 484 which have the shape of an upside-down V, the top of which projects into the path followed by the card 56 as it is being inserted into the card-holder slide-in unit 54D.

As may be seen in FIG. 71, when the card 56 is present the central branch B of the switch blade 482 is therefore moved vertically downwards and, when the slide-in unit 54D is in the operating position in the connector, the branch B engages simultaneously with its two contact ends 400 closing the switching circuit, i.e. electrically connecting together the output leads 402 of the switching system.

The switch consisting of the contact ends 400 and of the switch blade 482 therefore forms a switch for detecting the presence of the card-holder slide-in unit 54D and at the same time the presence in the latter of the MMC card 56.

In the fourth embodiment of a connector according to the teachings of the invention, illustrated in FIGS. 72 and 73, the card-holder charger 54E is mounted so as to be able to pivot, by pivoting with respect to the lower part 80 of the insulating support of the connector about a horizontal pivot axis A.

The general design of the card-holder charger 54E and of the lower part 80E is generally similar to that of the embodiment illustrated in FIGS. 25C and 59, respectively.

It can pivot about the axis A by virtue of two lateral and opposed hinge elements 500 formed near the rear end transverse face 97, the internal face 502 of each element 500 having a hole 504 which houses a complementary lug 506 forming a hinge pin which extends transversely towards the outside from an external lateral face 508 of a pivoting portion 510 of the card-holder charger 54E this portion 510 being made near the rear longitudinal end of the latter.

The pivoting part 510 is mounted between the lateral faces 502 of the hinge elements 500 by elastically deforming the latter transversely outwards.

The pivoting lid forming the card-holder charger 54E may thus pivot vertically downwards as far as a closed position in which the contact pads 64 and 74 on the MMC card 56 and on the MICROSIM card 58 bear elastically between the contact ends 146, 146' and 100 of the connector body.

In order to keep the card-holder lid 54E in the closed position, two vertical tabs 512 are provided near the front longitudinal end of the card-holder lid, these tabs being elastically deformable in an outward transverse direction and each of them having a hook-forming catch 514 which extends in relief transversely inwards and is designed to be housed in a complementary notch 516 formed opposite it in the front part 80"E of the insulating support.

If the MMC card is not in a satisfactory position, closure is impossible since the cut corner 68 is then not opposite the inclined facet 142.

Likewise, if the card 58 is not in a correct position it projects longitudinally forwards beyond the normal position illustrated in FIG. 72 and its transverse edge then lying longitudinally towards the front butts against the upper face 114 of the front part 80"E, thus preventing the connector from being fully closed.

Blade-type switches, or any other type of switch of known design in the form of added components, may also be used in the case of the pivoting card-holder lid 54E in order to detect the presence of the cards 56 and 58 and/or the closure of the pivoting lid 54E in the operating position.

The final embodiment illustrated in FIGS. 74 and 76 will now be described.

As in the case of the embodiment illustrated in FIGS. 72 and 73, this is a card-holder lid 54F mounted so as to pivot on the lower part 80.

This embodiment is distinguished from all the previous embodiments firstly in that the MICROSIM card is placed transversely and not longitudinally, that is to say its main axis, along its length direction, is perpendicular to the axis of the MMC card which remains oriented longitudinally from the rear to the front.

There is no longer strictly speaking an intermediate partition between the two cards, and it is the MICROSIM card 58 which, when it is in place in its housing, provides the downward vertical retention of the MMC card 56.

The MICROSIM card is polarized by its cut corner 68 engaging with complementary means, not shown in detail, provided in the rear transverse bottom of the housing for the MICROSIM card.

The MICROSIM card is guided in partial grooves in the card-holder slide-in unit 54F, these grooves being bounded downwards by tabs 210 and upwards by surface portions 150' which act in an equivalent way to that of the intermediate partition 150 provided in the previous embodiments.

If we consider the insulating support with its lower part 80, the contact elements 84 are, of course, arranged transversely with their output or connection leads 102 accessible along the lateral edges of this lower part.

This sixth embodiment is not limited to the illustration in FIGS. 73 to 76.

It is, for example, possible to produce the lower part 80F as a single piece by moulding, adopting a design for the front connection block similar to that illustrated in FIG. 25, in which the outputs 148 and 148' are oriented longitudinally forwards.

If the MMC card is mounted in an incorrect position, the pivoting card-holder lid 54F cannot be closed since the cut corner 68 is not opposite the internal inclined facet 142.

Likewise, if the MICROSIM card 58 is not in a correct position, its edge 59 located longitudinally towards the front of the connector is offset in this front direction with respect to the position illustrated in FIG. 74 and then butts against the connection region 520 between the upper face 98 of the connector part for connecting the MICROSIM card and the offset upper face 99 of the U-shaped part on the front block 80"F.

This final embodiment is advantageous in that it allows the total height of the connector to be reduced by eliminating the thickness of the intermediate partition 150.

This design allows the connector to be used only with the MICROSIM card which is normally used systematically in most applications. This is because, as explained above, even in the absence of the MMC card 56 the MICROSIM card 58 is perfectly held vertically in its housing 150'-210.

The upward vertical bearing region of the MICROSIM card 58 is completed, near its edge 59 located longitudinally to the rear, by bearing vertically against a facing surface formed in the card-holder lid 54F.

It will be noted that, in the absence of a MICROSIM card 58, there is no downward vertical retention of the MMC card 56 in the card-holder slide-in unit, that is to say it is held therein with a large vertical clearance which allows the user to detect this incorrect mounting.

When the card-holder is not of the pivoting type but is of the sliding type, and if the free contact ends 100 are shaped in the form of an upside-down spoon, it is also possible to use an arrangement of the type illustrated in FIGS. 73 and 74 while still providing guiding means for a card-holder 54F in which two cards 56 and 58 are arranged in the geometrical arrangement illustrated in FIG. 74, to slide longitudinally.

What is claimed is:

1. An electrical connector for making electrical connections with contact pads on the active faces of first and second thin and flat circuit cards where said first and second circuit cards respectively have first and second sets of contact pads arranged in first and second pad patterns on their active faces, comprising:

a body including an insulative frame and first and second sets of contacts mounted on said frame, with said contacts having pad-engaging contact-ends arranged in first and second contact-end patterns a card-holder unit which is coupled to said body and which has first and second card-holding compartments for respectively holding said first and second card against said pad-engaging contact ends;

said card-holder unit is constructed with said compartments being vertically spaced to hold said cards in vertically-spaced parallel planes, with at least a portion of a card in the second compartment lying directly over a card in the first compartment when said cards lie in horizontal planes in said compartments;

said card-holder unit is slideable in forward and rearward direction on said frame, with said cards being installable and removable from said card-holder unit after said card-holder unit is slid rearward, and said cards being positioned with their contact pads engaging said pad-engaging contact-ends of said contacts when said card-holder unit has been slid forward to a forward position.

2. The connector described in claim 1 wherein:

said card-holder unit is completely removable from said frame by sliding said card-holder unit rearward off said frame in normal use.

3. An electrical connector for making electrical connections with pads on the active faces of first and second thin and flat circuit cards, comprising:

an insulative frame with first and second vertically-facing faces that each lies in substantially a horizontal plane wherein perpendicular lateral and longitudinal directions are parallel to said horizontal plane;

first and second sets of contacts that are each mounted on said frame and that have first and second pad-engaging ends lying respectively at said first and second surfaces;

a card-holder unit that has a horizontally-extending planar partition wall and that has compartment walls lying respectively below and above said partition wall and that, with said partition wall, define card holding compartments for respectively receiving said first and second cards, said compartment walls including side and end compartment walls that determine the lateral and longitudinal position of said first and second cards when they lie in said compartments;

said second vertically-facing face lies above said first face, said first face faces upward, said second face faces downward, and said card holder unit is moveable from an initial position with respect to said frame to a final card holder unit position that locates said first and second cards respectively against said first and second faces of said frame with said pads on said faces of said cards lying against the pad-engaging ends of corresponding ones of said contacts.

4. The connector described in claim 3 wherein:

said frame has laterally opposite guide walls and said card-holding unit has unit tabs that lie at the height of said first compartment and that are longitudinally slideable along said frame guide walls.

5. A method for making electrical connections with first and second circuit cards that have active faces with contact pads arranged in different patterns, comprising:

installing said first and second cards in vertically-spaced lower and upper compartments of a card-holder unit;

installing said unit into a body of a connector that has two sets of contacts lying in vertically spaced planes, including moving said unit relative to said body of said connector until pads of said first and second sets of pads respectively engage first and second of said sets of contacts.

6. The method described in claim 5 wherein:

said body has lower and upper faces that respectively face upward and downward and with upper face lying above said lower face;

said step of installing said cards includes installing said first card in said lower compartment with said first card active face facing downward, and installing said second card in said upper compartment with said second card active face facing upwardly;

said step of moving said unit includes sliding a majority of a length of said unit to a position between said upper and lower faces.

7. The connector described in claim 6 wherein:

said frame of said body has an integrally molded lower part that forms said upwardly-facing wall and which includes front and rear ends, and said frame has an integrally molded upper part that forms said downwardly-facing wall, with said upper part having laterally opposite sides that extend downwardly and that are mounted on laterally opposite sides of said rear end of said lower part of said frame.

8. An electrical connector for making electrical connections with contact pads on the active faces of first and second thin and flat circuit cards where said first and second circuit cards respectively have first and second sets of contact pads arranged in first and second pad patterns on their active faces, comprising:

a body including an insulative frame and first and second sets of contacts mounted on said frame, with said contacts having pad-engaging contact-ends arranged in first and second contact-end patterns a card-holder unit which is coupled to said body and which has first and second card-holding compartments for respectively holding said first and second card against said pad-engaging contact ends;

said card-holder unit is constructed with said compartments being vertically spaced to hold said cards in vertically-spaced parallel planes, with at least a portion of a card in the second compartment lying directly over a card in the first compartment when said cards lie in horizontal planes in said compartments;

said frame has laterally opposite sides with groove walls that form grooves, and said frame has an upwardly-facing wall with contact-passing slots, with said pad engaging contact ends of said first set of contacts projecting upwardly through said contact-passing slots to lie above said upwardly-facing wall but to be downwardly deflectable into said slots;

said card-holder unit has tabs that are slideable longitudinally forward along said grooves with said groove walls including top groove walls that hold down said tabs to hold down said card-holder, and with said card-holder having a partition lying between said first and second compartments and pressing down the card in said first compartment toward said pad-engaging contact ends.

9. An electrical connector for making electrical connections with contact pads on the active faces of first and second thin and flat circuit cards where said first and second circuit cards respectively have first and second sets of contact pads arranged in first and second pad patterns on their active faces, comprising:

a body including an insulative frame and first and second sets of contacts mounted on said frame, with said contacts having pad-engaging contact-ends arranged in first and second contact-end patterns corresponding to said first and second pad patterns;

a card-holder unit which is coupled to said body and which has first and second card-holding compartments for respectively holding said first and second card against said pad-engaging contact ends; said card-holder unit is constructed with said compartments being vertically spaced to hold said cards in vertically-spaced parallel planes, with at least a portion of a card in the second compartment lying directly over a card in the first compartment when said cards lie in horizontal planes in said compartments;

said body has an upwardly-facing first card-engaging wall that lies at a first level, with said first set of contacts having their pad-engaging contact ends lying at and projecting above said first card-engaging wall to engage contact pads of said first card;

said body has a downwardly-facing second card-engaging wall that lies at a higher level than said first card-engaging wall, with said second set of contacts having their pad-engaging contact ends lying at and projecting below said second card-engaging wall to engage contact pads of said second card.

10. The connector described in claim 9 wherein:

said upwardly-facing card-engaging wall of said body has a rear end, and said downwardly-facing second card-engaging wall has a rear end that lies forward of first rear end.

11. An electrical connector for making electrical connections with contact pads on the active faces of first and second thin and flat circuit cards that are each of generally parallelogram shape when viewing its active face, where said first and second circuit cards respectively have first and second sets of contact pads arranged in first and second pad patterns on their active faces, comprising:

a body including an insulative frame and first and second sets of contacts mounted on said frame, with said contacts having pad-engaging contact-ends arranged in first and second contact-end patterns a card-holder unit which is coupled to said body and which has first and second card-holding compartments for respectively holding said first and second card against said pad-engaging contact ends;

said card-holder unit is constructed with said compartments being vertically spaced to hold said cards in vertically-spaced parallel planes, with at least a portion of a card in the second compartment lying directly over a card in the first compartment when said cards lie in horizontal planes in said compartments;

said first and second cards lie respectively in said first and second compartments, with said first set of contact pads facing downwardly and engaging said contact ends of said first set of contacts, and with said second set of contact pads facing upwardly and engaging said contact ends of said second set of contacts.

12. The connector described in claim 11 wherein:

said compartments have rear end walls that determine longitudinal positions of said cards, with said second card having a greater longitudinal length than said first card, and with the rear end wall of said first compartment positioning a rear edge of said first card forward of the rear edge, of said second card.

13. An electrical connector for making electrical connections with pads on the active faces of first and second thin and flat circuit cards that each have laterally opposite card sides wherein the lateral spacing of the card sides of said first card are different from the lateral spacing of the card sides of said second card, comprising:

an insulative frame with first and second vertically-facing faces that each lies in substantially a horizontal plane;

first and second sets of contacts that are each mounted on said frame and that have first and second pad-engaging ends lying respectively at said first and second vertically-facing faces;

apparatus for locating said first and second cards respectively against said first and second faces of said frame with said pads on said faces of said cards each lying against the pad-engaging ends of a corresponding set of said contacts;

said apparatus for locating including a first pair of laterally spaced side walls for engaging laterally opposite sides of said first card, and a second pair of laterally spaced side walls for engaging laterally opposite sides of said second card, the lateral spacing of said second pair of side walls being different from the lateral spacing of said first pair of side walls, and the lateral spacing of each of said pairs of side walls being about the same as the lateral spacing of a corresponding one of said card sides to laterally position the corresponding card.

14. The connector described including 13 wherein;

said second face lies above said first face, said first face faces upward, and said second face faces downward.

* * * * *